United States Patent
Suzuki et al.

(10) Patent No.: US 7,206,510 B2
(45) Date of Patent: Apr. 17, 2007

(54) RING NETWORK USING MULTI-WAVELENGTH GENERATOR

(75) Inventors: Hiroo Suzuki, Yokohama (JP); Masamichi Fujiwara, Yokosuka (JP); Mitsuhiro Teshima, Yokosuka (JP); Koji Akimoto, Yokosuka (JP); Shingo Kawai, Yokosuka (JP); Jun-ichi Kani, Yokohama (JP); Noboru Takachio, Yokosuka (JP); Katsumi Iwatsuki, Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 677 days.

(21) Appl. No.: 10/266,905

(22) Filed: Oct. 8, 2002

(65) Prior Publication Data

US 2003/0067649 A1 Apr. 10, 2003

(30) Foreign Application Priority Data

| Oct. 9, 2001 | (JP) | ............................. 2001-311996 |
| Feb. 13, 2002 | (JP) | ............................. 2002-036027 |
| Feb. 13, 2002 | (JP) | ............................. 2002-036028 |

(51) Int. Cl.
*H04B 10/20* (2006.01)
*G02F 1/00* (2006.01)

(52) U.S. Cl. ............................ 398/59; 398/3
(58) Field of Classification Search ................ 398/59, 398/3, 4, 5, 83
See application file for complete search history.

(56) References Cited

U.S. PATENT DOCUMENTS

| 5,369,515 A | * | 11/1994 | Majima ........................ 398/59 |
| 5,576,875 A | | 11/1996 | Chawki et al. |
| 5,625,478 A | | 4/1997 | Doerr et al. |
| 5,841,557 A | * | 11/1998 | Otsuka et al. ................. 398/65 |
| 5,943,148 A | * | 8/1999 | Hamel et al. ................. 398/83 |

FOREIGN PATENT DOCUMENTS

| JP | 02-089430 | | 3/1990 |
| JP | 07231305 | A | 8/1995 |
| JP | 08018538 | A | 1/1996 |
| JP | 08-065252 | | 3/1996 |
| JP | 09-244076 | | 9/1997 |
| JP | 09326758 | A | 12/1997 |
| JP | 09326767 | A | 12/1997 |
| JP | 10-032546 | | 2/1998 |
| JP | 10-051057 | A | 2/1998 |

(Continued)

OTHER PUBLICATIONS

M. Fujiwara, J. Kani, H. Suzuki, K. Araya and M. Teshima Flattened optical multicarrier generation of 12.5 GHz spaced 256 channels based on sinusoldal amplitude and phase hybrid modulation; Electronic Letters, IEE, Jul. 19, 2001, vol. 37 No. 15, pp. 967-968.

(Continued)

*Primary Examiner*—M. R. Sedighian
(74) *Attorney, Agent, or Firm*—Fitch, Even, Tabin & Flannery

(57) ABSTRACT

A first optical fiber transmission path is used to transmit continuous-wave light for upstream signal light from the center node to each of the remote nodes, while a second optical fiber transmission path is used to transmit downstream signal light from the center node to each remote node and to transmit upstream signal light (obtained by modulating continuous-wave light) from each remote node to the center node. In this network, specific wavelength bandwidths are allocated to each remote node for the continuous-wave lights (for upstream signal lights) and the downstream signal lights, and the wavelength bandwidths for the continuous-wave lights (for upstream signal lights) and the downstream signal lights are alternately set.

53 Claims, 47 Drawing Sheets

FOREIGN PATENT DOCUMENTS

| | | | |
|---|---|---|---|
| JP | 10-065649 | | 3/1998 |
| JP | 10-200484 | | 7/1998 |
| JP | 11-234212 | A | 8/1999 |
| JP | 2000-196536 | | 7/2000 |
| JP | 2000-236303 | * | 8/2000 |
| JP | 2000-295201 | | 10/2000 |
| JP | 2000341291 | A | 12/2000 |
| JP | 2001-156722 | | 6/2001 |
| JP | 2001-275100 | | 10/2001 |
| JP | 2001-333015 | | 11/2001 |
| JP | 2002082323 | A | 3/2002 |
| JP | 2002-156667 | A | 5/2002 |
| JP | 2002-185407 | A | 6/2002 |
| JP | 2002-246986 | A | 8/2002 |
| JP | 2003-069502 | | 3/2003 |

OTHER PUBLICATIONS

Sharma et al., WDM Ring Network Using a Centralized Multiwavelength Light Source and Add-Drop Multiplexing Filters, Journal of Lightwave Technology, US, IEEE, Jun. 1997, vol. 15, No. 6, pp. 917-929.

Takachio et al., Wide area gigabit access network based on 12.5 GHz spaced 256 channel super-dense WDM technologies, Electronics Letters, IEEE, Mar. 1, 2001, vol. 37 No. 5, pp. 309-311.

Teshima et al., Optical carrier supply module applicable to over 100 super-dense WDM systems of 1000 channels, ECOC 2001.

Reichmann, K. C. et al., An Eight-Wavelength 160-km Transparent Metro WDM Ring Network Featuring Cascaded Erbium-Doped Waveguide Amplifiers, IEEE Photonics Technology Letters, vol. 13, No. 10, Oct. 2001, pp. 1130-1132.

Ohtsuka et al., OADM Ring System Developed by NTT NS Laboratory, NTT Review, Japan, NTT, Jan. 2002, vol. 14, No. 1, pp. 40-42.

Lauder et al., WDM Ring Network Employing a Shared Multiwavelength Incoherent Source, IEEE Photonics Technology Letters, vol. 10, No. 2, Feb. 1998, pp. 294-296.

National Communications System, Technical Information Bulletin 00-3, Wavelength Division Multiplexing (WDM) Networks, Feb. 2000, NCS TIB 00-3, Arlington, VA.

* cited by examiner

RING NETWORK USING MULTI-WAVELENGTH GENERATOR

This application is based on Japanese Patent Application Nos. 2001-311996 filed Oct. 9, 2001, and 2002-036027 filed Feb. 13, 2002 and 2002-036028 filed Feb. 13, 2002, the contents of which are incorporated hereinto by reference.

BACKGROUND OF THE INVENTION

1. Field of the Invention

The present invention relates to a WDM ring network in which a center node and a plurality of remote nodes all connected together in ring form communicate with one another using a WDM technique.

2. Description of the Related Art

Conventional WDM ring networks include a type A1 in which each remote node has a light source and a type A2 in which a center node has a multi-wavelength generator arranged therein, whereas each remote node receives, modulates, and transmits continuous-wave (CW) light transmitted by the center node. In connection with an arrangement for allowing each remote node to split and insert (add and drop) an optical signal, the conventional WDM ring networks also include a type B1 in which an optical filter is used to demultiplex/multiplex an optical signal of a predetermined wavelength transmitted through an optical fiber transmission path, and a type B2 in which an optical coupler is used to split a part of optical signal power and then selectively receive an optical signal of the predetermined wavelength. For example, the WDM network described in Japanese Patent Application Laid-open No. 7-231305 (1995) is known as a combination of the types A2 and B1.

This publication discloses a multi-wavelength generator that modulates a vertical mode from a multimode laser or output light from a single mode laser to cut out its sidebands. However, with such a light source, the number of vertical mode frequencies or sideband frequencies having optical power sufficient for communication is limited. Further it is difficult to obtain flat power with these frequencies. Accordingly, such a light source cannot be used for a multi-wavelength generator for a network using more than 100 wavelengths.

To solve this problem, a multi-wavelength generator has been provided which generates multi-wavelength light at once by using an electric signal (for example, a sine wave) having a particular cycle period to modulate the phase and intensity of light having a single central wavelength to thereby generate sidebands. Such a technique is disclosed in (1) M. Fujiwara, et al., "Flattened optical multicarrier generation of 12.5 GHz spaced 256 channels based on sinusoidal amplitude and phase hybrid modulation", IEE Electronics Letters, Vol. 37, No. 15, pp. 967–968, July 2001.

According to Document (1), a multi-wavelength generator is composed of an optical generating section and a multi-wavelength modulating section. The optical generating section has a semiconductor laser (LD) that generates light of a single central wavelength. The multi-wavelength modulating section is composed of an intensity modulator that modulates the intensity of output light from the optical generating section, a phase modulator that modulates the phase of the output light (these modulators are arranged in an arbitrary order), a period signal generator that generates a predetermined period signal (sine wave) applied to each of the modulators, and a voltage adjusting section that adjusts an applied voltage and bias voltage in the period signal.

The optical generating section may comprises n semiconductor lasers (LD) that generate lights of optical frequencies $f_1$ to $f_n$ spaced at even intervals, and a multiplexer that multiplexes the laser lights into output light. In this case, the multi-wavelength modulating section generates sidebands around each central wavelength and can further generate multi-wavelength light over a wideband at once. This configuration enables the number of sidebands to be increased by installing an additional light source at an input port of the multiplexer. Thus, this configuration allows additional components to be easily installed.

Further, a linear optical repeater that does not insert or split wavelengths is provided with a gain control function of keeping the output power of signal light at a fixed value in order to maintain desired transmission quality even with a variation in optical fiber loss or number of wavelengths within a repeating section. The linear optical relay is basically composed of an optical amplifier having its gain controlled to a fixed value, a variable optical attenuator, and feedback control means therefor.

The feedback control means monitors the total optical power and the number of wavelengths after light has passed through the variable optical attenuator to adjust attenuation provided by the variable optical attenuator so that the total optical power divided by the number of wavelengths is equal to desired signal optical power per channel. This enables the signal optical power per channel to be kept at a fixed value in spite of a variation in loss or number of channels.

A problem with the multi-wavelength generator is the superimposition of multiple sidebands generated around each of the central wavelengths of a plurality of light sources. To avoid this problem, large intervals must be used to space the optical frequencies of the light sources. Alternatively, it is necessary to remove unwanted sidebands generated around the central wavelengths of the light sources.

However, the former method may reduce the efficiency with which the optical frequencies are used. The latter method may complicate the configuration of the multi-wavelength generator and may degrade an optical SN ratio as a result of an optical loss if an optical filter or the like is used.

On the other hand, in a remote node that uses an optical coupler or the like to insert and split wavelengths, the gain control function requires a mechanism that adjusts the power of transmitted signal light but also the power of signal light inserted into the node, to desired levels. Further, in a remote node with such a function of inserting and splitting wavelengths, the number of wavelengths varies between the input and output thereof. Accordingly, the above conventional technique still has room for improvement; it must be clarified where in the network wavelength number information should be used, what control procedure should be taken, and what should be controlled.

SUMMARY OF THE INVENION

The following description relates to the Wavelength Division Multiplexing (WDM) technique, which allows several optical signals to be simultaneously transmitted in the same direction over a single optical fiber cable. The present application uses the terms: lights; signal lights; upstream signal lights; downstream signal lights, which may include within their meanings optical signals; upstream optical transmission; downstream optical transmission, respectively.

The inventor desires to provide a WDM ring network comprising a center node and a plurality of remote rings all connected together in ring form, wherein the center node and the remote nodes cooperate in efficiently removing unwanted sidebands generated by a multi-wavelength generator arranged at the center node or by multi-wavelength generators arranged at the center node and remote nodes, respectively, thereby improving the efficiency with which optical frequencies are used, using the simple configuration.

The present invention provides a WDM ring network comprising one center node and a plurality of nodes all connected together in ring form via two optical fiber transmission path, a first optical fiber transmission path being used to transmit continuous-wave lights for upstream signal lights from the center node to each of the remote nodes, a second optical fiber transmission path being used to transmit downstream signal lights from the center node to each remote node and to transmit upstream signal lights (obtained by modulating continuous-wave lights) from each remote node to the center node, wherein specific wavelength bandwidths are allocated to each remote node for the continuous-wave lights (for upstream signal lights) and the downstream signal lights, and the wavelength bandwidths for the continuous-wave lights (for upstream signal lights) and the downstream signal lights are alternately set.

The center node comprises a first multi-wavelength generator that sends out multi-wavelength light (continuous-wave lights) of a corresponding one of a group of first wavelength bandwidths (F1, F3, ... ) allocated for upstream signal lights for each remote node, a second multi-wavelength generator that sends out multi-wavelength light of a corresponding one of a group of second wavelength bandwidths (F2, F4, ... ) allocated for downstream signal lights for each remote node, an optical modulating section that demultiplexes the continuous-wave lights of a plurality of wavelength channels from the multi-wavelength light with the second wavelength bandwidth, generates the downstream signal lights modulated by the signals sent out to each of the remote nodes, and sends out the downstream signal lights to the second optical fiber transmission path, and an optical receiving section that demultiplexes upstream signal lights from each remote node transmitted via the second optical fiber transmission path and then receives the lights obtained through demultiplexing.

The remote node comprises optical splitting means for splitting multi-wavelength light of the first wavelength bandwidth transmitted via the first optical fiber transmission path, an optical modulating section that demultiplexes the continuous-wave lights of wavelength channels with the wavelength bandwidths pre-assigned to the remote node in the first wavelength bandwidths, modulates the lights obtained, and multiplexes the modulated lights to generate upstream signal lights, optical coupling means for coupling the upstream signal lights to the second optical fiber transmission path, optical splitting means for splitting the downstream signal lights transmitted via the second optical fiber transmission path, and an optical receiving section that demultiplexes the signal lights of wavelength channels in the wavelength bandwidth pre-assigned to the remote node from the downstream signal lights and then receives the lights obtained through demultiplexing.

Further, the present invention provides a WDM ring network comprising one center node and a plurality of nodes all connected together in ring form via two optical fiber transmission path, a first optical fiber transmission path being used to transmit continuous-wave lights for upstream signal lights from the center node to each of the remote nodes and to transmit downstream signal lights from the center node to each remote node, a second optical fiber transmission path being used to transmit upstream signal lights (obtained by modulating continuous-wave lights) from each remote node to the center node, wherein specific wavelength bandwidths are allocated to each remote node for the continuous-wave lights (for upstream signal lights) and the downstream signal lights, and the wavelength bandwidths for the continuous-wave lights (for upstream signal lights) and the downstream signal lights are alternately set.

The center node comprises a first multi-wavelength generator that outputs multi-wavelength light (continuous-wave lights) of a corresponding one of a group of first wavelength bandwidths (F1, F3, ... ) allocated for upstream signal lights for each remote node, optical filter means for demultiplexing the continuous-wave lights of a plurality of wavelength channels from the multi-wavelength light with the first wavelength bandwidth, multiplexing the lights obtained and then outputting continuous-wave lights of the first wavelength bandwidth, a second multi-wavelength generator that outputs multi-wavelength light of a corresponding one of a group of second wavelength bandwidths (F2, F4, ... ) allocated for downstream signal lights for each remote node, an optical modulating section that demultiplexes the continuous-wave lights of a plurality of wavelength channels from the multi-wavelength light with the second wavelength bandwidth, and generates downstream signal lights modulated by a signal sent out to each of the remote nodes, optical coupling means for coupling the continuous-wave lights of the first wavelength bandwidth and the downstream signal lights together and sending out the coupled light to the first optical fiber transmission path, and an optical receiving section that demultiplexes upstream signal lights from each remote node transmitted via the second optical fiber transmission path and then receives the lights obtained through demultiplexing.

The remote node comprises optical splitting means for splitting continuous-wave lights of the first wavelength bandwidth and downstream signal lights of the second wavelength bandwidth both transmitted via the first optical fiber transmission path, an optical modulating section that demultiplexes the continuous-wave lights of wavelength channels with the wavelength bandwidths pre-assigned to the remote node from continuous-wave lights in the first wavelength bandwidths, modulates the lights obtained, and multiplexes the modulated lights to generate upstream signal lights, optical coupling means for coupling the upstream signal lights to the second optical fiber transmission path, and an optical receiving section that demultiplexes signal lights of wavelength channels with the wavelength bandwidth pre-assigned to the remote node from the downstream signal lights, and then receives the signal lights obtained through demultiplexing.

Further, the center node may comprise polarization-scrambling means disposed after the first multi-wavelength generator to polarization-scramble continuous-wave lights of the first wavelength bandwidth supplied to each remote node by the center node. Furthermore, the center node may comprise polarization-scrambling means disposed after the second multi-wavelength generator to polarization-scramble multi-wavelength light of the second wavelength bandwidth allocated for downstream signals.

Further, the present invention provides a WDM ring network comprising one center node and a plurality of nodes all connected together in ring form via one optical fiber transmission path, the optical fiber transmission path being used to transmit downstream signal lights from the center node to each of the remote nodes and to transmit upstream signal lights from each remote node to the center node, wherein specific wavelength bandwidths are allocated to each remote node for the upstream signal lights and the downstream signal lights, and the wavelength bandwidths for the upstream signal lights and the downstream signal lights are alternately set, the remote node comprising a multi-wavelength generator that outputs multi-wavelength light of a predetermined wavelength bandwidth allocated to the remote node and belonging to a group of wavelength bandwidths (F1, F3, . . . ) allocated for upstream signal lights, an optical modulating section that demultiplexes the continuous-wave lights of a plurality of wavelength channels from the multi-wavelength light with the predetermined wavelength bandwidth, modulating the lights obtained, and then multiplexing the modulated lights to generate upstream signal lights, optical coupling means for coupling the upstream signal lights to the optical fiber transmission path, optical splitting means for splitting the downstream signal lights transmitted via the optical fiber transmission path, and an optical receiving section that demultiplexes signal lights of wavelength channels with the wavelength bandwidth pre-assigned to the remote node from the downstream signal lights, and then receives the lights obtained through demultiplexing.

Further, the present invention provides a WDM ring network comprising one center node and a plurality of nodes all connected together in ring form via two optical fiber transmission path, a first optical fiber transmission path being used to transmit downstream signal lights from the center node to each of the remote nodes, a second optical fiber transmission path being used to transmit upstream signal lights from each remote node to the center node, wherein specific wavelength bandwidths are allocated to each remote node for the upstream signal lights and the downstream signal lights, and the wavelength bandwidths for the upstream signal lights and the downstream signal lights are alternately set, the-remote node comprising a multi-wavelength generator that outputs multi-wavelength light of a predetermined wavelength bandwidth allocated to the remote node and belonging to a group of wavelength bandwidths (F1, F3, . . . ) for upstream signal lights, an optical modulating section that demultiplexes the continuous-wave lights of a plurality of wavelength channels from the multi-wavelength light with the predetermined wavelength bandwidth, modulating the lights obtained, and then multiplexing the modulated lights to generate upstream signal lights, optical coupling means for coupling the upstream signal lights to the second optical fiber transmission path, optical splitting means for splitting the downstream signal lights transmitted via the first optical fiber transmission path, and an optical receiving section that demultiplexes signal lights of wavelength channels with the wavelength bandwidth pre-assigned to the remote node from the downstream signal lights, and then receives the signal lights obtained through demultiplexing.

Further, the remote node may comprise first optical attenuating means for adjusting attenuation of optical power of input signal lights which contains the downstream signal lights to be split and which is input to the remote node, before splitting the downstream signal lights and transmitting the split light to the optical receiving means, second optical attenuating means disposed between the optical modulating section and the optical coupling means to adjust attenuation of optical power of the upstream signal lights, supervisory signal processing means for loading the number of wavelengths in the input signal lights and the number of wavelengths in the upstream signal lights, calculating wavelength number information, the sum of the numbers of wavelengths loaded, and transferring the calculated wavelength number information to another remote node as information on the number of wavelengths in input signal lights for this remote node, and feedback control means for detecting optical power of output signal lights which is composed of the upstream and downstream signal lights coupled together by the optical coupling means and which is output by the remote node, and controlling the first optical attenuating means and the second optical attenuating means so that the detected optical power divided by the wavelength number information has a fixed value.

Further, light used to generate each signal light may be divided into a plurality of lights before the signal lights are generated so that light distributed to a WDM ring network can be used to generate signal lights for this WDM ring network.

Furthermore, the center node may comprise polarization-scrambling means disposed after the multi-wavelength generator to polarization-scramble multi-wavelength light of a wavelength bandwidth allocated for downstream signals.

As described above, in the WDM ring network of the present invention, specific wavelength bandwidths are allocated to each remote node for the continuous-wave lights (for upstream signal) and downstream signal lights supplied to each remote node by the center node, and the wavelength bandwidths for the continuous-wave lights (for upstream signal lights) and the downstream signal lights are alternately set. This serves to efficiently remove unwanted sidebands generated by the multi-wavelength generator at the center node, during modulating operations performed by the center node and the remote nodes. Thus, wavelength bandwidths can be densely set, thereby enabling the efficiency with which optical frequencies are used to be increased using the simple configuration.

Further, in the WDM ring network of the present invention, specific wavelength bandwidths are allocated to each remote node for the downstream signal lights transmitted to each remote node by the center node and the upstream signal lights transmitted to the center node by each remote node, and the wavelength bandwidths for the upstream signal lights and the downstream signal lights are alternately set. This serves to efficiently remove, during modulating operations, unwanted sidebands generated by the multi-wavelength generators at the center node and remote nodes. Thus, wavelength bandwidths can be densely set, thereby enabling the efficiency with which optical frequencies are used to be increased using the simple configuration.

The above and other objects, effects, features and advantages of the present invention will become more apparent from the following description of embodiments thereof taken in conjunction with the accompanying drawings.

BRIEF DESCRTION OF THE DRAWINGS

DETAILED DESCRIPTION OF PREFERRED EMBODIMENTS

Figure 1:
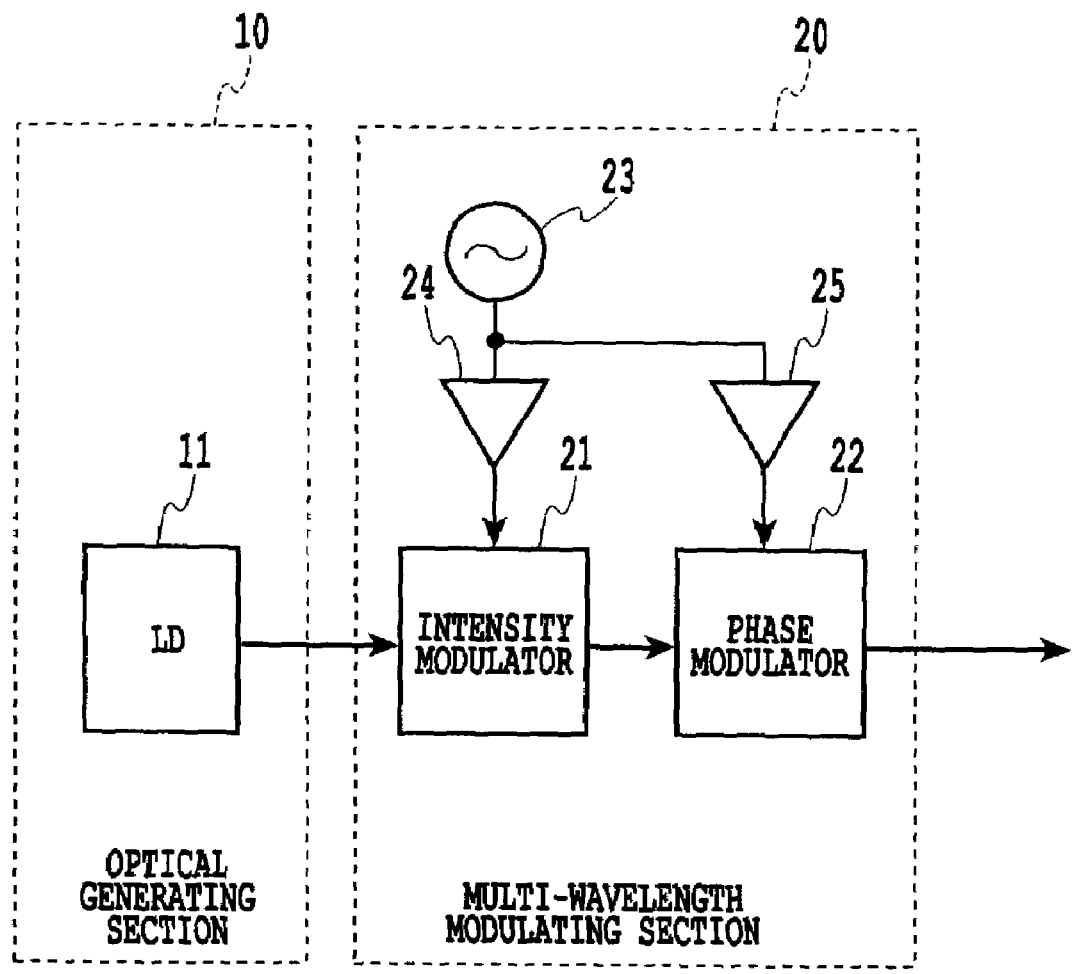
FIG. 1 is a diagram showing an example of a configuration of a conventional multi-wavelength generator.

FIG. 1 shows an example of a configuration of the multi-wavelength generator in Document (1). In this figure, the multi-wavelength generator is composed of an optical generating section 10 and a multi-wavelength modulating section 20. The optical generating section 10 has a semiconductor laser (LD) 11 that generates light of a single central wavelength. The multi-wavelength modulating section 20 is composed of an intensity modulator 21 that modulates the intensity of output light from the optical generating section 10 and a phase modulator 22 that modulates the phase of the output light (these modulators may be arranged in an arbitrary order), a period signal generator 23 that generates a predetermined period signal (sine wave) applied to each of the modulators, and voltage adjusting sections 24, 25 that adjusts an applied voltage and bias voltage in the period signal.

With reference to FIGS. 2A to 2G and FIGS. 3A to 3F, description will be given of an output light spectrum from the multi-wavelength generator in Document (1).

Figure 2:
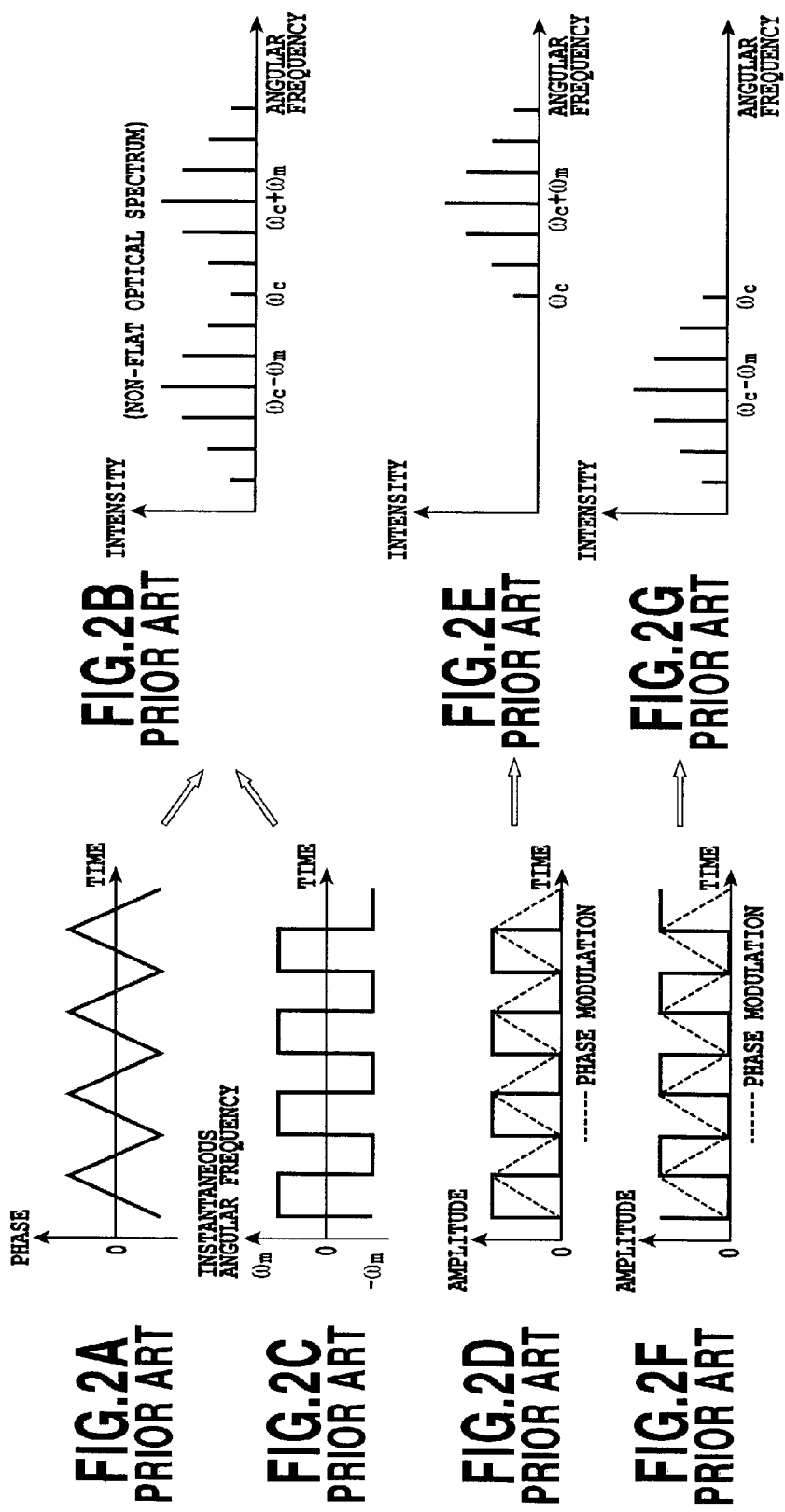
FIGS. 2A to 2G are diagrams useful in explaining the principle of flattening of an output light spectrum in the conventional multi-wavelength generator.

The temporal waveform of an output signal voltage from the period signal generator 23 is a crest-shaped function such as the one shown in the graph in FIG. 2A. Modulating the phase of light of a single central wavelength according to this function results in an output light spectrum such as the one shown in the graph in FIG. 2B. This will be described below.

The angular frequency of this phase modulation constitutes a square wave reciprocating between instantaneous values $\omega_m$ and $-\omega_m$ as shown in the graph in FIG. 2C. When those portions of the angular frequency of the square wave which are shown by the instantaneous value $\omega_m$ are repeatedly gated by an NRZ signal as shown in the graph in FIG. 2D, the resulting optical spectrum is as shown by the graph in FIG. 2E. That is, the optical frequency of the repeated NRZ signal is obtained in which the angular frequency is centered at $(\omega_c+\omega_m)$. Further, when those portions of the angular frequency of the square wave which are shown by the instantaneous value $-\omega_m$ are similarly gated as shown by the solid line in the graph in FIG. 2F, the resulting optical spectrum is as shown by the graph in FIG. 2G. That is, the optical frequency of the repeated NRZ signal is obtained in which the angular frequency is centered at $(\omega_c-\omega_m)$.

Figure 3:
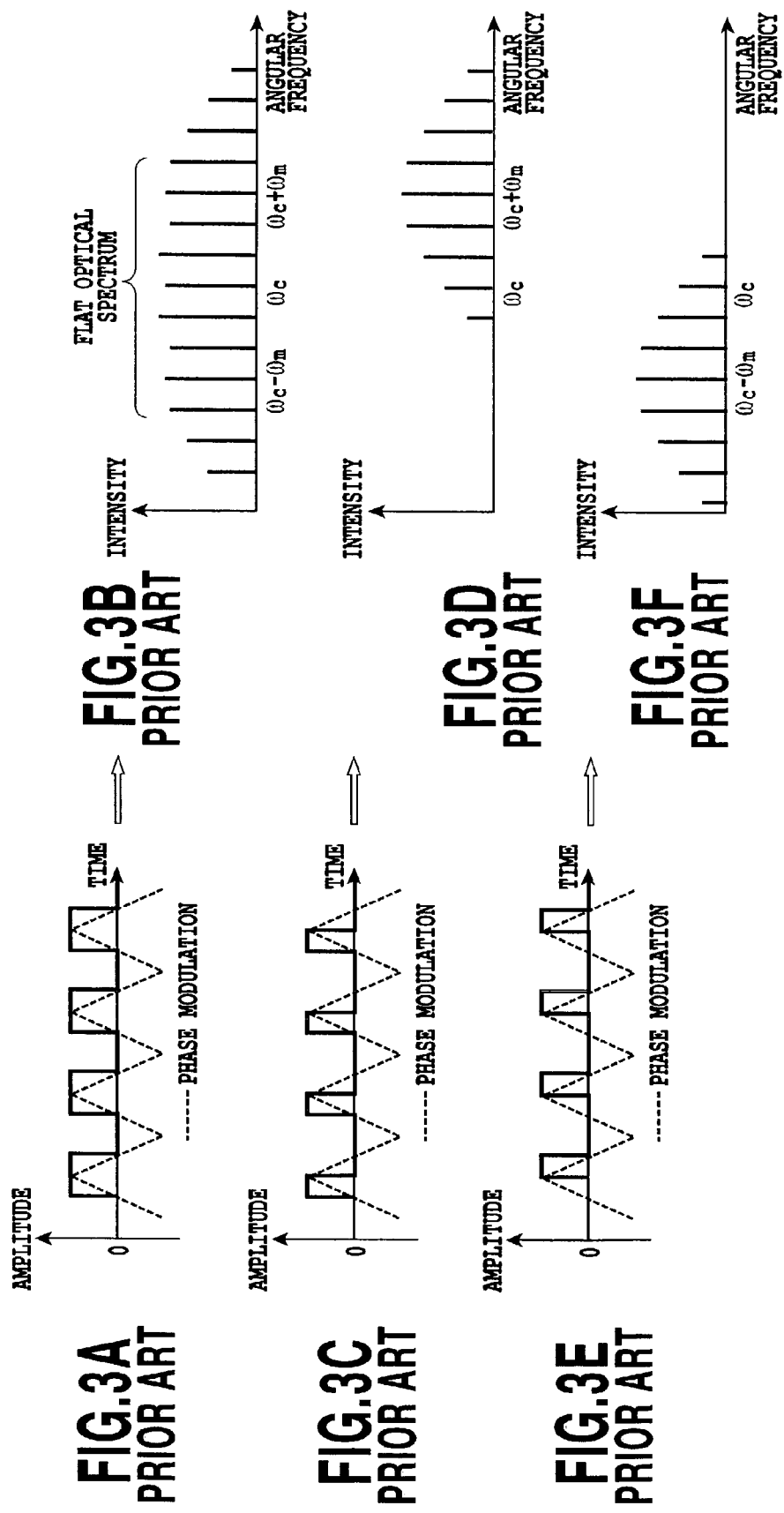
FIGS. 3A to 3F are diagrams useful in explaining the principle of flattening of an output light spectrum in the conventional multi-wavelength generator.

The superimposition of these optical spectra on the axis of angular frequency is as shown by the graph in FIG. 2B, which corresponds to the sum of the graphs in FIG. 2E and FIG. 2G. In this case, the optical spectrum has a lower intensity near the instantaneous value $\omega_c$ of the angular frequency, thereby hindering the optical spectrum from being flattened. Thus, the applied voltage and bias voltage in the period signal applied to each modulator is adjusted to flatten the optical spectrum as follows:

As shown in the graph in FIG. 3A, an output optical spectrum is assumed which is gated by a repeated NRZ signal so as to extend over the instantaneous values $\omega_m$ and $\omega_m$ of each frequency. Then, when those portions of the angular frequency which are shown by the instantaneous value $\omega_m$ are gated by a repeated RZ signal as shown by the solid line in the graph in FIG. 3C, the resulting optical spectrum is as shown by the graph in FIG. 3D. That is, the optical frequency of the repeated RZ signal is obtained in which the angular frequency is centered at $(\omega_c+\omega_m)$. Further, when those portions of the angular frequency which are shown by the instantaneous value $-\omega_m$ are similarly gated as shown by the solid line in the graph in FIG. 3E, the resulting optical spectrum is as shown by the graph in FIG. 3F. That is, the optical frequency of the repeated RZ signal is obtained in which the angular frequency is centered at $(\omega_c-\omega_m)$. Both optical spectra have a wider band than that of the above repeated NRZ signal.

The superimposition of these optical spectra on the axis of angular frequency is as shown by the graph in FIG. 3B. Thus, the resulting optical spectrum has a higher intensity even near the instantaneous value $\omega_c$ of the angular frequency. As a result, the output optical spectrum can be flattened. The flatness of the output optical spectrum can be increased by properly setting a period signal that modulates the amplitude and phase of light of a single central frequency and further adjusting the applied voltage and bias voltage in the period signal to modulate the intensity and phase.

Figure 4:
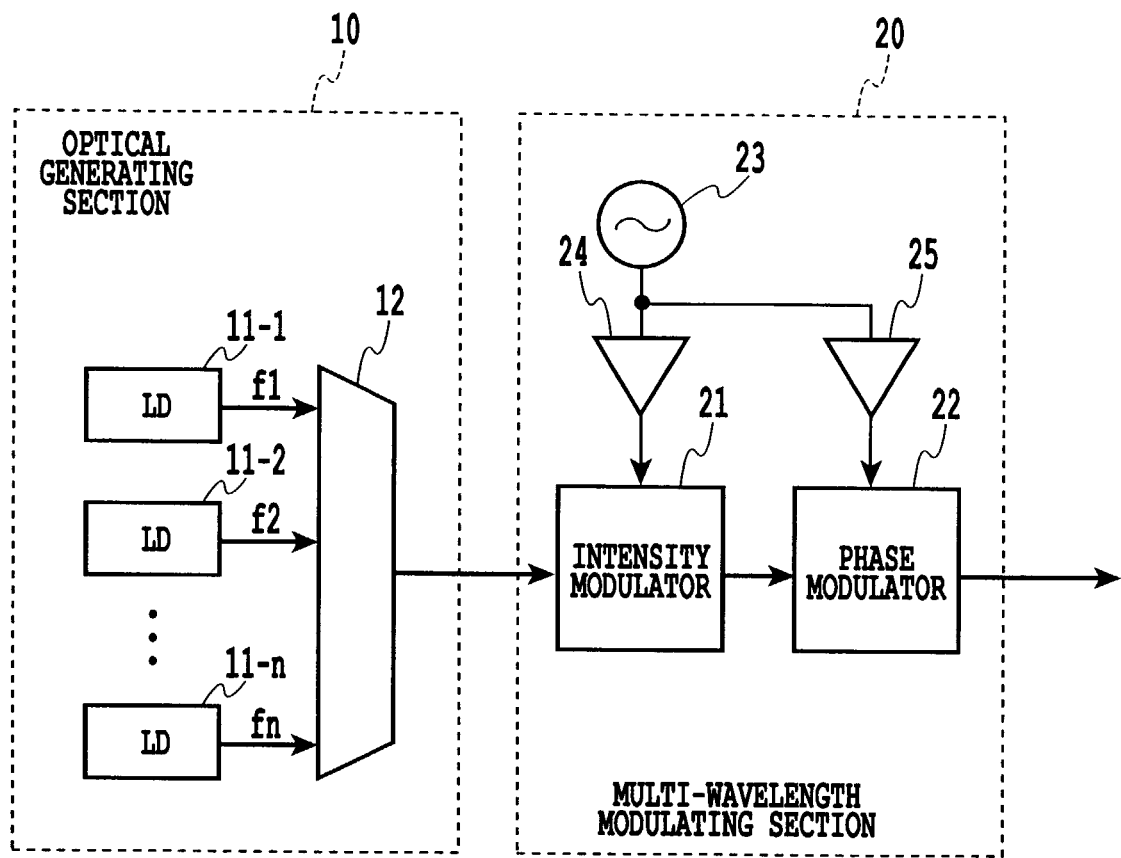
FIG. 4 is a diagram showing another example of a configuration of a conventional multi-wavelength generator.
Figure 5:
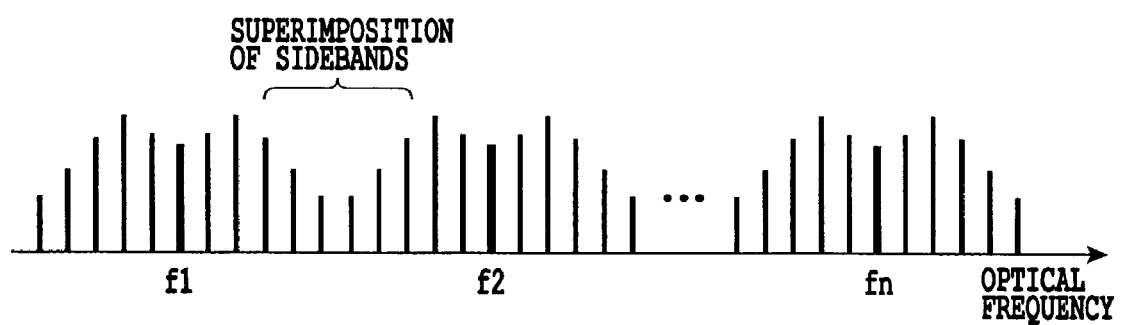
FIG. 5 is a diagram showing an output light spectrum in the example of the configuration of the conventional multi-wavelength generator.

As shown in FIG. 4, the optical generating section 10 may comprise n semiconductor lasers (LD) 11-1 to 11-n that generate lights of optical frequencies f1 to fn spaced at even intervals, and a multiplexer 12 that multiplexes the laser lights into output light. In this case, as shown in FIG. 5, the multi-wavelength modulating section 20 generates sidebands around each central frequency and can further generate multi-wavelength light over a wide band at once. This configuration enables the number of sidebands to be increased by installing an additional light source at an input port of the multiplexer 12. Therefore, this configuration allows additional components to be easily installed.

With the multi-wavelength generator shown in FIG. 4, sidebands generated around the central wavelengths of a plurality of light sources may disadvantageously be superimposed on one another. To avoid this problem, the optical frequency of each light source must be spaced at sufficiently large intervals. Alternatively, it is necessary to remove unwanted sidebands generated around the central wavelength of each light source.

Embodiments of the present invention will be described below with reference to the drawings. In the drawings, components having similar functions are denoted by the same reference numerals.

(Embodiment 1-1)

Figure 6:
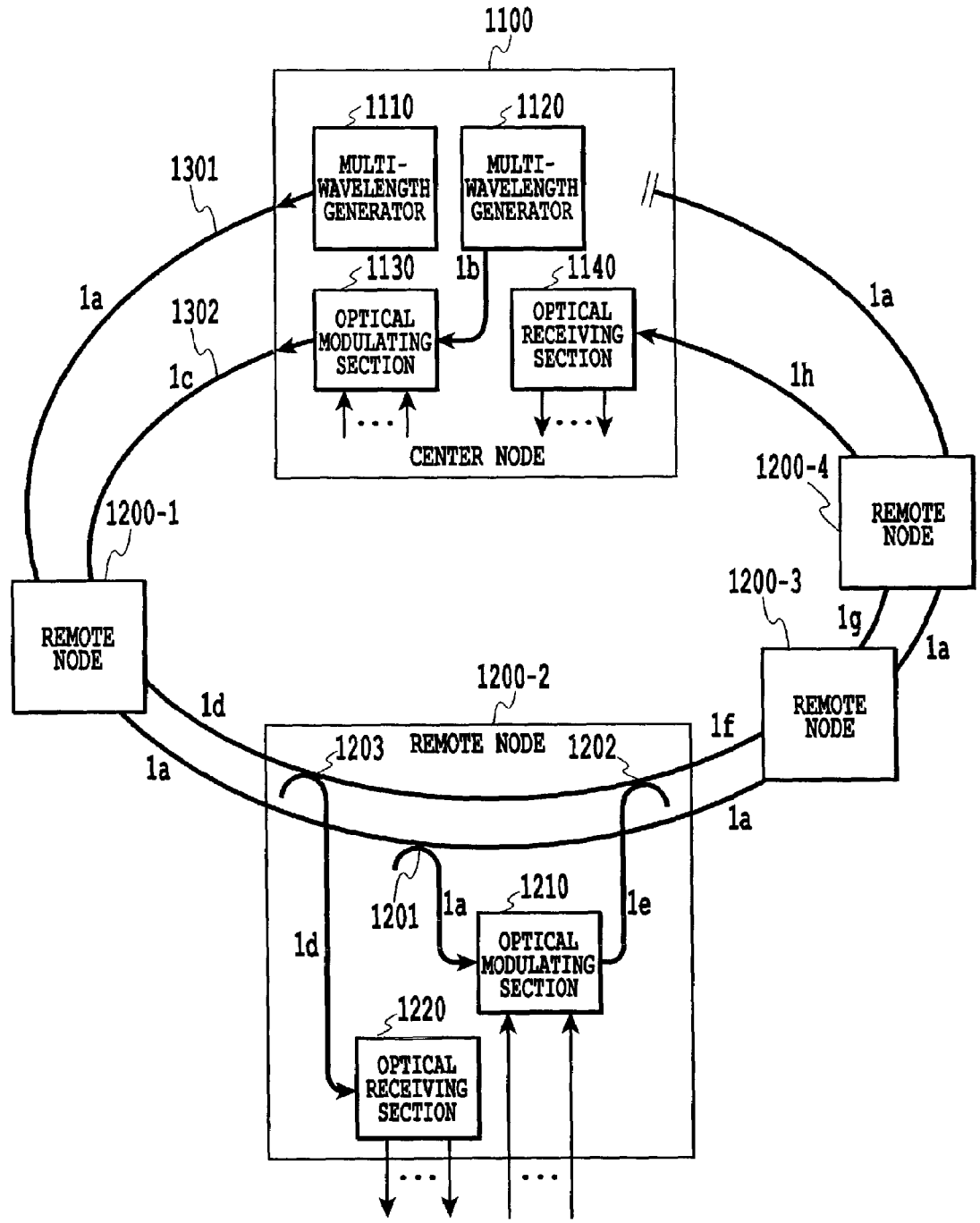
FIG. 6 is a block diagram showing Embodiment 1-1 of a WDM ring network according to the present invention.

FIG. 6 shows Embodiment 1-1 of a WDM ring network according to the present invention.

In the figure, a center node 1100 and remote nodes 1200-1 to 1200-4 are connected together in ring form via two optical fiber transmission paths 1301 and 1302. The optical fiber transmission 1301 is used to transmit continuous-wave lights for upstream signal lights from the center node to each remote node. The optical fiber transmission path 1302 is used to transmit downstream signal lights from the center node to each remote node and to transmit upstream signal lights (obtained by modulating continuous-wave lights) from each remote node to the center node. However, the remote nodes always communicate with each other via the center node. That is, the remote node modulates continuous-wave lights on the optical fiber transmission path 1301, and transmits the resultant upstream signal lights to the center node via the optical fiber transmission path 1302. Then, the center node transmits this light to each remote node via the optical fiber transmission path 1302 as downstream signal lights. In this manner, the remote nodes communicate with each other.

Figure 7:
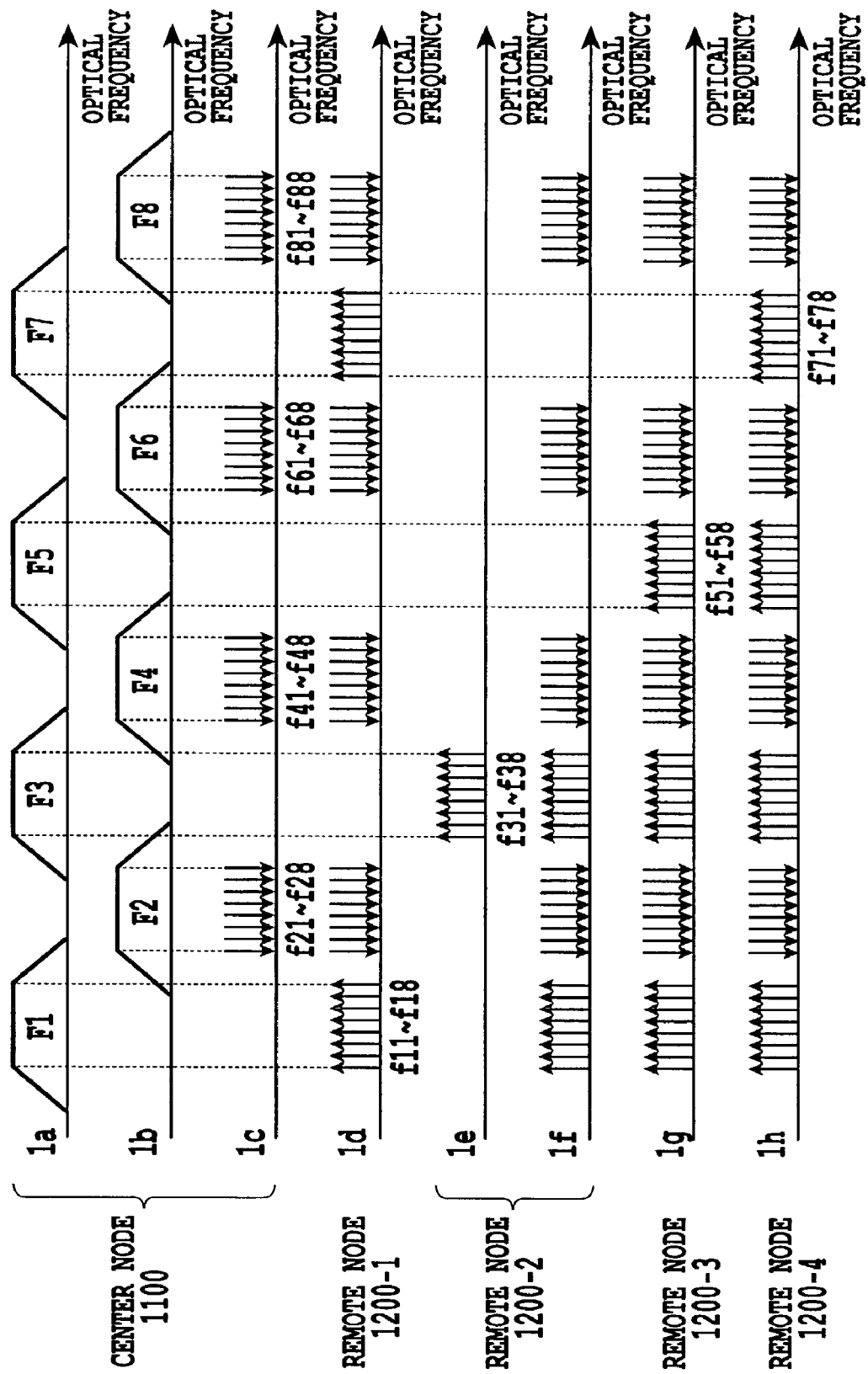
FIG. 7 is a diagram showing the signal state of each point in the WDM ring network.
Figure 8:
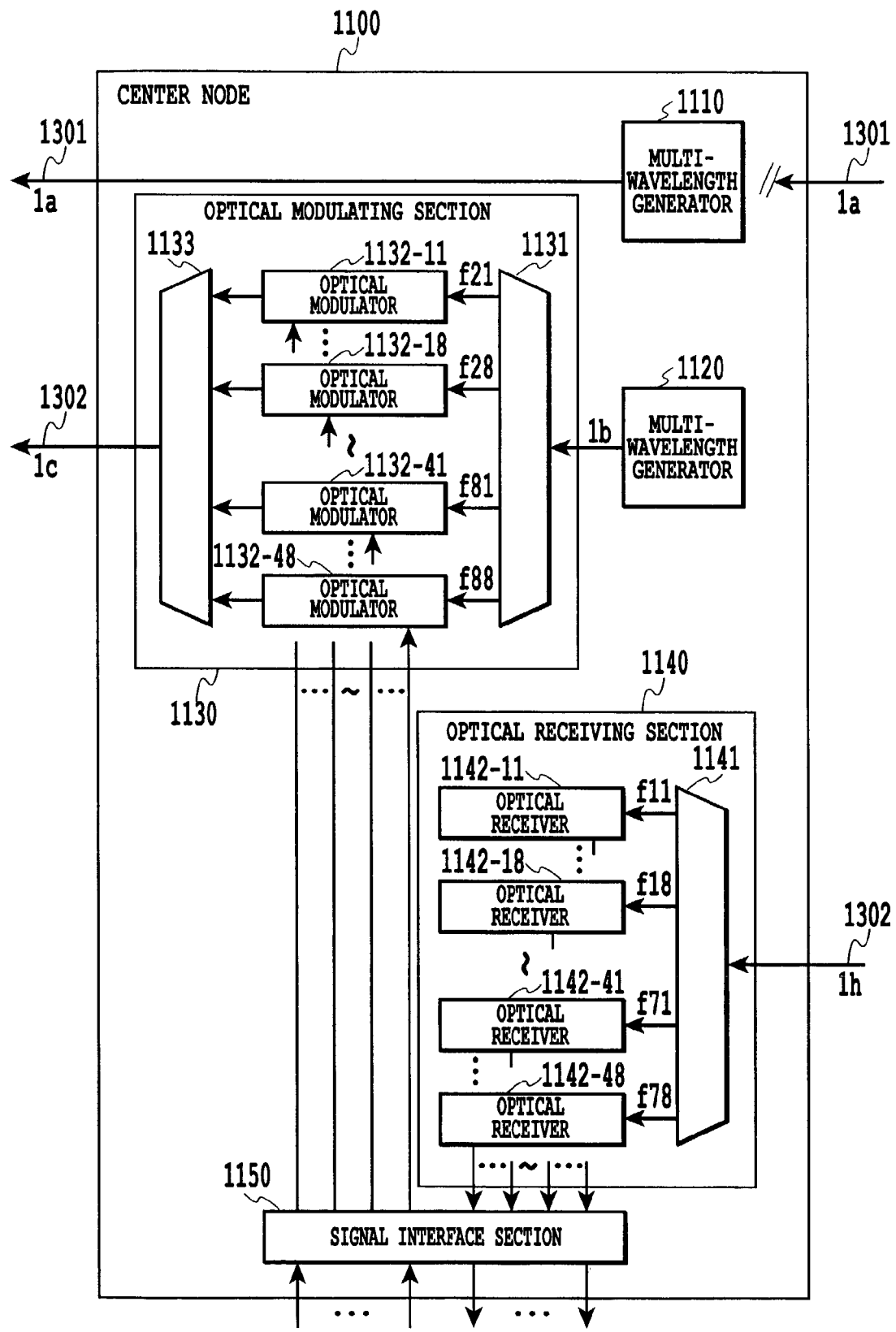
FIG. 8 is a block diagram showing an example A of a configuration of a center node 1100.
Figure 9:
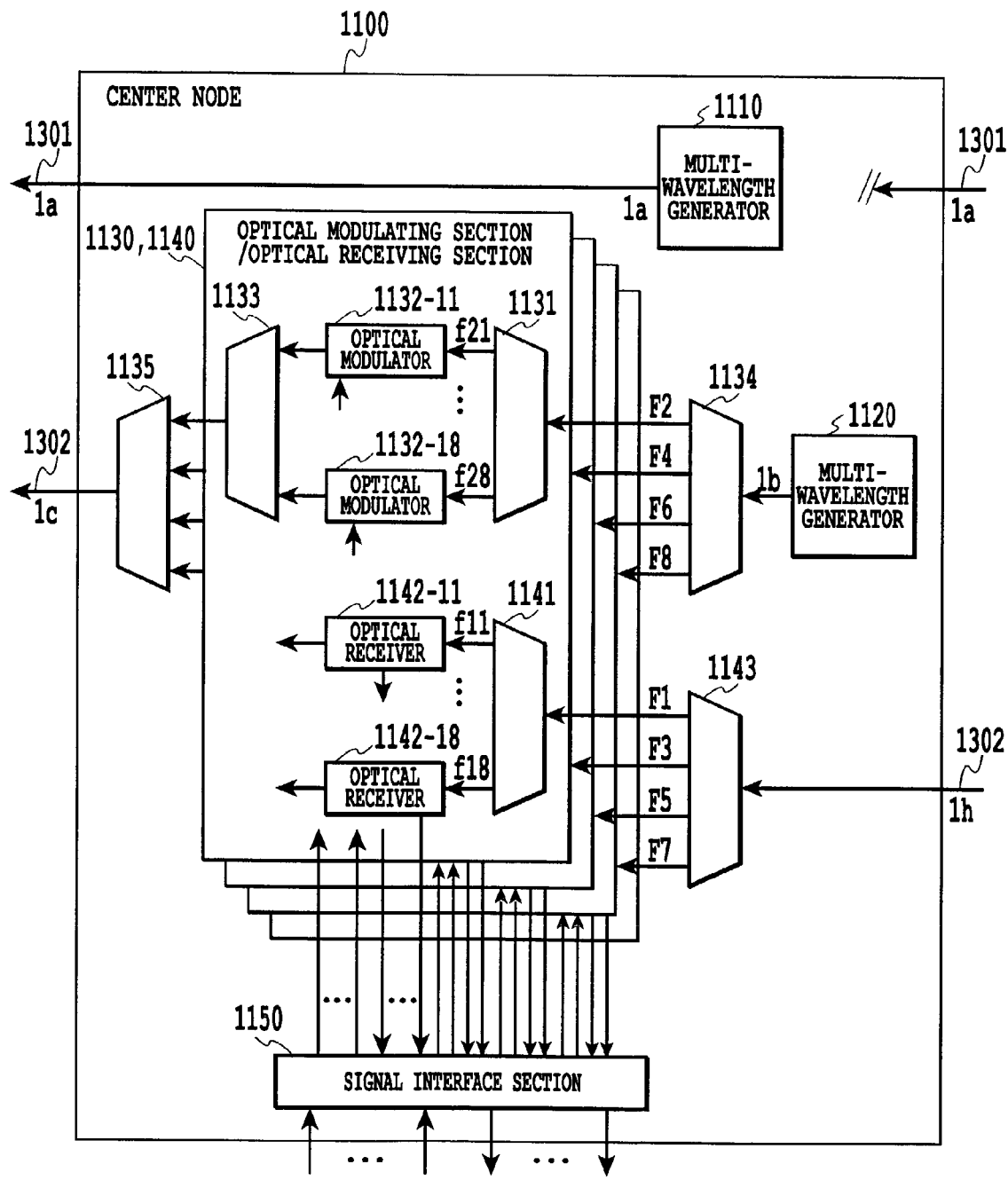
FIG. 9 is a block diagram showing an example B of a configuration of the center node 1100.
Figure 10:
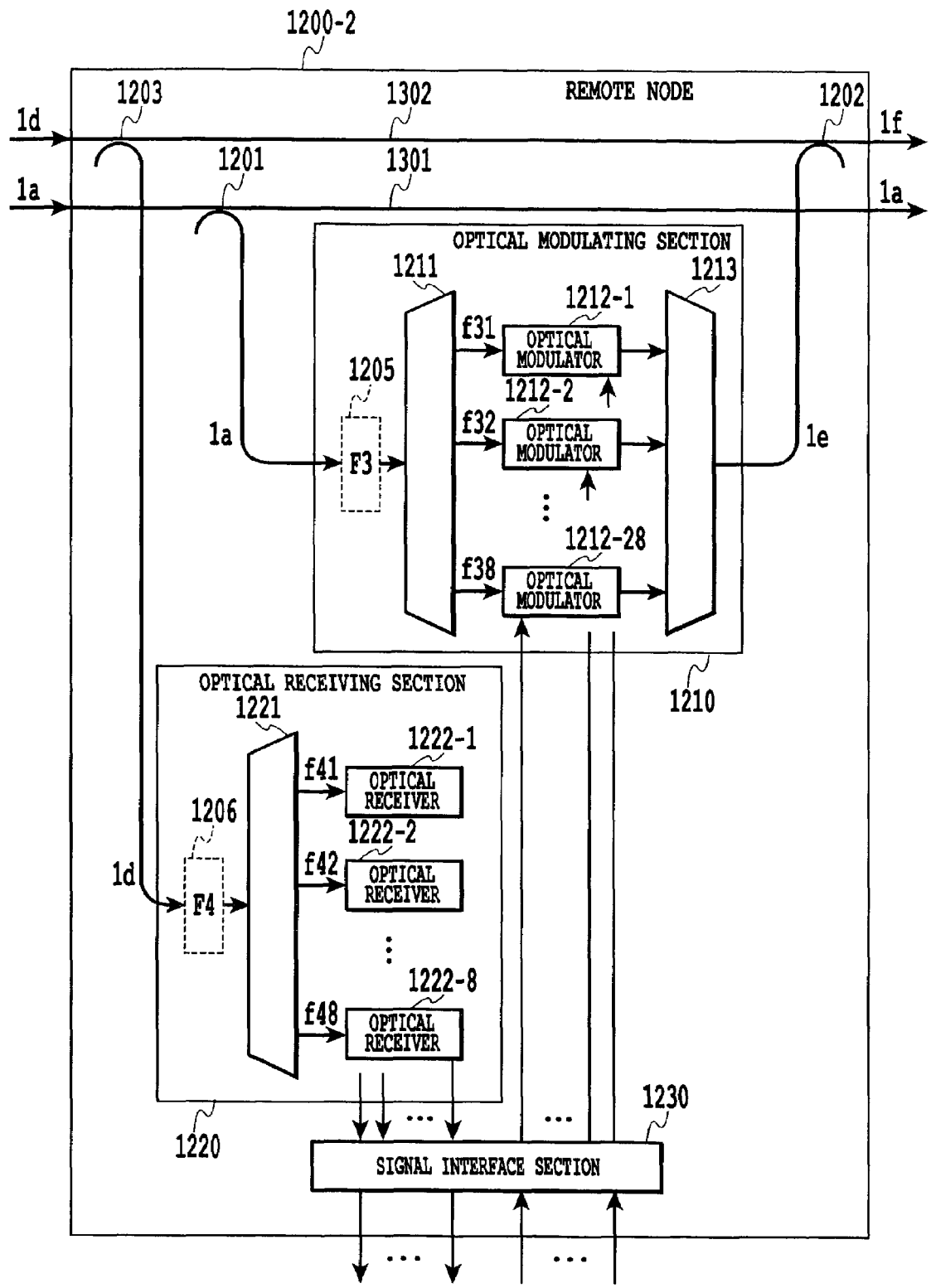
FIG. 10 is a block diagram showing an example A of a configuration of a remote node 1200-2.
Figure 11:
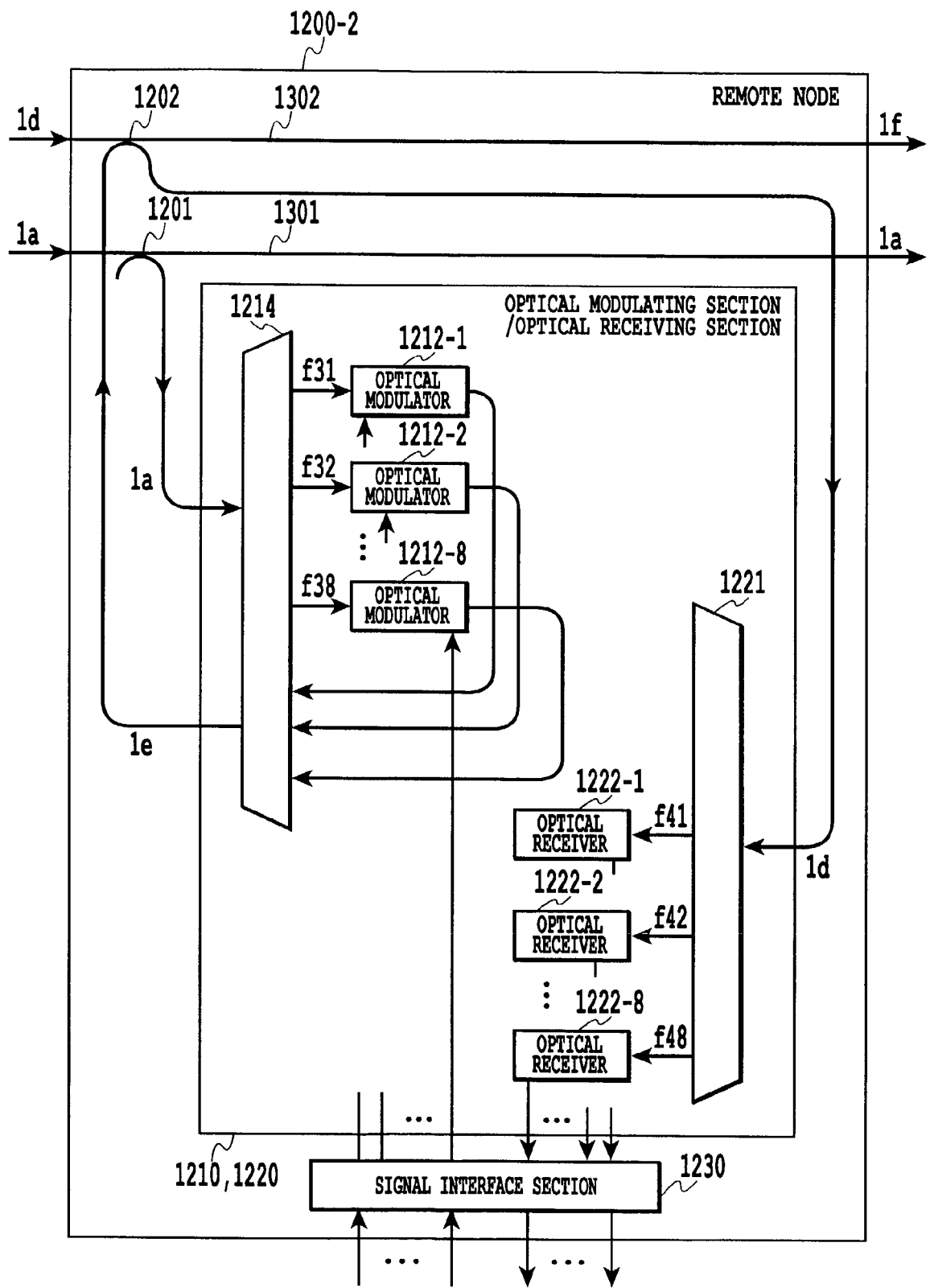
FIG. 11 is a block diagram showing an example B of a configuration of the remote node 1200-2.
Figure 12:
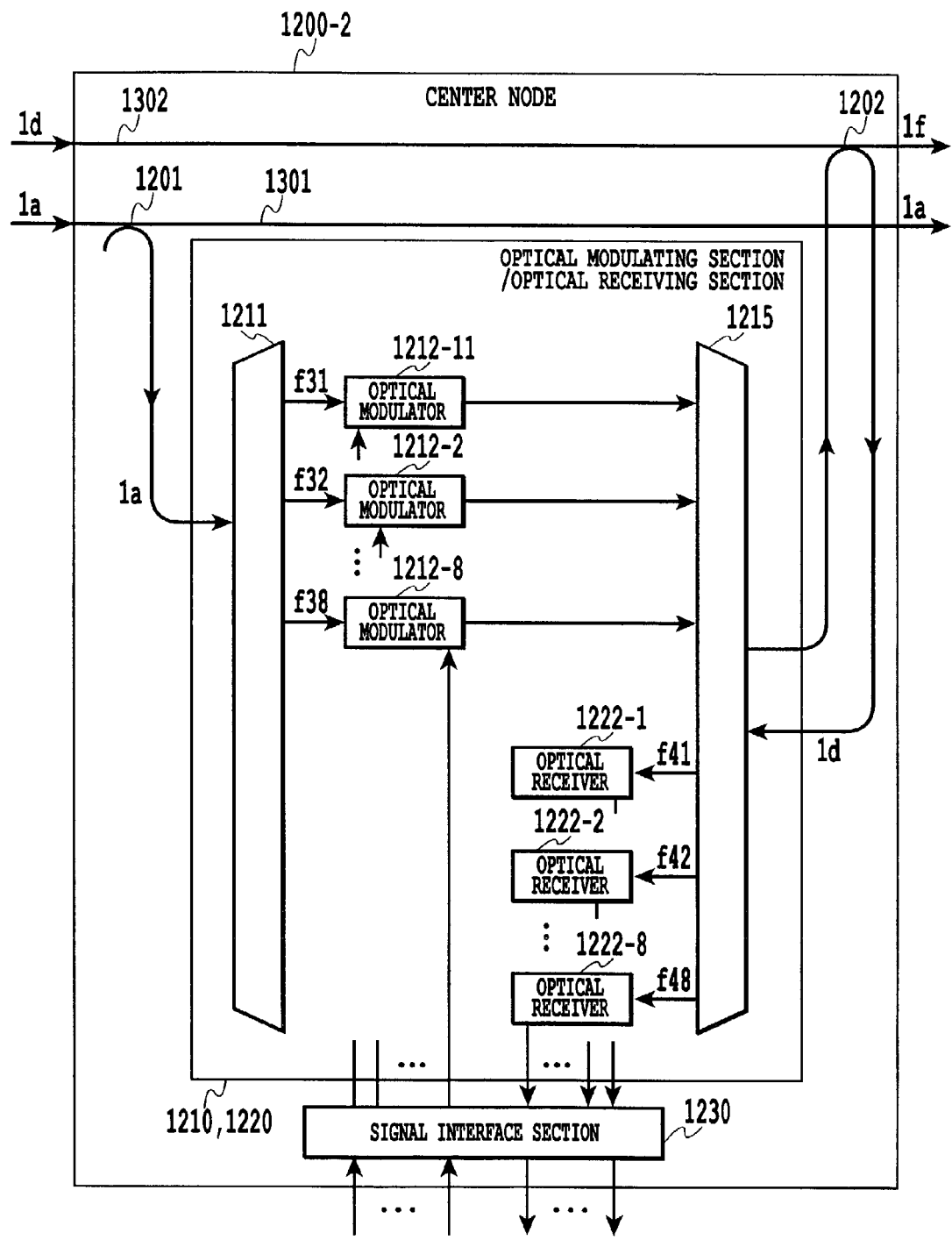
FIG. 12 is a block diagram showing an example C of a configuration of the remote node 1200-2.

This embodiment is characterized in that specific wavelength bandwidths are allocated to each remote node as continuous-wave lights and signal light and in that the wavelength bandwidths for the continuous-wave lights (for upstream signal lights) and the downstream signal lights are alternately set. Specifically, description will be given with reference to FIGS. 7 to 12. FIG. 7 shows the signal state of each point of the WMD ring network. FIGS. 8 and 9 shows examples A and B of configurations of the center node 1100. FIGS. 10 to 12 show examples A, B, and C of configurations of the remote node 1200-2. The configurations of the other remote nodes are similar.

(Example A of Configuration of Center Node 1100)

The example A of the configuration of the center node 1100 will be described with reference to FIGS. 6 and 8. The center node 1100 is composed of a multi-wavelength generator 1110 that acts as a light source of continuous-wave lights transmitted to the optical fiber transmission path 1301, a multi-wavelength generator 1120 that generates downstream signal lights transmitted to the optical fiber transmission path 1302, an optical modulating section 1130, an optical receiving section 1140 that receives upstream signal lights from the optical fiber transmission path 1302, and a signal interface section 1150 that interfaces an upstream signal with a downstream signal.

The multi-wavelength generators 1110 and 1120 are constructed as shown in FIG. 4 and are in this case composed of eight semiconductor lasers (LD) 11, a multiplexer 12, and a multi-wavelength modulating section 20 for four remote nodes. However, if the eight semiconductor lasers 11 have oscillating optical frequencies f1, f2, f3, . . . f8 spaced at even intervals, then the multi-wavelength generator 1110 uses semiconductor lasers having odd-number oscillating optical frequencies f1, f3, f5, and f7. In contrast, the multi-wavelength generator 1120 uses semiconductor lasers having even-number oscillating optical frequencies f2, f4, f6, and f8. In this case, as shown in FIG. 7, bandwidths of multi-wavelength light output 1a by the multi-wavelength generator 1110 are defined as F1, F3, F5, and F7. Further, bandwidths of multi-wavelength light output 1b by the multi-wavelength generator 1120 are defined as F2, F4, F6, and F8. Then, each wavelength bandwidth (oscillating optical frequencies of each semiconductor laser) is set so that the signal bands of eight waves used as wavelength channels are adjacent to each other so as not to be superimposed on each other. An optical filter or the like is used to remove unwanted sidebands generated at each of the eight waves used as wavelength channels.

Multi-wavelength light 1a output by the multi-wavelength generator 1110 is sent out to the optical fiber transmission path 1301 as upstream signal lights for each remote node without being modulated. The multi-wavelength light 1a travels around the optical fiber transmission path 1301 to return to the center node 1100, where it is optically terminated.

Multi-wavelength light 1b output by the multi-wavelength generator 1120 is input to the optical modulating section 1130. The optical modulating section 1130 uses a demultiplexer 1131 to demultiplex the multi-wavelength light 1b into lights of a plurality of (8 waves×4 remote nodes) wavelength channels, and uses optical modulators 1132-11 to 1132-18, . . . , 1132-41 to 1132-48 to modulate the lights of the wavelength channels (f21 to f28, f41 to f48, f61 to f68, f81 to f88). The optical modulating section 1130 then uses a multiplexer 1133 to multiplex the wavelengths of the modulated lights, and sends out the resultant downstream signal lights 1c to the optical fiber transmission path 1302 (in FIG. 7, this is shown by downward arrows). In this case, unwanted sidebands of the multi-wavelength light 1b are removed owing to the multiplexing and demultiplexing characteristics of the demultiplexer 1131 and multiplexer 1133.

Remote nodes 1200-1 to 1200-4 demultiplex, before reception, signal lights of the wavelength channels f21 to f28 of the wavelength bandwidth F2, signal lights of the wavelength channels f41 to f48 of the wavelength bandwidth F4, signal lights of the wavelength channels f61 to f68 of the wavelength bandwidth F6, and signal lights of the wavelength channels f81 to f88 of the wavelength bandwidth F8, respectively, the wavelength bands being allocated to the corresponding remote nodes from the downstream signal lights 1c from the optical fiber transmission path 1302. Furthermore, the remote nodes 1200-1 to 1200-4 demultiplex continuous-wave lights of wavelength channels f11 to f18 of the wavelength bandwidth F1, continuous-wave lights of wavelength channels f31 to f38 of the wavelength bandwidth F3, continuous-wave lights of wavelength channels f51 to f58 of the wavelength bandwidth F5, and continuous-wave lights of wavelength channels f71 to f78 of the wavelength bandwidth F7, respectively, the wavelength bands being allocated to the corresponding remote nodes from the multi-wavelength light 1a from the optical fiber transmission path 1301, and send out the resultant upstream signal lights modulated to the optical fiber transmission path 1302. In this case, as shown at 1d, 1f, 1g, and 1h in FIG. 7, the upstream signal lights of the wavelength bands F1, F3, F5, and F7 sequentially merge with the downstream signal lights of the wavelength bands F2, F4, F6, and F8. The merged lights then reach the center node 1100 (the configuration of the remote node will be described later).

The optical receiving section 1140 of the center node 1100 uses a demultiplexer 1141 to demultiplex the upstream signal lights 1h from the optical fiber transmission path 1302 into signal lights of the wavelength channels. The optical receiving section 1140 then uses optical receivers 1142-11 to 1142-18, . . . , or 1142-41 to 1142-48 corresponding to the remote node to receive the signal lights of the wavelength channels (f11 to f18, f31 to f38, f51 to f58, and f71 to f78). The optical receivers 1142-11 to 1142-18, . . . , 1142-41 to 1142-48 and the optical modulators 1132-11 to 1132-18, . . . , 1132-41 to 1132-48 are each connected to the signal interface section 1150. The signal interface section 1150 controls connections of signals between the remote nodes and to other networks.

For the demultiplexer 1131 and multiplexer 1133 of the optical modulating section 1130 and the demultiplexer 1141 of the optical receiving section 1140, one multiplexer/demultiplexer can be used in place of arbitrary two or three of these components by, for example, using an arrayed waveguide grating (AWG) as the multiplexer/demultiplexer and properly setting an input and output ports.

(Example B of Configuration of Center Node 1100)

Now, an example B of a configuration of the center node 1100 will be described with reference to FIG. 9. This example B is characterized in that for each remote node, the optical modulators 1132 and optical receivers 1142 in the example A are combined into an optical modulating 1130/an optical receiving section 1140. Multi-wavelength light from the multi-wavelength generator 1120 is demultiplexed into the wavelength bands F2, F4, F6, and F8 by a wavelength-group demultiplexer 1134. Multi-wavelength light of the wavelength band F2 is demultiplexed into lights of the wavelength channels f21 to f28 by the demultiplexer 1131 of the optical modulating section 1130/optical receiving section 1140 corresponding to the remote node 1200-1. The resultant lights are modulated by the optical modulators 1132-11 to 1132-18, and the modulated lights have their wavelengths multiplexed by the multiplexer 1133. The wavelength-multiplexed light of each wavelength bandwidth from the optical modulating section 1130/optical receiving section 1140 corresponding to the remote node have its wavelength multiplexed by the group multiplexer. The resultant downstream signal lights is then sent out to the optical fiber transmission path 1302.

Upstream signal lights 1h from the optical fiber transmission path 1302 is demultiplexed into the wavelength bandwidths F1, F3, F5, and F7 by a group demultiplexer 1143. Upstream signal lights of the wavelength bandwidth F1 is demultiplexed into signal lights of the wavelength channels f11 to f18 by the demultiplexer 1141 of the optical modulating section 1130/optical receiving section 1140 corresponding to the remote node 1200-1. These signal lights are received by the corresponding optical receivers 1142-11 to 1142-18. The optical receivers 1142-11 to 1142-18, . . . , 1142-41 to 1142-48 and the optical modulators 1132-11 to 1132-18, . . . , 1132-41 to 1132-48 are each connected to a signal interface section 1150. The signal interface section 1150 controls connections of signals between the remote nodes and to other networks.

For the demultiplexer 1131, multiplexer 1133, and demultiplexer 1141 of the optical modulating section 1130/optical receiving section 1140, one multiplexer/demultiplexer can be used in place of arbitrary two or three of these components by, for example, using an arrayed waveguide grating (AWG) as the multiplexer/demultiplexer and properly setting an input and output ports.

(Example A of Configuration of Remote Node 1200-2)

Now, an example A of a configuration of the remote node 1200-2 will be described with reference to FIGS. 6 and 10. The remote node 1200-2 is composed of an optical coupler 1201 that splits the multi-wavelength light (continuous-wave lights) 1a transmitted over the optical fiber transmission path 1301, an optical modulating section 1210 that demultiplexes the continuous-wave lights of the wavelength channels f31 to f38 of the wavelength bandwidth F3 allocated to the remote node 1200-2 and modulates the resultant lights to generate the upstream signal lights 1e, an optical coupler 1202 that couples this upstream signal lights 1e to the optical fiber transmission path 1302, an optical coupler 1203 that splits downstream signal lights 1d from the optical fiber transmission path 1302, an optical receiving section 1220 that receives signal lights of the wavelength channels f41 to f48 of the wavelength bandwidth F4 belonging to the split downstream signal lights 1d and allocated to the remote node 1200-2, and a signal interface section 1230 that connects a downstream signal to a user terminal (not shown) and connects an upstream signal from the user terminal to the optical modulating section 1210.

The optical modulating section 1210 uses an optical filter 1205 to demultiplex the wavelength bandwidth F3 belonging to the split multi-wavelength light 1a from the optical fiber transmission path 1301 and allocated to the remote node 1200-2, and uses a demultiplexer 1211 to demultiplex continuous-wave lights of the wavelength channels f31 to f38 from the wavelength bandwidth F3. The optical modulating section 1210 then uses the optical modulators 1212-1 to 1212-8 to modulate the continuous-wave lights, uses the multiplexer 123 to multiplex the wavelengths of the modulated lights, and then sends out the resultant upstream signal lights 1e to the optical fiber transmission path 1302 (in FIG. 7, this is shown by upward arrows). In this case, unwanted sidebands of the wavelength bandwidth F3 of the multi-wavelength light 1a are removed owing to the multiplexing/demultiplexing characteristics of the demultiplexer 1211 and multiplexer 1213.

The optical receiving section 1220 uses an optical filter 1206 to demultiplex the wavelength bandwidth F4 allocated to the remote node 1200-2 from the split downstream signal lights 1d from the optical fiber transmission path 1302, and then uses a demultiplexer 1221 to demultiplex signal lights of the wavelength channels f41 to f48 from the wavelength bandwidth F4. Subsequently, the optical receiving section 1220 uses optical receivers 1222-1 to 1222-8 to receive the signal lights. The optical receivers 1222-1 to 1222-8 and the optical modulators 1212-1 to 1212-8 are each connected to a terminal (not shown) via the signal interface section 1230.

In this regard, the optical filter 1205 is not always required provided that the optical demultiplexer 1211 is constructed to demultiplex only the wavelength bandwidths allocated to the remote node from the multi-wavelength light 1a on the optical fiber transmission path 1301. This also applies to the optical filter 1206. In the following description of examples of configurations, the optical filters 1205 and 1206 are assumed to be absent.

(Example B of Configuration of Remote Node 1200-2)

Now, an example B of a configuration of the remote node 1200-2 will be described with reference to FIG. 11. This example B is characterized in that the demultiplexer 1211 and multiplexer 1213 in the optical modulating section 1210 in the example A are combined into a multiplexer/demultiplexer 1214 using an arrayed waveguide grating (AWG). The optical receiving section 1220 is similar to that in the example A. However, in this example, the split downstream signal lights 1d is provided by an empty port of the optical coupler 1202 that connects the upstream signal lights 1e to the optical fiber transmission path 1302, and is then connected to the demultiplexer 1221 of the optical receiving section 1220. This is also possible with the example A.

The optical modulating section 1210 of this example inputs the split multi-wavelength light 1a from the optical fiber transmission path 1301 to the multiplexer/demultiplexer 1214, and then demultiplexes continuous-wave lights of the wavelength channels f31 to f28 of the wavelength bandwidth F3 allocated to the remote node 1200-2. The resultant lights are modulated by the optical modulators 1212-1 to 1212-8, respectively, and the modulated lights are returned to the multiplexer/demultiplexer 1214 for wavelength multiplexing. The resultant upstream signal lights 1e is then sent out to the optical fiber transmission path 1302. A configuration such as the one shown in FIG. 11 is obtained by using an AWG as the multiplexer/demultiplexer 1214 and properly selecting an input and output ports depending on the wavelength channels f31 to f38.

(Example C of Configuration of Remote Node 1200-2)

Now, an example C of a configuration of the remote node 1200-2 will be described with reference to FIG. 12. This example C is characterized in that the multiplexer 1213 of the optical modulating section 1210 and the demultiplexer 1221 of the optical receiving section 1220 both in the example A are combined into a multiplexer/demultiplexer 1215 using an arrayed waveguide grating (AWG). However, in this example, the split downstream signal lights 1d is provided by the empty port of the optical coupler 1202 that couples the upstream signal lights 1e to the optical fiber transmission path 1302, and is then connected to the multiplexer/demultiplexer 1215.

The optical modulating section 1210/optical receiving section 1220 of this example inputs the split multi-wavelength light 1a from the optical fiber transmission path 1301 to the demultiplexer 1211, and then demultiplexes continuous-wave lights of the wavelength channels f31 to f28 of the wavelength bandwidth F3 allocated to the remote node 1200-2. The resultant lights are modulated by the optical modulators 1212-1 to 1212-8, respectively, and the modulated lights are returned to the multiplexer/demultiplexer 1215 for wavelength multiplexing. The resultant upstream signal lights 1e is then sent out to the optical fiber transmission path 1302. Further, the split downstream signal lights 1d from the optical fiber transmission path 1302 is input to the multiplexer/demultiplexer 1215, and is demultiplexed into signal lights of the wavelength channels f41 to f48 of the wavelength bandwidth F4 allocated to the remote node 1200-2. The resultant lights are received by the optical receivers 1222-1 to 1222-8, respectively. A configuration such as the one shown in FIG. 12 is obtained by using an AWG as the multiplexer/demultiplexer 1215 and properly selecting an input and output ports depending on the wavelength channels f31 to f38 and f41 to f48. Alternatively, an optical circulator may be used so that a common port can be used as both output port for the upstream signal lights 1e and input port for the downstream signal lights 1d.

In the first embodiment, shown above, one wavelength bandwidth is allocated to each of the four remote nodes for each of the upstream signal lights and the downstream signal lights. However, the number of remote nodes and the number and arrangement of wavelength bandwidths allocated to each node are arbitrary. However, if for example, the wavelength bandwidths F2 and F4 are allocated to a certain remote node for downstream signal lights, the demultiplexer 1221 of the optical receiving section 1220 may be able to obtain the wavelength channels of the two wavelength bandwidths through demultiplexing, or an independent demultiplexer may be used for each wavelength bandwidth. This also applies to the configuration of the optical modulating section 1210. Further, the eight wavelength channels are set for each wavelength bandwidth. However, the number of wavelength channels is arbitrary.

Further, only the minimum required arrangements are shown for the center node 1100 in FIGS. 8 and 9 and for the remote node 1200-2 in FIGS. 10 to 12. However, for example, an optical amplifier, optical equalizing means for making the optical power of the wavelength channels uniform, an optical bandpass filter that removes ASE light, or the like may be arranged at predetermined positions.

Further, in this embodiment, the direction in which light is transmitted through the optical fiber transmission path 1301, used to transmit multi-wavelength light from the center node to each remote node, is the same as the direction in which light is transmitted through the optical fiber transmission path 1302, used to transmit downstream signal lights from the center node to each remote node and to transmit upstream signal lights from each remote node to the center node (in the figure, leftward). However, light maybe transmitted in different directions. That is, each remote node may modulate multi-wavelength light transmitted via the optical fiber transmission path 1301 and then returns the resultant upstream signal lights to the center node via the optical fiber transmission path 1302.

(Embodiment 1-2)

Figure 13:
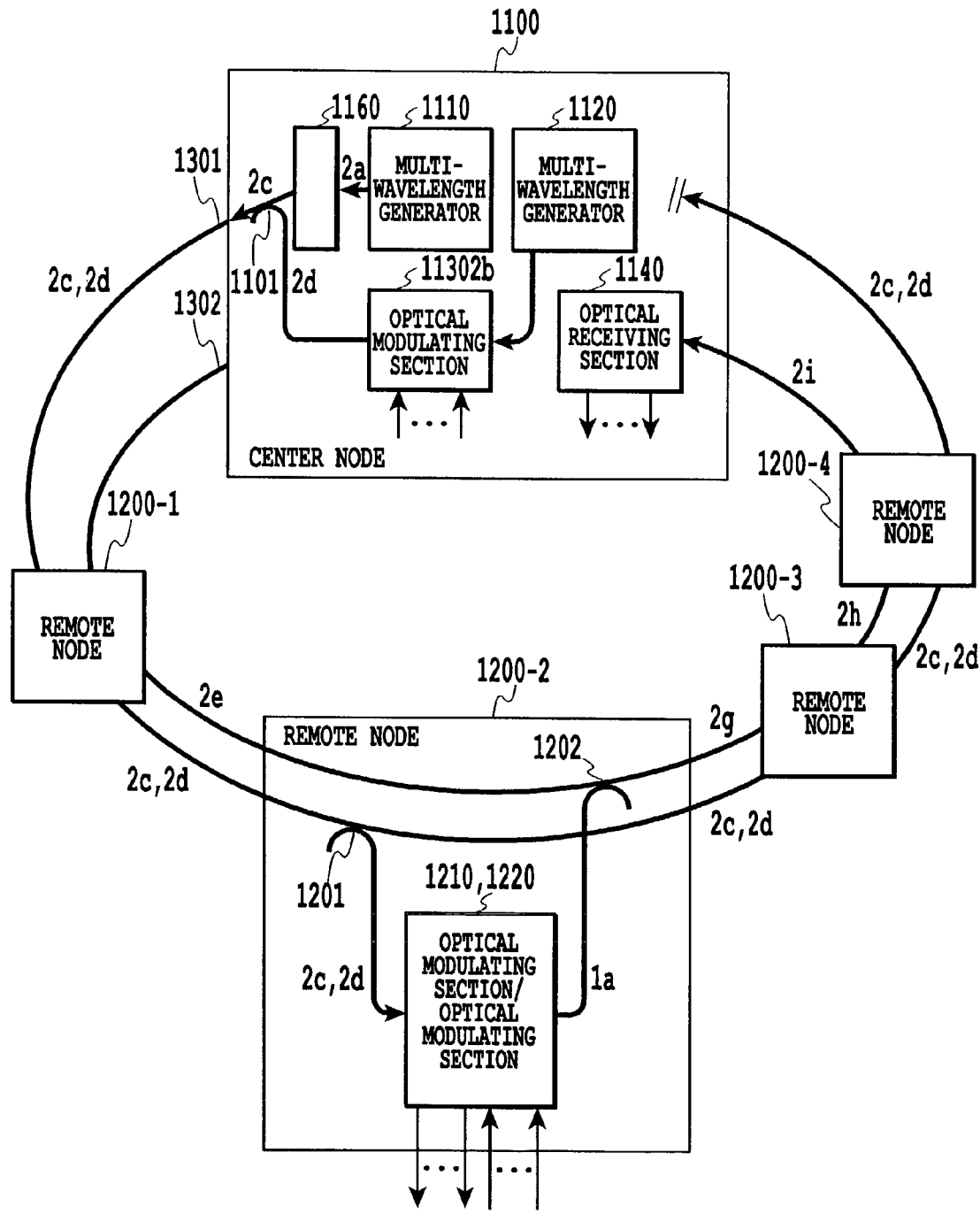
FIG. 13 is a block diagram showing Embodiment 1-2 of the WDM ring network according to the present invention.

FIG. 13 shows Embodiment 1-2 of the WDM ring network according to the present invention.

In the figure, the center node 1100 and the remote nodes 1200-1 to 1200-4 are connected together in ring form via the two optical fiber transmission paths 1301 and 1302. The optical fiber transmission 1301 is used to transmit continuous-wave lights for upstream signal lights from the center node to each remote node and to transmit downstream signal lights from the center node to each remote node. The optical fiber transmission path 1302 is used to transmit upstream signal lights (obtained by modulating continuous-wave lights) from each remote node to the center node. However, the remote nodes always communicate with each other via the center node. That is, the remote node modulates continuous-wave lights on the optical fiber transmission path 1301, and transmits the resultant upstream signal lights to the center node via the optical fiber transmission path 1302. Then, the center node transmits this light to each remote node via the optical fiber transmission path 1301 as downstream signal lights. In this manner, the remote nodes communicate with each other.

Figure 14:
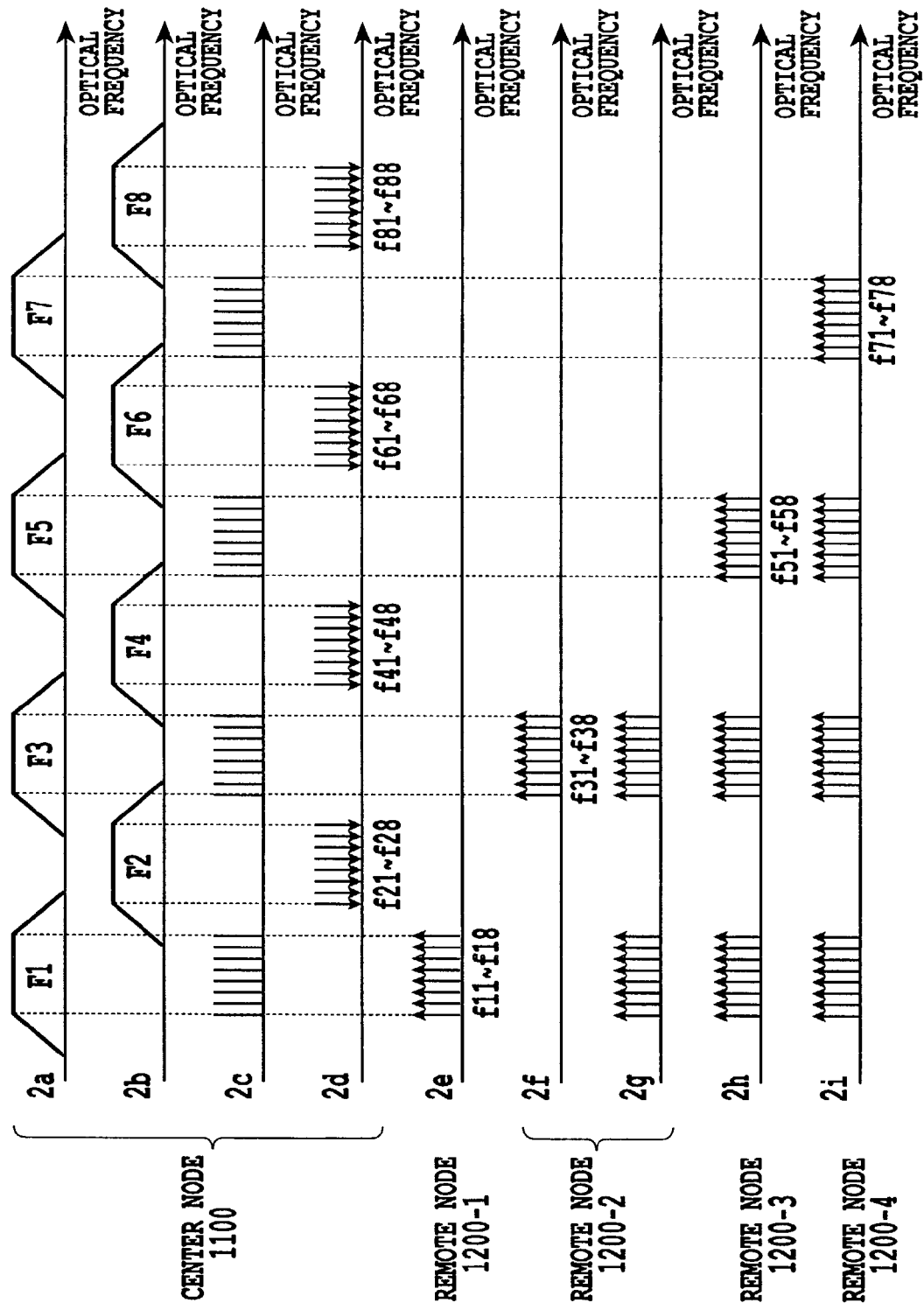
FIG. 14 is a diagram showing the signal state of each point in the WDM ring network.
Figure 15:
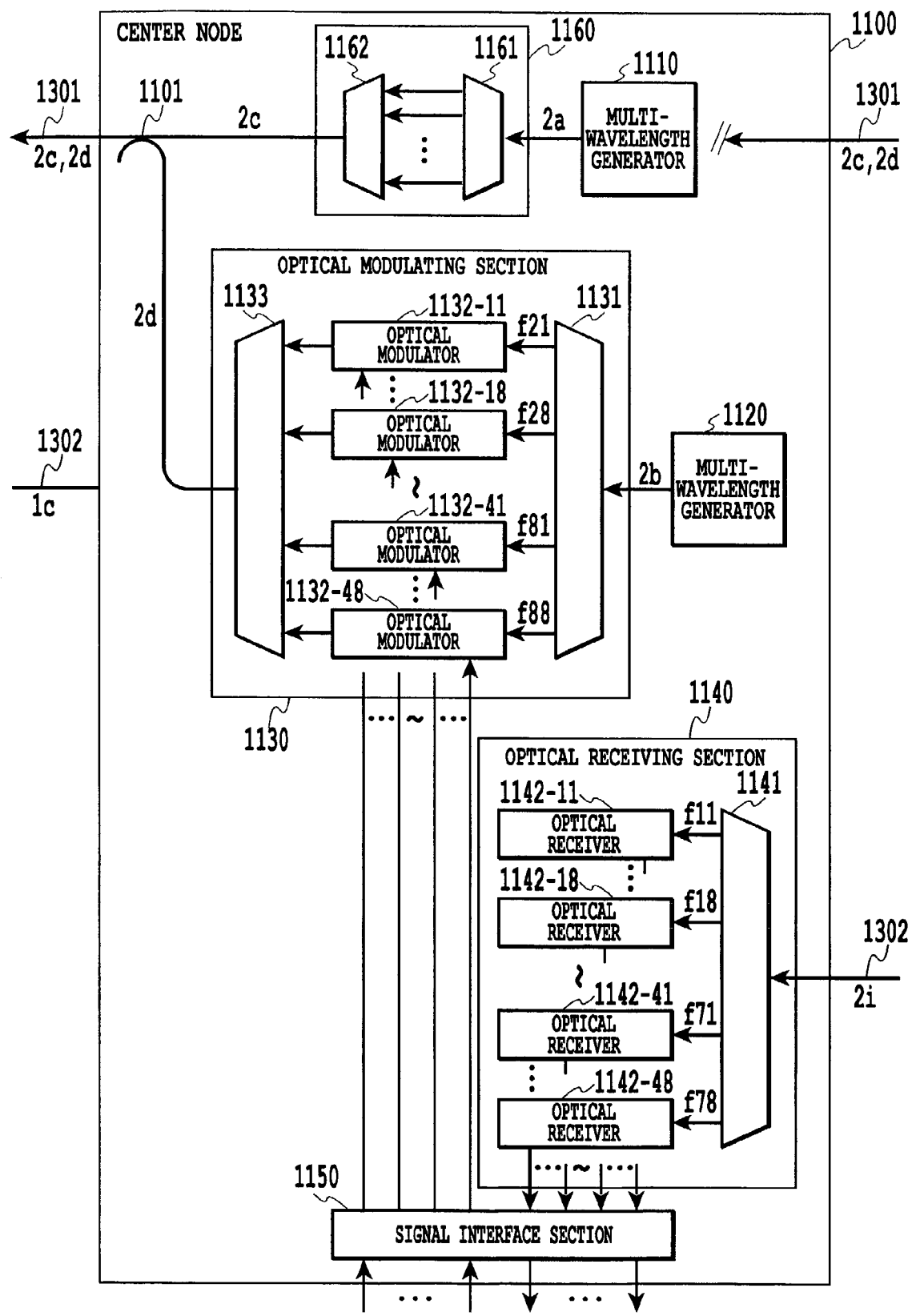
FIG. 15 is a block diagram showing an example of a configuration of the center node 1100.
Figure 16:
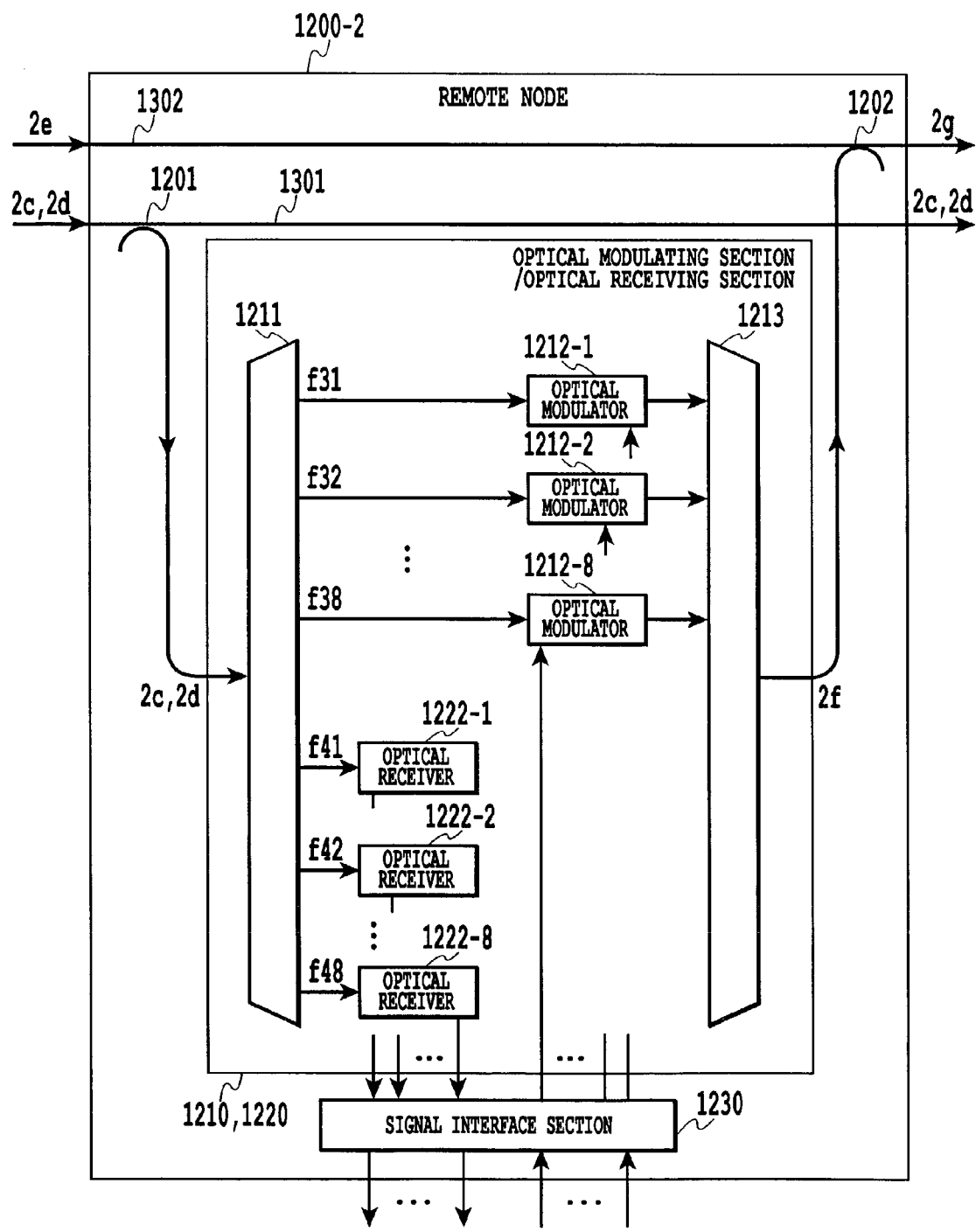
FIG. 16 is a block diagram showing an example of a configuration of the remote node 1200-2.

This embodiment is characterized in that specific wavelength bandwidths are allocated to each remote node as continuous-wave lights and signal light and in that the wavelength bandwidths for the continuous-wave lights (for upstream signal lights) and the downstream signal lights are alternately set. However, this embodiment differs from Embodiment 1-1 in that both downstream signal lights and continuous-wave lights for upstream signal lights are sent out to the same optical fiber transmission path. Specifically, description will be given with reference to FIGS. 14 to 16. FIG. 14 shows the signal state of each point of the WMD ring network. FIG. 15 shows an example of a configuration of the center node 1100. FIG. 16 shows an example of a configuration of the remote node 12002. The configurations of the other remote nodes are similar.

(Example of Configuration of Center Node 1100)

The example of the configuration of the center node 1100 will be described with reference to FIGS. 13 and 15. The center node 1100 is composed of the multi-wavelength generator 1110 that generates continuous-wave lights, an optical filter section 1160, the multi-wavelength generator 1120 that generates continuous-wave lights, an optical modulating section 1130, an optical coupler 1101 that multiplexes continuous-wave lights and downstream signal lights transmitted to the optical fiber transmission path 1301, the optical receiving section 1140 that receives upstream signal lights from the optical fiber transmission path 1302, and the signal interface section 1150 that interfaces an upstream signal with a downstream signal.

The multi-wavelength generators 1110 and 1120 are similar to that in Embodiment 1-1. As shown in FIG. 14, multi-wavelength light 2a output by the multi-wavelength generator 1110 is defined to have the bandwidths F1, F3, F5, and F7. On the other hand, multi-wavelength light 2b output by the multi-wavelength generator 1120 is defined to have the bandwidths F2, F4, F6, and F8.

The multi-wavelength light 2a output by the multi-wavelength generator 1110 is input to the optical filter section 1160. The optical filter section 1160 uses a demultiplexer 1161 to demultiplex the multi-wavelength light 2a into lights of a plurality of (8 waves×4 remote nodes) wavelength channels, and uses an optical multiplexer 1162 to multiplex the lights of the wavelength channels (f11 to f18, f31 to f38, f51 to f58, f71 to f78). The optical filter section 1160 then sends out the resultant continuous-wave lights 2c to the optical fiber transmission path 1301 via the optical coupler 1101 (in FIG. 14, these lights are shown without any arrows). In this case, unwanted sidebands of the multi-wavelength light 2a are removed owing to the multiplexing and demultiplexing characteristics of the demultiplexer 1161 and multiplexer 1162. The continuous-wave lights 2c is supplied via the optical fiber transmission path 1301 as upstream signal lights for each remote mode node. The continuous-wave lights 2c travels around the optical fiber transmission path 1301 to return to the center node 1100, where it is optically terminated.

Multi-wavelength light 2b output by the multi-wavelength generator 1120 is input to the optical modulating section 1130. The optical modulating section 1130 uses the demultiplexer 1131 to demultiplex the multi-wavelength light 2b into lights of a plurality of (8 waves×4 remote nodes) wavelength channels, and uses the optical modulators 1132-11 to 1132-18, . . . , 1132-41 to 1132-48 to modulate the lights of the wavelength channels (f21 to f28, f41 to f48, f61 to f68, f81 to f88). The modulated lights then have their wavelengths multiplexed by the multiplexer 1133. The resultant downstream signal lights 2d is then sent out to the optical fiber transmission path 1301 via the optical coupler 1101 (in FIG. 14, this light is shown by downward arrows). In this case, unwanted sidebands of the multi-wavelength light 2b are removed owing to the multiplexing and demultiplexing characteristics of the demultiplexer 1131 and multiplexer 1133. The downstream signal lights 2d travels around the optical fiber transmission path 1301 to return to the center node 1100, where it is optically terminated.

The remote nodes 1200-1 to 1200-4 demultiplex, before reception, signal lights of the wavelength channels f21 to f28 of the wavelength bandwidth F2, signal lights of the wavelength channels f41 to f48 of the wavelength bandwidth F4, signal lights of the wavelength channels f61 to f68 of the wavelength bandwidth F6, and signal lights of the wavelength channels f81 to f88 of the wavelength bandwidth F8, respectively, the wavelength bands being allocated to the corresponding remote nodes from the downstream signal lights 2d from the optical fiber transmission path 1302. Furthermore, the remote nodes 1200-1 to 1200-4 demultiplex lights of the wavelength channels f11 to f18 of the wavelength bandwidth F1, lights of the wavelength channels f31 to f38 of the wavelength bandwidth F3, lights of the wavelength channels f51 to f58 of the wavelength bandwidth F5, and lights of the wavelength channels f71 to f78 of the wavelength bandwidth F7 from the continuous-wave lights 2c from the optical fiber transmission path 1301, respectively, the wavelength bands being allocated to the corresponding remote nodes, and send out the resultant upstream signal lights to the optical fiber transmission path 1302. In this case, as shown at 2e, 2g, 2h, and 2i in FIG. 14, the upstream signal lights of the wavelength bands F1, F3, F5, and F7 sequentially merge with one another and reach the center node 1100 (the configuration of the remote node will be described later).

The optical receiving section 1140 of the center node 1100 uses a demultiplexer 1141 to demultiplex the upstream signal lights 2i from the optical fiber transmission path 1302 into signal lights of the wavelength channels. The optical receiving section 1140 then uses the optical receivers 1142-11 to 1142-18, . . . , or 1142-41 to 1142-48 corresponding to the remote node to receive the signal lights of the wavelength channels (f11 to f18, f31 to f38, f51 to f58, and f71 to f78). The optical receivers 1142-11 to 1142-18, . . . , 1142-41 to 1142-48 and the optical modulators 1132-11 to 1132-18, . . . , 1132-41 to 1132-48 are each connected to the signal interface section 1150. The signal interface section 1150 controls connections of signals between the remote nodes and to other networks.

The optical modulating section 1130 ad optical receiving section 1140 of the center node 1100 of this embodiment may be constructed similarly to the example B shown in FIG. 9 in Embodiment 1-1.

(Example of Configuration of Remote Node 1200-2)

Now, an example of a configuration of the remote node 1200-2 will be described with reference to FIGS. 13 and 16. The remote node 1200-2 is composed of the optical coupler 1201 that splits the continuous-wave lights 2c and downstream signal lights 2d transmitted over the optical fiber transmission path 1301, an optical modulating section 1210/optical receiving section 1220 which demultiplexes continuous-wave lights of the wavelength channels f31 to f38 of the wavelength bandwidth F3 allocated to the remote node 1200-2 and modulates the resultant lights to generate upstream signal lights 2f and which receives downstream signal lights of the wavelength channels f41 to f48 of the wavelength bandwidth F4, the optical coupler 1202 that couples this upstream signal lights 2f to the optical fiber transmission path 1302, and the signal interface section 1230 that connects a downstream signal to the user terminal (not shown) and connects an upstream signal from the user terminal to the optical modulating section 1210.

The optical modulating section 1210/optical receiving section 1220 uses the demultiplexer 1211 to demultiplex lights of the wavelength channels f31 to f38 of the wavelength bandwidths F3 allocated to the remote node 1200-2 from the split continuous-wave lights 2c from the optical fiber transmission path 1301. The optical modulating section 1210/optical receiving section 1220 then uses the optical modulators 1212-1 to 1212-8 to modulate the continuous-wave lights, uses the multiplexer 123 to multiplex the wavelengths of the modulated lights, and then sends out the resultant upstream signal lights 2f to the optical fiber transmission path 1302 (in FIG. 14, shown by upward arrows).

Furthermore, the optical modulating section 1210/optical receiving section 1220 uses the demultiplexer 1211 to demultiplex signal lights of the wavelength channels f41 to f48 of the wavelength bandwidth F4 allocated to the remote node 1200-2 from the split downstream signal lights 2d from the optical fiber transmission path 1301, and then uses the optical receivers 1222-1 to 1222-8 to receive the signal lights. The optical receivers 1222-1 to 1222-8 and the optical modulators 1212-1 to 1212-8 are each connected to the terminal (not shown) via the signal interface section 1230.

In Embodiment 1-2, shown above, one wavelength bandwidth is allocated to each of the four remote nodes for each of the upstream signal lights and the downstream signal lights. However, the number of remote nodes and the number and arrangement of wavelength bandwidths allocated to each node are arbitrary. Further, the eight wavelength channels set for each wavelength bandwidth. However, the number of wavelength channels is arbitrary.

Furthermore, only the minimum required arrangements are shown for the center node 1100 in FIG. 15 and for the remote node 1200-2 in FIG. 16. However, for example, an optical amplifier, optical equalizing means for making the optical power of the wavelength channels uniform, an optical bandpass filter that removes ASE light, or the like may be arranged at predetermined positions.

Moreover, in this embodiment, the direction in which light is transmitted through the optical fiber transmission path 1301, used to transmit multi-wavelength light and downstream signal lights from the center node to each remote node, is the same as the direction in which light is transmitted through the optical fiber transmission path 1302, used to transmit upstream signal lights from each remote node to the center node (in the figure, leftward). However, light may be transmitted in different directions. That is, each remote node may modulate multi-wavelength light transmitted via the optical fiber transmission path 1301 and then returns the resultant upstream signal lights to the center node via the optical fiber transmission path 1302.

(Redundant Configuration)

Description will be given of action to take if in the configurations of Embodiments 1-1 and 1-2, shown above, any fault occurs in any device constituting the center node or remote node or in the optical fiber transmission path.

Typically, the devices and the optical fiber transmission path each comprise a working and protection systems. Thus, if any fault occurs in the working system, it is switched to the protection system. If any fault occurs in any working device or the optical fiber transmission path, the device and optical fiber transmission path either of which is defective is switched to the corresponding protection systems or only the defective device or optical fiber transmission path is switched to the corresponding protection system.

With a configuration with a working and protection optical fiber transmission paths, for transmissions from the center node to each remote node, signal light may be sent out to both working and protection optical fiber transmission paths. For receptions, the working optical fiber transmission path is normally selected, and if any fault occurs in the working optical fiber transmission path, it may be switched to the protection optical fiber transmission path. In this regard, if in Embodiments 1-1 and 1-2, the optical fiber transmission paths 1301 and 1302 are set to have the different transmission directions, faults in the optical fiber transmission paths can be dealt with without any protection optical fiber transmission paths. Examples of redundant configurations corresponding to Embodiments 1-1 and 1-2 will described below as Embodiments 1-3 and 1-4, respectively.

(Embodiment 1-3)

Figure 17:
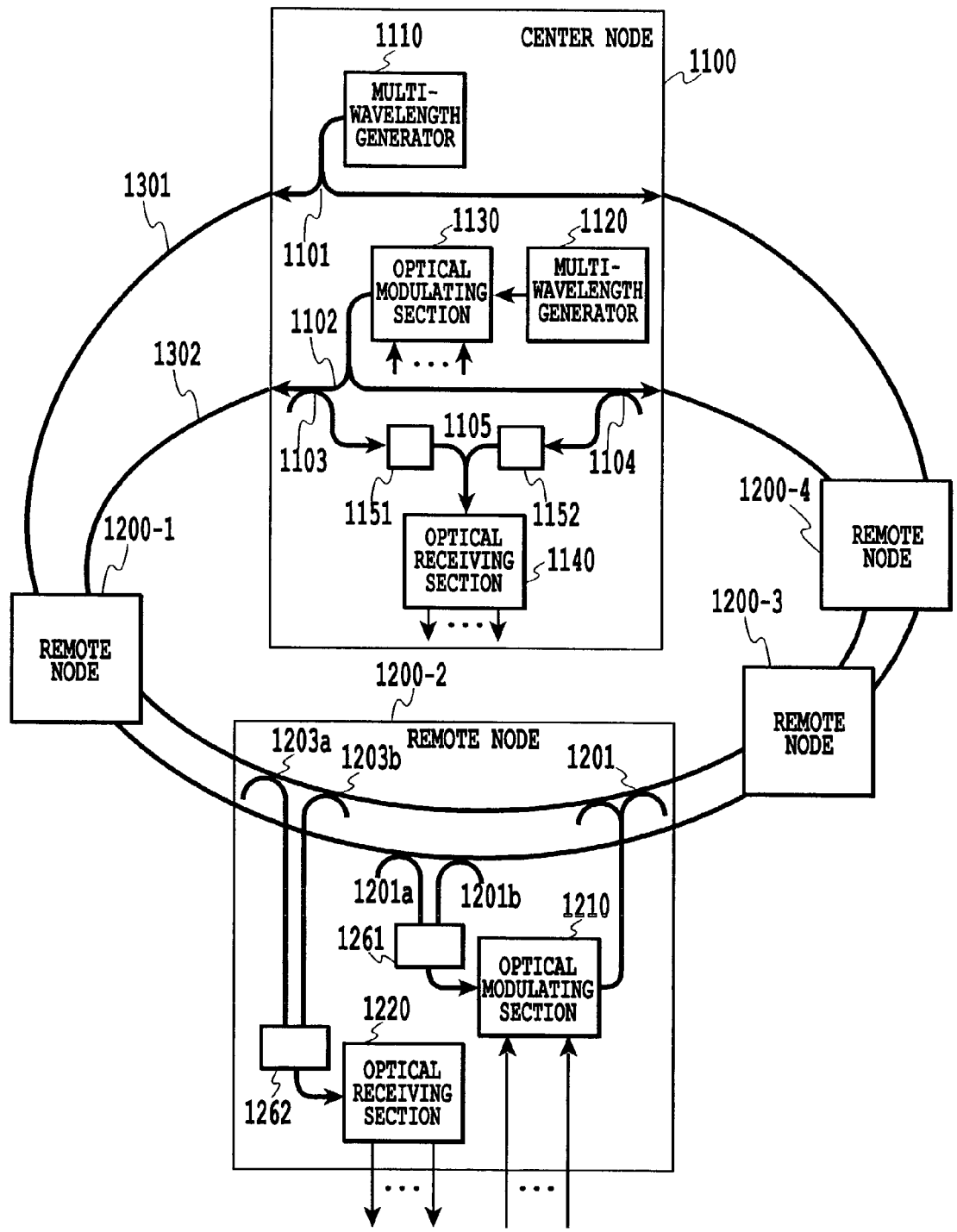
FIG. 17 is a block diagram showing Embodiment 1-3 of the WDM ring network according to the present invention.

FIG. 17 shows Embodiment 1-3 of the WDM ring network of the present invention. The detailed configurations of the center and remote nodes are similar to those shown in FIGS. 8 to 12. In this embodiment, the optical coupler 1101 splits continuous-wave lights into two which is output by the multi-wavelength generator 1110 of the center node 1110. The lights obtained are transmitted to the optical fiber transmission path 1301 in the different directions. Further, downstream signal lights output by the optical modulating section 1130 is split into two by the optical coupler 1102.

The lights obtained are transmitted to the optical fiber transmission path 1302 in the different directions.

In the remote node 1200-2 (like other remote nodes), an optical coupler 2101a splits leftward continuous-wave lights transmitted via the optical fiber transmission path 1301, while an optical coupler 1201b splits rightward continuous-wave lights. Then, an optical switch 1261 selects one of the continuous-wave lights and inputs it to the optical modulating section 1210. The optical coupler 1201 splits upstream signal lights into two which is output by the optical modulating section 1210. The lights obtained are transmitted to the optical fiber transmission path 1302 in the different directions. On the other hand, an optical coupler 1203a splits leftward continuous-wave lights transmitted via the optical fiber transmission path 1302, while an optical coupler 1203b splits rightward continuous-wave lights. Then, an optical switch 1262 selects one of the split lights. The selected light is then received by the optical receiving section 1220.

In the center node 1100, optical couplers 1103 and 1104 splits rightward upstream signal lights and leftward upstream signal lights transmitted via the optical fiber transmission path 1302, respectively. Optical switches 1151 and 1152 and an optical coupler 1105 selects one of the lights obtained or merges them together. The resultant signal is then received by the optical receiving section 1140. The present invention is not limited to the configuration based on the optical switches 1151 and 1152 and the optical coupler 1105 provided that it is possible to implement a function of selecting one or both of the rightward and leftward upstream signal lights transmitted via the optical fiber transmission path 1302.

If the optical fiber transmission paths 1301 and 1302 are normal, optical switches 1261 and 1262 in the remote node select one of the continuous-wave lights transmitted by the center node to the optical fiber transmission path 1301 in both directions and select one of the downstream signal lights transmitted by the center node to the optical fiber transmission path 1302 in both directions. Then, one of the optical switches 1151 and 1152 in the center node 1100 is turned on to receive one of the upstream signal lights transmitted by each remote node to the optical fiber transmission path 1302 in both directions.

On the other hand, if for example, any fault occurs in the optical fiber transmission path 1301 or 1302 between the remote nodes 1200-1 and 1200-2, then for the continuous-wave lights and downstream signal lights transmitted by the center node 1100 to the optical fiber transmission paths 1301 and 1302 in both directions, only the continuous-wave lights and downstream signal lights transmitted leftward reach the remote node 1200-1, whereas only the continuous-wave lights and downstream signal lights transmitted rightward reach the remote nodes 1200-4, 1200-3, and 1200-2. Thus, each remote node selects the continuous-wave lights and downstream signal lights transmitted in the corresponding direction. On the other hand, for the upstream signal lights transmitted by the remote node 1200-1 to the optical fiber transmission path 1302 in both directions, only the upstream signal lights transmitted rightward reaches the center node 1100. For the upstream signal lights transmitted by the remote nodes 1200-4, 1200-3, and 1200-2 to the optical fiber transmission path 1302 in both directions, only the upstream signal lights transmitted leftward reaches the center node 1100. Thus, the center node 1100 turns on both optical switches 1151 and 1152 to receive the light.

With such a configuration and operations of the optical switches, even if any fault occurs in one or both of the optical fiber transmission paths 1301 and 1302, it can be dealt with using a mechanism in which light is sent back at the fault point.

(Embodiment 1-4)

Figure 18:
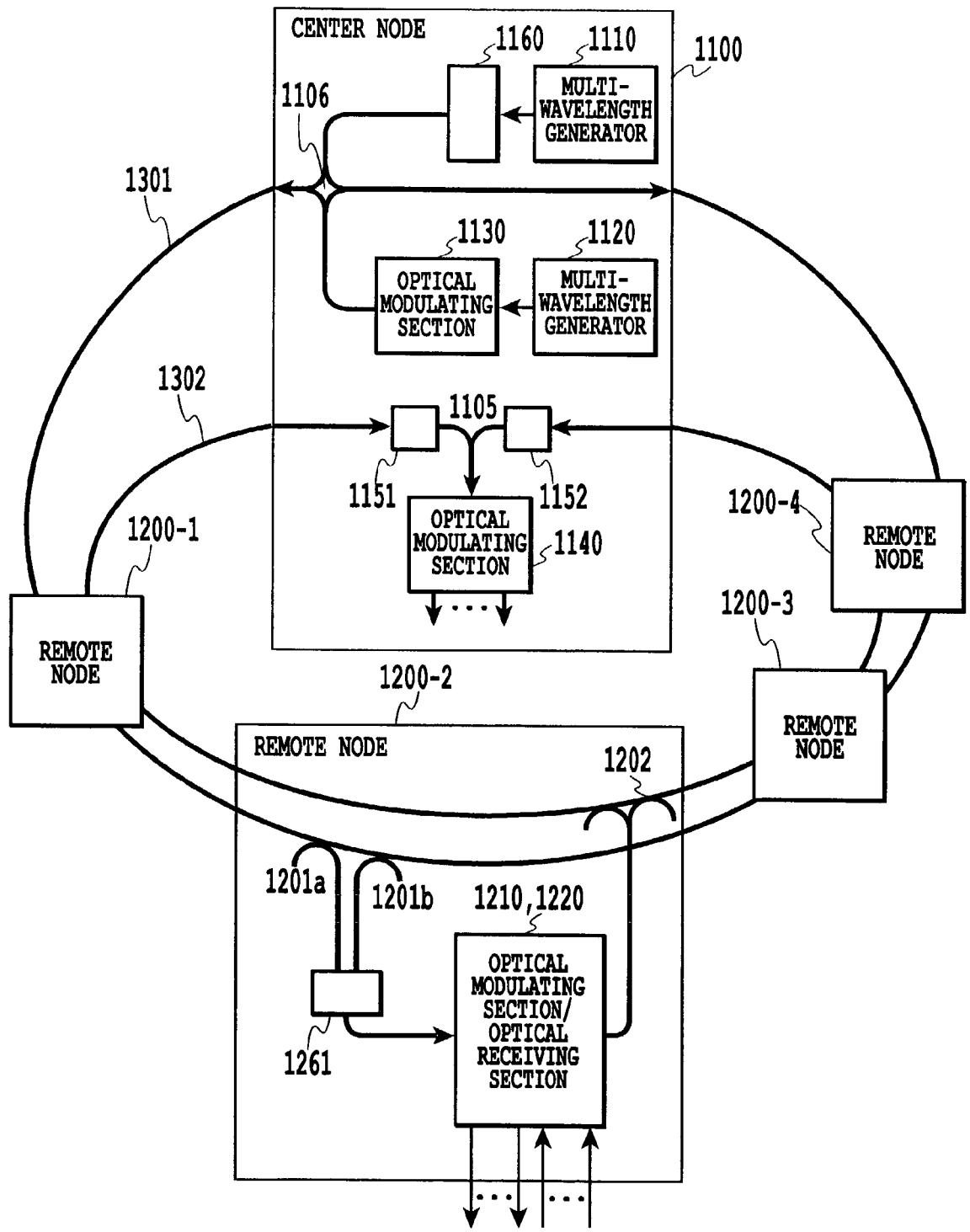
FIG. 18 is a block diagram showing Embodiment 1-4 of the WDM ring network according to the present invention.

FIG. 18 shows Embodiment 1-4 of the WDM network of the present Invention. In the figure, the detailed configurations of the center and remote nodes are similar to those shown in FIGS. 15 and 16. In this embodiment, an optical coupler 1106 splits into two each of the continuous-wave lights output by the multi-wavelength generator 1110 and optical filter section 1160 of the center node 1110 and the downstream signal lights output by the optical modulating section 1130. The split continuous-wave lights and downstream signal lights are coupled together. The resultant lights are transmitted to the optical fiber transmission path 1301 in the different directions.

In the remote node 1200-2 (like other remote nodes), the optical coupler 1201a splits leftward continuous-wave lights and downstream signal lights transmitted via the optical fiber transmission path 1301, while the optical coupler 1201b splits rightward continuous-wave lights and downstream signal lights. Then, the optical switch 1261 selects one of the two pairs of lights and inputs it to the optical modulating section 1210/optical receiving section 1220. The optical coupler 1202 splits upstream signal lights into two which is output by the optical modulating section 1210. The lights obtained are transmitted to the optical fiber transmission path 1302 in the different directions.

In the center node 1100, rightward upstream signal lights and leftward upstream signal lights transmitted via the optical fiber transmission path 1302 are subjected to selection or merging by the optical switches 1151 and 1152 and the optical coupler 1105. The resultant signal is received by the optical receiving section 1140. The present invention is not limited to the configuration based on the optical switches 1151 and 1152 and the optical coupler 1105 provided that it is possible to implement a function of selecting one or both of the rightward and leftward upstream signal lights transmitted via the optical fiber transmission path 1302.

If the optical fiber transmission paths 1301 and 1302 are normal, optical switch 1261 in the remote node selects one of the continuous-wave lights and one of the downstream signal lights, each pair of lights being transmitted by the center node 1100 to the optical fiber transmission path 1301 in both directions. Then, one of the optical switches 1151 and 1152 in the center node 1100 is turned on to receive one of the upstream signal lights transmitted by each remote node to the optical fiber transmission path 1302 in both directions.

On the other hand, if for example, any fault occurs in the optical fiber transmission path 1301 or 1302 between the remote nodes 1200-1 and 1200-2, then for the continuous-wave lights and downstream signal lights transmitted by the center node 1100 to the optical fiber transmission paths 1301 and 1302 in both directions, only the continuous-wave lights and downstream signal lights transmitted leftward reach the remote node 1200-1, whereas only the continuous-wave lights and downstream signal lights transmitted rightward reach the remote nodes 1200-4, 1200-3, and 1200-2. Thus, each remote node selects the continuous-wave lights and downstream signal lights transmitted in the corresponding direction. On the other hand, for the upstream signal lights transmitted by the remote node 1200-1 to the optical fiber transmission path 1302 in both directions, only the upstream signal lights transmitted rightward reaches the center node 1100. For the upstream signal lights transmitted by the remote nodes 1200-4, 1200-3, and 1200-2 to the optical fiber transmission path 1302 in both directions, only the upstream signal lights transmitted leftward reaches the center node 1100. Thus, the center node 1100 turns on both optical switches 1151 and 1152 to receive the light.

With such a configuration and operations of the optical switches, even if any fault occurs in one or both of the optical fiber transmission paths 1301 and 1302, it can be dealt with using a mechanism in which light is sent back at the fault point.

(Embodiment 2-1)

Figure 19:
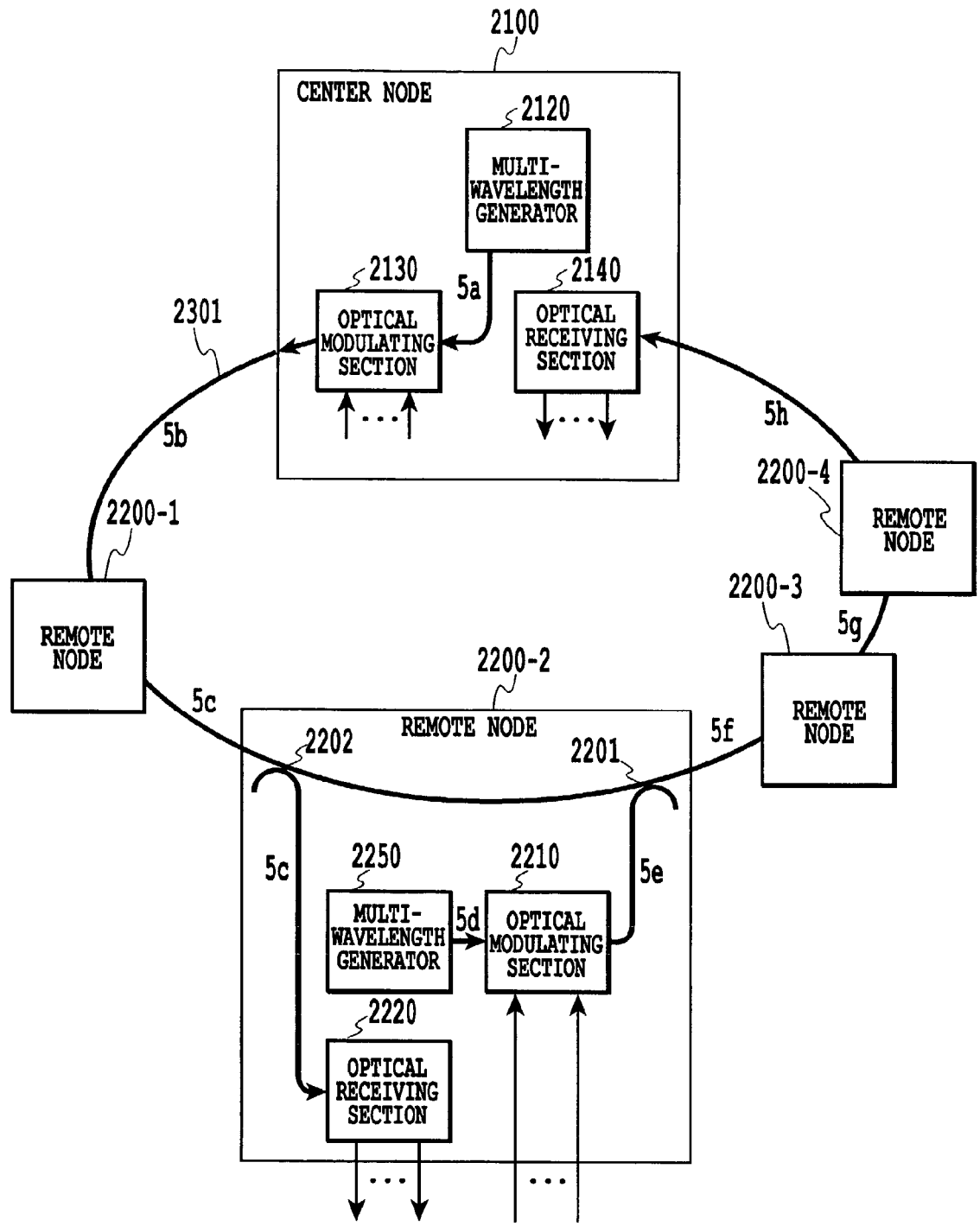
FIG. 19 is a block diagram showing Embodiment 2-1 of the WDM ring network according to the present invention.

FIG. 19 shows Embodiment 2-1 of the WDM ring network according to the present invention.

In the figure, a center node 2100 and remote nodes 2200-1 to 2200-4 are connected together in ring form via an optical fiber transmission path 2301. The optical fiber transmission 2301 is used to transmit downstream signal lights from the center node to each remote node and to transmit upstream signal lights from each remote node to the center node. However, the remote nodes always communicate with each other via the center node. That is, the remote node transmits upstream signal lights to the center node via the optical fiber transmission path 2301. Then, the center node transmits this light to each remote node via the optical fiber transmission path 2301 as downstream signal lights. In this manner, the remote nodes communicate with each other.

Figure 20:
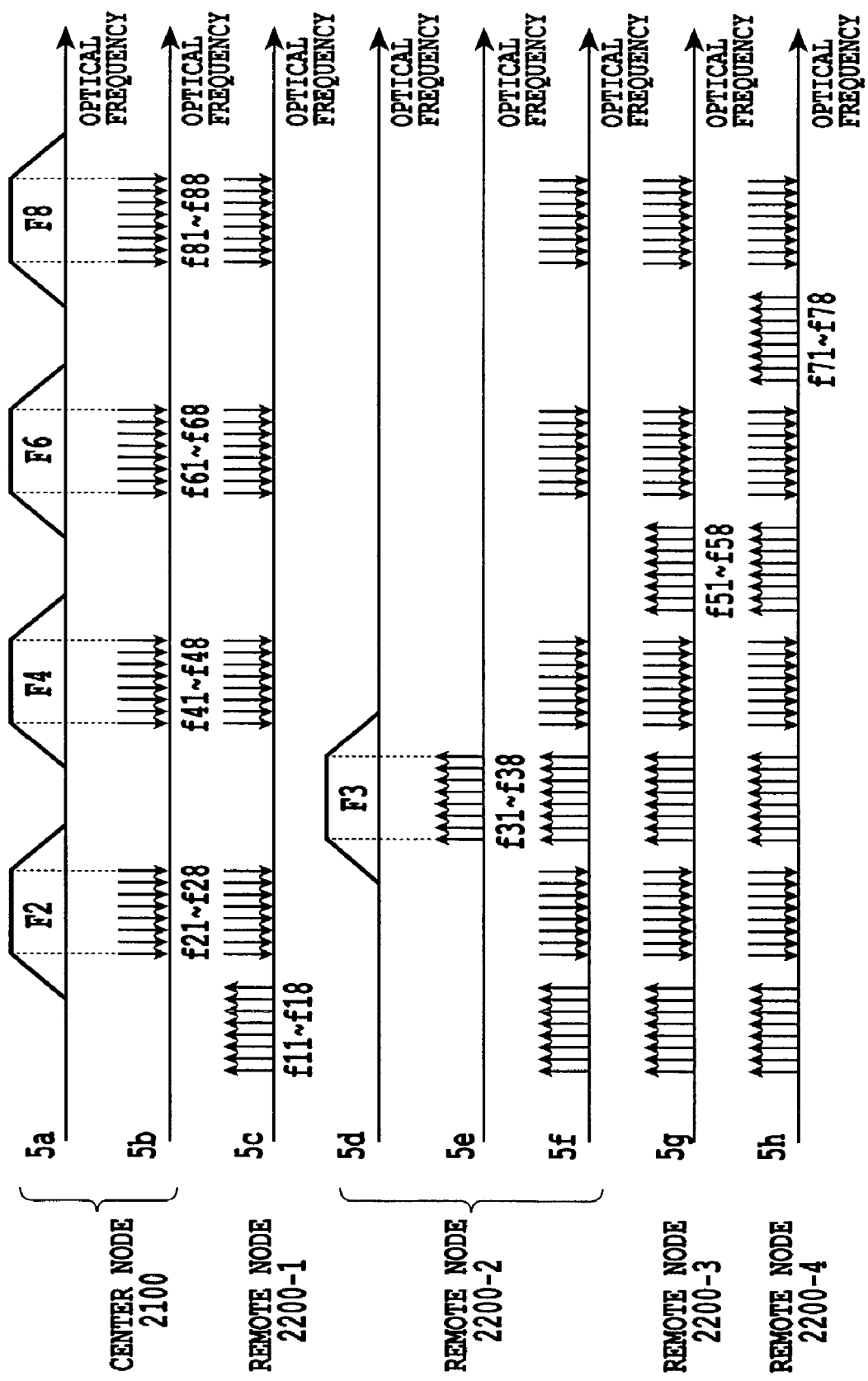
FIG. 20 is a diagram showing the signal state of each point in the WDM ring network.
Figure 21:
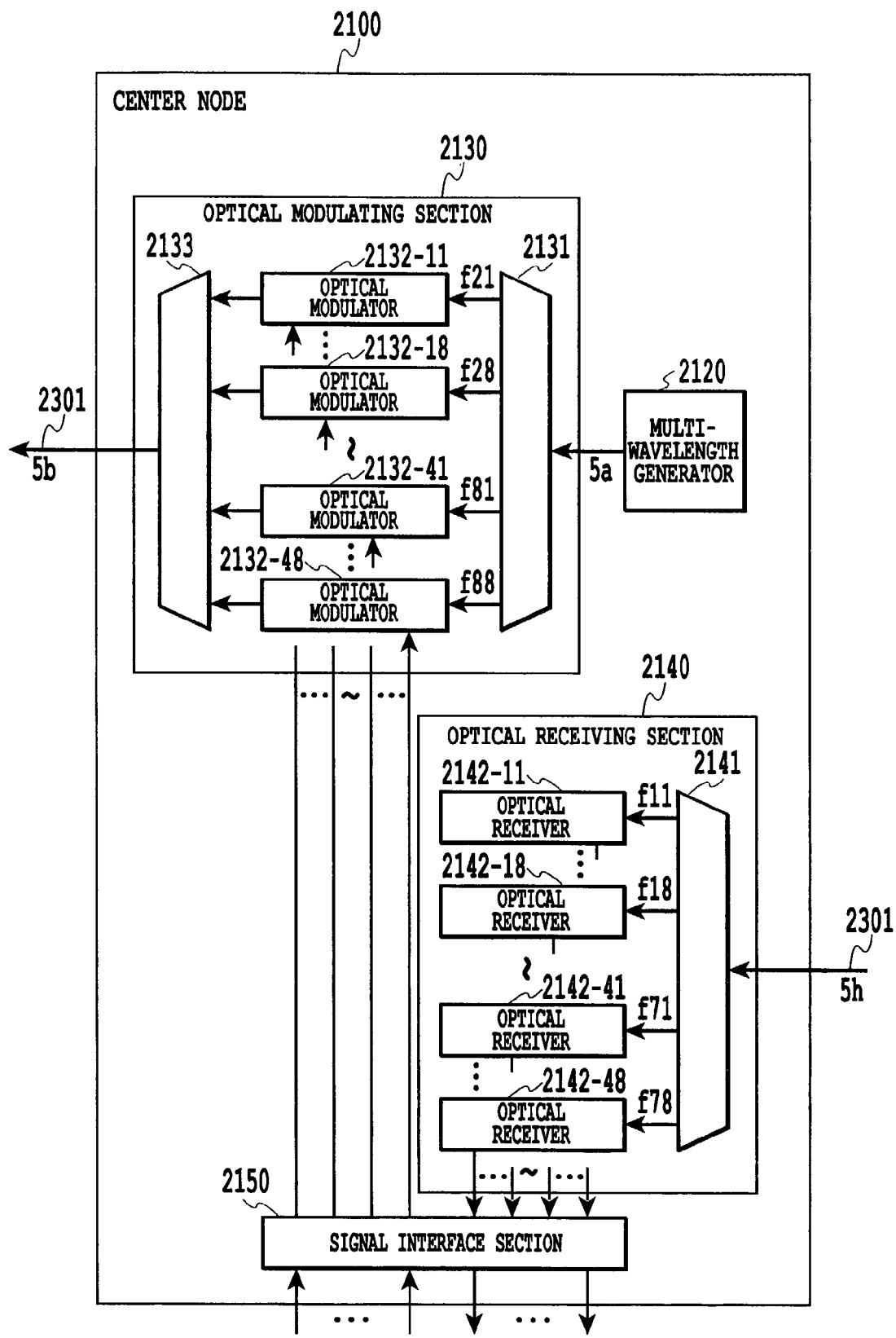
FIG. 21 is a block diagram showing an example A of a configuration of a center node 2100.
Figure 22:
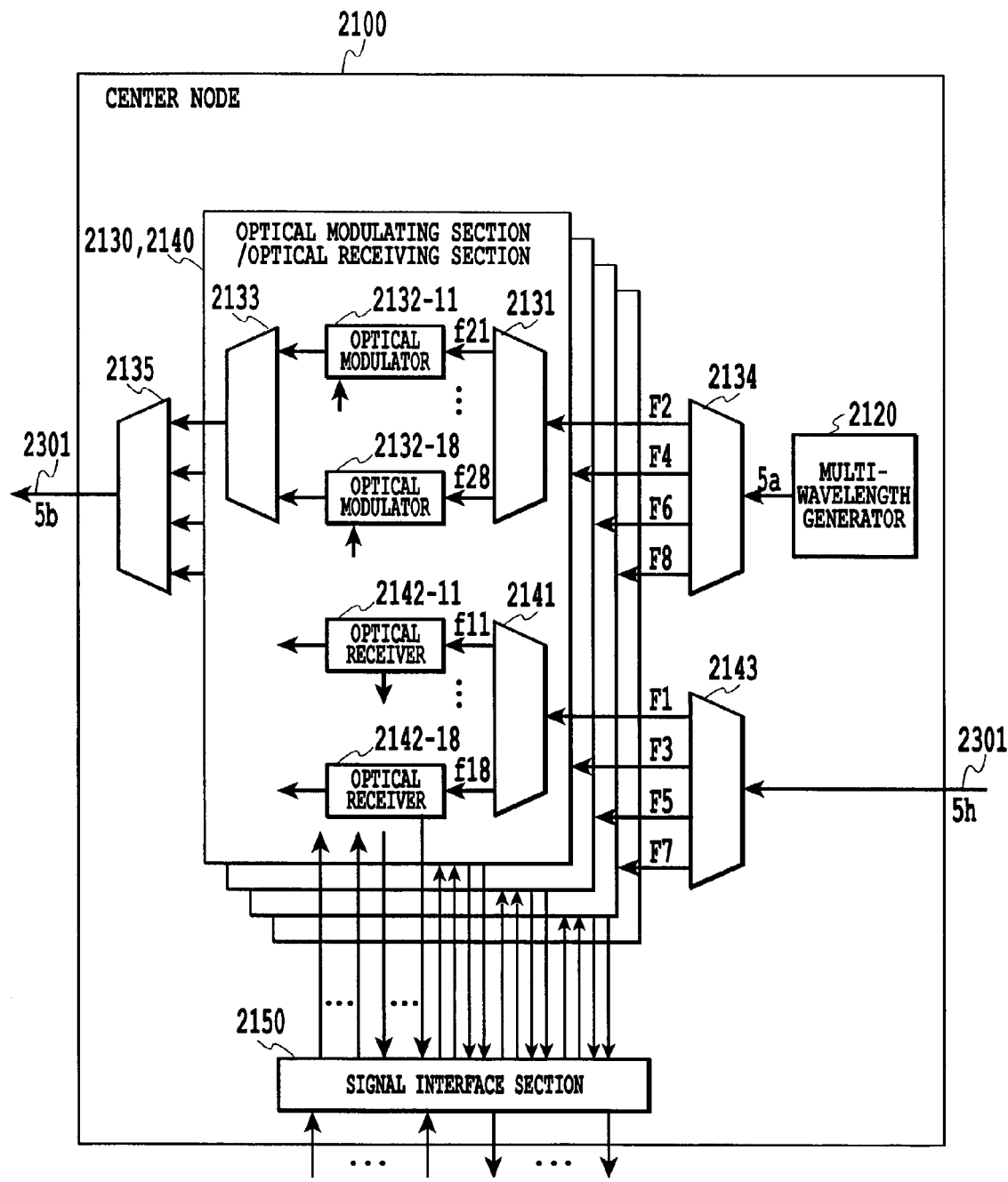
FIG. 22 is a block diagram showing an example B of a configuration of the center node 2100.
Figure 23:
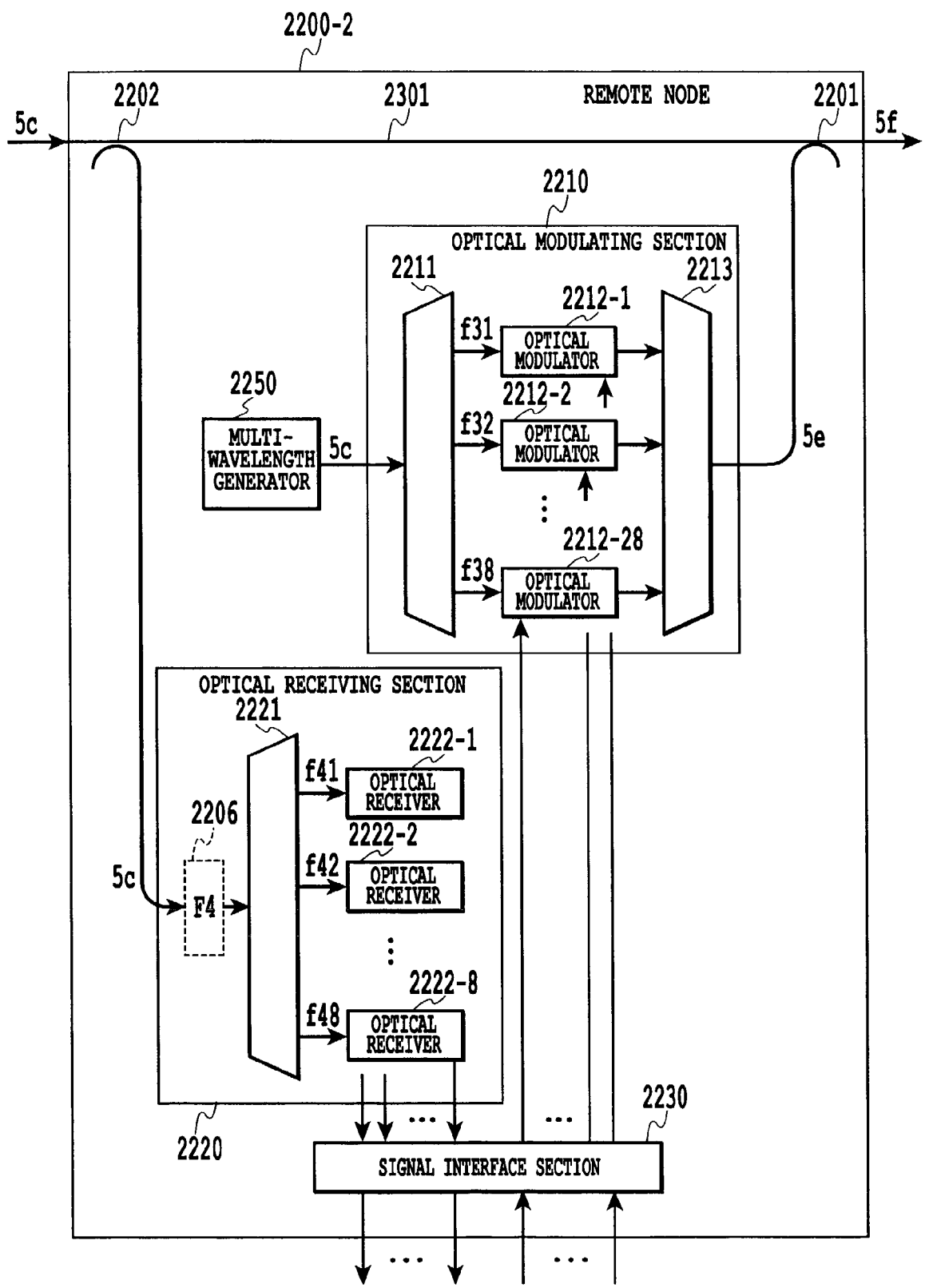
FIG. 23 is a block diagram showing an example A of a configuration of a remote node 2200-2.
Figure 24:
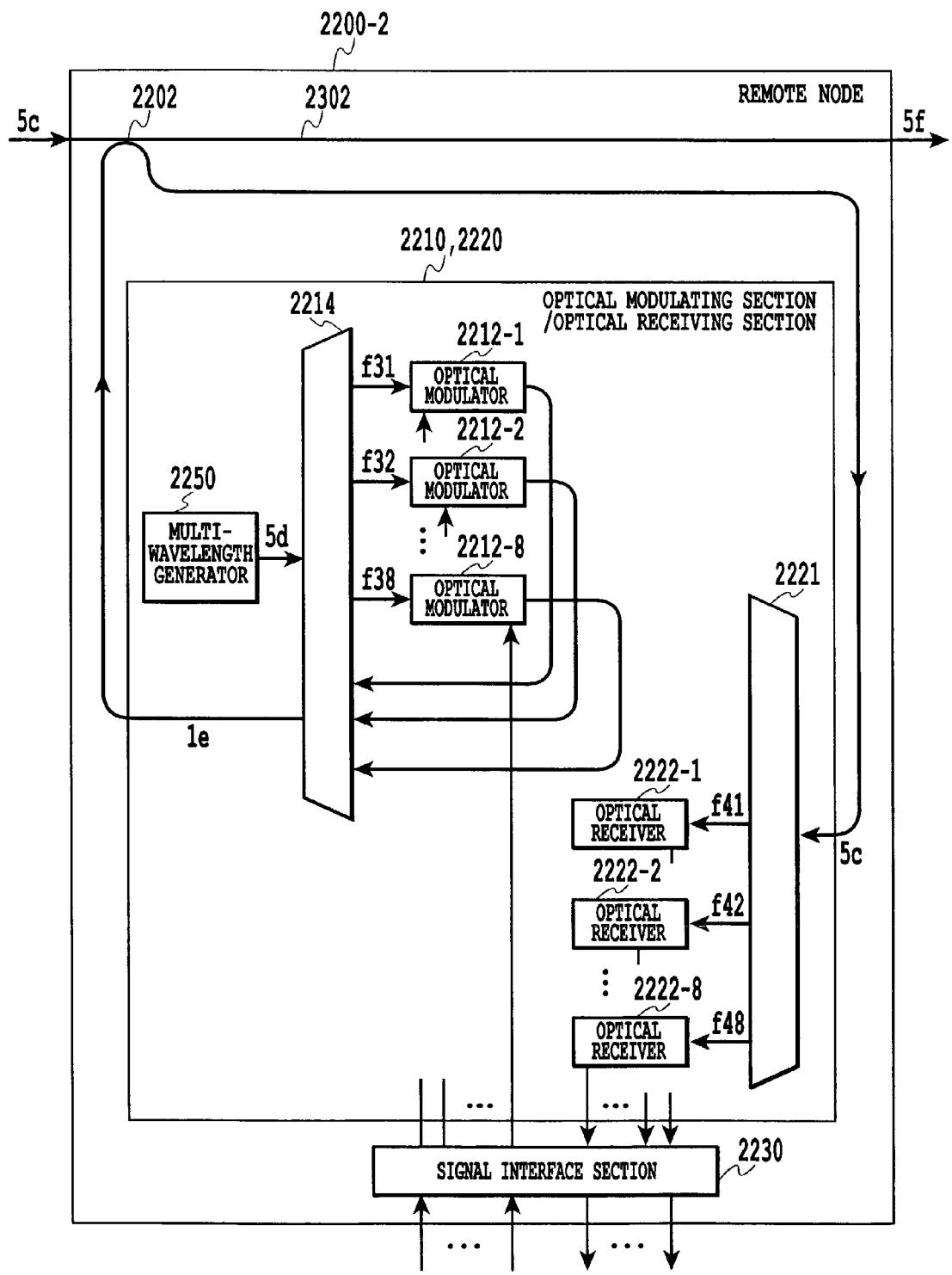
FIG. 24 is a block diagram showing an example B of a configuration of the remote node 2200-2.
Figure 25:
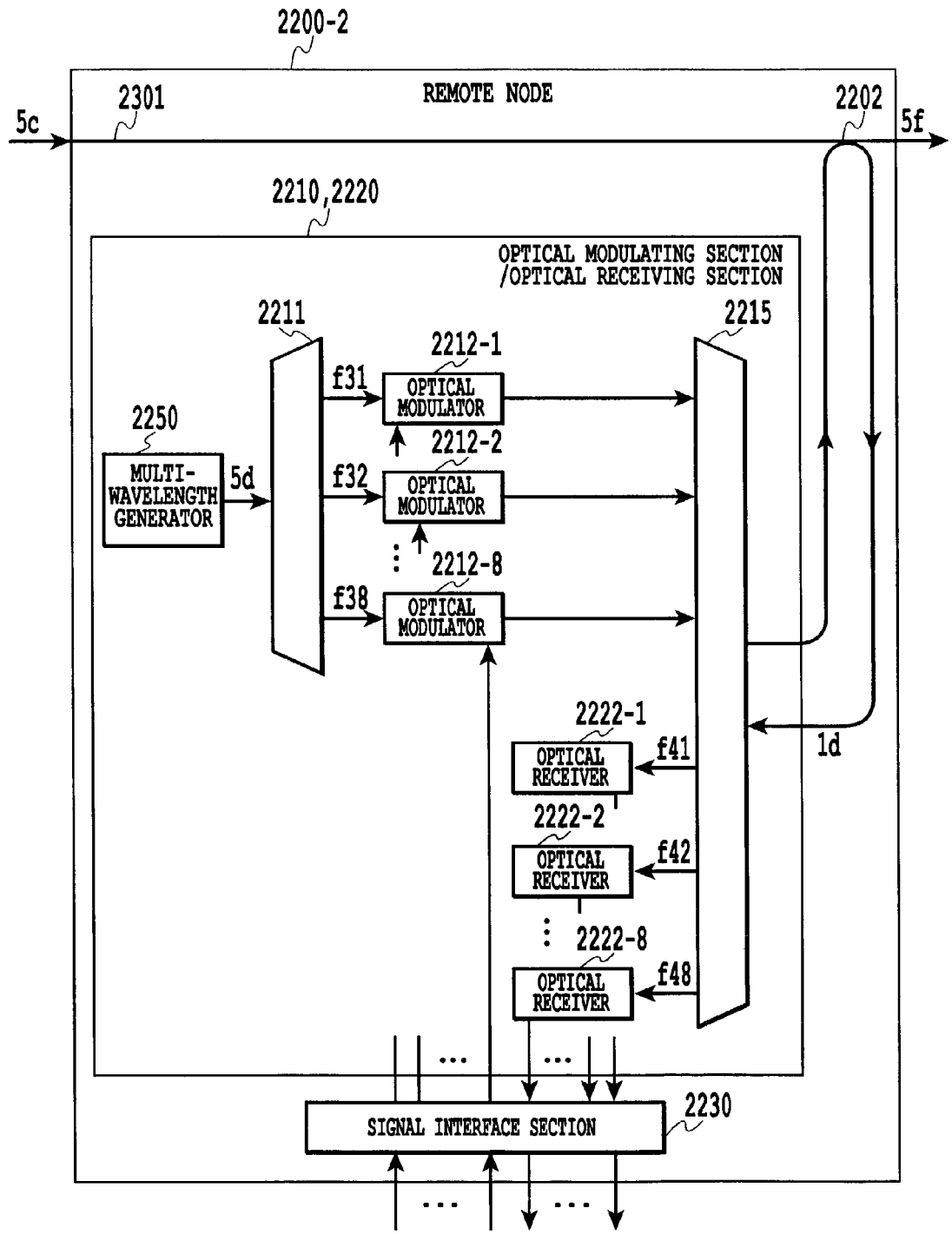
FIG. 25 is a block diagram showing an example C of a configuration of the remote node 2200-2.

This embodiment is characterized in that specific wavelength bandwidths are allocated to each remote node as signal lights and in that the wavelength bandwidths for the upstream signal lights and the downstream signal lights are alternately set. Specifically, description will be given with reference to FIGS. 20 to 25. FIG. 20 shows the signal state of each point of the WMD ring network. FIGS. 21 and 22 show examples A and B of configurations of the center node 2100. FIGS. 23 to 25 show examples A, B, and C of configurations of the remote node 2200-2. The configurations of the other remote nodes are similar.

(Example of Configuration of Center Node 2100)

The example A of the configuration of the center node 2100 will be described with reference to FIGS. 19 and 21. The center node 2100 is composed of a multi-wavelength generator 2120 that generates downstream signal lights transmitted to the optical fiber transmission path 2301, an optical modulating section 2130, an optical receiving section 2140 that receives upstream signal lights from the optical fiber transmission path 2301, and a signal interface section 2150 that interfaces an upstream signal with a downstream signal.

The multi-wavelength generator 2120 is constructed as shown in FIG. 4 and is in this case composed of the four semiconductor lasers (LD) 11, the multiplexer 12, and the multi-wavelength modulating section 20 for four remote nodes. However, if the eight semiconductor lasers 11, including the above four semiconductor lasers and other four semiconductor lasers in the multi-wavelength generator of each remote node, described later, have oscillating optical frequencies f1, f2, f3, . . . f8 spaced at even intervals, then the multi-wavelength generator 2120 of the center node 2100 uses semiconductor lasers having even-number oscillating optical frequencies f2, f4, f6, and f8. In contrast, the multi-wavelength generator of each remote node uses semiconductor lasers having odd-number oscillating optical frequencies f1, f3, f5, and f7.

In this case, as shown in FIG. 20, bandwidths of multi-wavelength light 5a output by the multi-wavelength generator 2120 are defined as F2, F4, F6, and F8. Further, bandwidths of multi-wavelength light output by the multi-wavelength generator of each remote node are defined as F1, F3, F5, and F7. In this case, unwanted sidebands are present at the opposite sides of each of eight waves used as wavelength channels for each wavelength bandwidth. Thus, each wavelength bandwidth (oscillating optical frequencies of each semiconductor laser) is set so that the signal bands of the eight waves, free of the unwanted sidebands, are adjacent to each other so as not to be superimposed on each other. This enables the wavelength channels to be densely set.

The multi-wavelength light 5a output by the multi-wavelength generator 2120 is input to the optical modulating section 2130. The optical modulating section 2130 uses a demultiplexer 2131 to demultiplex the multi-wavelength light 5a into lights of a plurality of (8 waves×4 remote nodes) wavelength channels, and uses optical modulators 2132-11 to 2132-18, . . . , 2132-41 to 2132-48 to modulate the lights of the wavelength channels (f21 to f28, f41 to f48, f61 to f68, f81 to f88). The optical modulating section 2130 then uses a multiplexer 2133 to multiplex the wavelengths of the modulated lights, and sends out the resultant downstream signal lights 5b to the optical fiber transmission path 2301 (in FIG. 20, this is shown by downward arrows). In this case, unwanted sidebands of the multi-wavelength light 5a are removed owing to the multiplexing and demultiplexing characteristics of the demultiplexer 2131 and multiplexer 2133.

Remote nodes 2200-1 to 2200-4 demultiplex, before reception, signal lights of the wavelength channels f21 to f28 of the wavelength bandwidth F2, signal lights of the wavelength channels f41 to f48 of the wavelength bandwidth F4, signal lights of the wavelength channels f61 to f68 of the wavelength bandwidth F6, and signal lights of the wavelength channels f81 to f88 of the wavelength bandwidth F8, respectively, the wavelength bands being allocated to the corresponding remote nodes from the downstream signal lights 5b from the optical fiber transmission path 2301. Furthermore, the remote nodes 2200-1 to 2200-4 obtain, through demultiplexing, lights of wavelength channels f11 to f18 of the wavelength bandwidth F1, lights of wavelength channels f31 to f38 of the wavelength bandwidth F3, lights of wavelength channels f51 to f58 of the wavelength bandwidth F5, and lights of wavelength channels f71 to f78 of the wavelength bandwidth F7, respectively, the wavelength bands being allocated to the corresponding remote nodes, and send out these lights to the optical fiber transmission path 2301 as upstream signal lights. In this case, as shown at 5c, 5f, 5g, and 5h in FIG. 20, the upstream signal lights of the wavelength bands F1, F3, F5, and F7 sequentially merge with the downstream signal lights of the wavelength bands F2, F4, F6, and F8. The merged lights then reach the center node 2100 (the configuration of the remote node will be described later).

The optical receiving section 2140 of the center node 2100 uses a demultiplexer 2141 to demultiplex the upstream signal lights 5h from the optical fiber transmission path 2301 into signal lights of the wavelength channels. The optical receiving section 2140 then uses optical receivers 2142-11 to 2142-18, . . . , or 2142-41 to 2142-48 corresponding to the remote node to receive the signal lights of the wavelength channels (f11 to f18, f31 to f38, f51 to f58, and f71 to f78). The optical receivers 2142-11 to 2142-18, . . . , 2142-41 to 2142-48 and the optical modulators 2132-11 to 2132-18, . . . , 2132-41 to 2132-48 are each connected to a signal interface section 2150. The signal interface section 2150 controls connections of signals between the remote nodes and to other networks.

For the demultiplexer 2131 and multiplexer 2133 of the optical modulating section 2130 and the demultiplexer 2141 of the optical receiving section 2140, one multiplexer/demultiplexer can be used in place of arbitrary two or three of these components by, for example, using an arrayed waveguide grating (AWG) as the multiplexer/demultiplexer and properly setting an input and output ports.

(Example B of Configuration of Center Node 2100)

Now, an example B of a configuration of the center node 2100 will be described with reference to FIG. 22. This example B is characterized in that for each remote node, the optical modulators 2132 and optical receivers 2142 in the example A are combined into an optical modulating 2130/an optical receiving section 2140. Multi-wavelength light from the multi-wavelength generator 2120 is demultiplexed into the wavelength bands F2, F4, F6, and F8 by a wavelength-group demultiplexer 2134. Multi-wavelength light of the wavelength band F2 is demultiplexed into lights of the wavelength channels f21 to f28 by the demultiplexer 2131 of the optical modulating section 2130/optical receiving section 2140 corresponding to the remote node 2200-1. The resultant lights are modulated by the optical modulators 2132-11 to 2132-18, and the modulated lights have their wavelengths multiplexed by the multiplexer 2133. The wavelength-multiplexed light of each wavelength bandwidth from the optical modulating section 2130/optical receiving section 2140 corresponding to the remote node have its wavelength multiplexed by the group multiplexer 2135. The resultant downstream signal lights 5b is then sent out to the optical fiber transmission path 2301.

The upstream signal lights 5h from the optical fiber transmission path 2301 is demultiplexed into the wavelength bandwidths F1, F3, F5, and F7 by a group demultiplexer 2143. Upstream signal lights of the wavelength bandwidth F1 is demultiplexed into signal lights of the wavelength channels f11 to f18 by the demultiplexer 2141 of the optical modulating section 2130/optical receiving section 2140 corresponding to the remote node 2200-1. These signal lights are received by the corresponding optical receivers 2142-11 to 2142-18. The optical receivers 2142-11 to 2142-18, . . . , 2142-41 to 2142-48 and the optical modulators 2132-11 to 213218, . . . , 2132-41 to 2132-48 are each connected to the signal interface section 2150. The signal interface section 2150 controls connections of signals between the remote nodes and to other networks.

For the demultiplexer 2131, multiplexer 2133, and demultiplexer 2141 of the optical modulating section 2130/optical receiving section 2140, one multiplexer/demultiplexer can be used in place of arbitrary two or three of these components by, for example, using an arrayed waveguide grating (AWG) as the multiplexer/demultiplexer and properly setting an input and output ports.

(Example A of Configuration of Remote Node 2200-2)

Now, an example A of a configuration of the remote node 2200-2 will be described with reference to FIGS. 19 and 23. The remote node 2200-2 is composed of a multi-wavelength generator 2250 that outputs the multi-wavelength light 5d of the allocated wavelength band F3, an optical modulating section 2210 that demultiplexes lights of the wavelength channels f31 to f38 from the multi-wavelength light 5d and modulates these lights to generate upstream signal lights 5e, an optical coupler 2201 that couples this upstream signal lights 5e to the optical fiber transmission path 2301, an optical coupler 2201 that splits the downstream signal lights 5c from the optical fiber transmission path 2301, an optical receiving section 2220 that receives signal lights of the wavelength channels f41 to f48 of the wavelength bandwidth F4 belonging to the split the downstream signal lights 5c and allocated to the remote node 2200-2, and a signal interface section 2230 that connects a downstream signal to a user terminal (not shown) and connects an upstream signal from the user terminal to the optical modulating section 2210.

The optical modulating section 2210 uses a demultiplexer 2211 to demultiplex continuous-wave lights of the wavelength channels f31 to f38 from the multi-wavelength light 5d of the wavelength bandwidth F3, and then uses optical modulators 2212-1 to 2212-8 to modulate the continuous-wave lights. Subsequently, the optical modulating section 2210 uses a multiplexer 2213 to multiplex the wavelengths of the modulated lights, and then sends out the resultant upstream signal lights ⑤ to the optical fiber transmission path 2301 (in FIG. 20, this is shown by upward arrows). In this case, unwanted sidebands of the wavelength bandwidth F3 of the multi-wavelength light 5d are removed owing to the multiplexing/demultiplexing characteristics of the demultiplexer 2211 and multiplexer 2213.

The optical receiving section 2220 uses an optical filter 2206 to demultiplex the wavelength bandwidth F4 allocated to the remote node 2200-2 from the split downstream signal lights 5c from the optical fiber transmission path 2301, uses a demultiplexer 2221 to demultiplex signal lights of the wavelength channels f41 to f48 from the wavelength bandwidth F4, and then uses optical receivers 2222-1 to 2222-8 to receive the signal lights. The optical receivers 2222-1 to 2222-8 and the optical modulators 2212-1 to 2212-8 are each connected to the terminal (not shown) via the signal interface section 2230.

In this regard, the optical filter 2206 is not always required provided that the optical demultiplexer 2211 is constructed to demultiplex only the wavelength bandwidths allocated to the remote node from the multi-wavelength light 5c on the optical fiber transmission path 2301. In the following description of examples of configurations, the optical filter 2206 is assumed to be absent.

(Example B of Configuration of Remote Node 2200-2)

Now, an example B of a configuration of the remote node 2200-2 will be described with reference to FIG. 24. This example B is characterized in that the demultiplexer 2211 and multiplexer 2213 in the optical modulating section 2210 in the example A are combined into a multiplexer/demultiplexer 2214 using an arrayed waveguide grating (AWG). The optical receiving section 2220 is similar to that in the example A. However, in this example, the split downstream signal lights 5c is provided by an empty port of the optical coupler 2201 that connects the upstream signal lights 5e to the optical fiber transmission path 2301, and is then connected to the demultiplexer 2221 of the optical receiving section 2220. This is also possible with the example A.

The optical modulating section 2210 of this example uses a multiplexer/demultiplexer 2214 to demultiplex continuous-wave lights of the wavelength channels f31 to f28 from the split multi-wavelength light 5d of the wavelength bandwidth F3, and uses the optical modulators 2212-1 to 2212-8 to modulate these continuous-wave lights. The modulated lights are then returned to the multiplexer/demultiplexer 2214 for wavelength multiplexing. The resultant upstream signal lights 5e is then sent out to the optical fiber transmission path 2301. A configuration such as the one shown in FIG. 24 is obtained by using an AWG as the multiplexer/demultiplexer 2214 and properly selecting an input and output ports depending on the wavelength channels f31 to f38.

(Example C of Configuration of Remote Node 2200-2)

Now, an example C of a configuration of the remote node 2200-2 will be described with reference to FIG. 25. This example C is characterized in that the multiplexer 2213 of the optical modulating section 2210 and the demultiplexer 2221 of the optical receiving section 2220 both in the example A are combined into a multiplexer/demultiplexer 2215 using an arrayed waveguide grating (AWG). However, in this example, the split downstream signal lights 5c is provided by the empty port of the optical coupler 2201 that couples the upstream signal lights 5e to the optical fiber transmission path 2301, and is then connected to the multiplexer/demultiplexer 2215.

The optical modulating section 2210/optical receiving section 2220 of this example uses the demultiplexer 2211 to demultiplex continuous-wave lights of the wavelength channels f31 to f28 from the multi-wavelength light 5d of the wavelength bandwidth F3, and uses the optical modulators 2212-1 to 2212-8 to modulate these continuous lights. The modulated lights then have their wavelengths multiplexed by the multiplexer/demultiplexer 2215. The resultant upstream signal lights 5e is then sent out to the optical fiber transmission path 2301. Further, the split downstream signal lights 5c from the optical fiber transmission path 2301 is input to the multiplexer/demultiplexer 2215, and is then demultiplexed into signal light of the wavelength channels of the wavelength bandwidth F4 allocated to the remote node 2200-2. The resultant lights are received by the optical receivers 2222-1 to 2222-8, respectively. A configuration such as the one shown in FIG. 25 is obtained by using an AWG as the multiplexer/demultiplexer 2215 and properly selecting an input and output ports depending on the wavelength channels f31 to f38 and f41 to f48. Alternatively, an optical circulator may be used so that a common port can be used as both output port for the upstream signal lights 5e and input port for the downstream signal lights 5c.

In embodiment 2-1, shown above, one wavelength bandwidth is allocated to each of the four remote nodes for each of the upstream signal lights and the downstream signal lights. However, the number of remote nodes and the number and arrangement of wavelength bandwidths allocated to each node are arbitrary. However, if for example, the wavelength bandwidths F2 and F4 are allocated to a certain remote node for downstream signal lights, the demultiplexer 2221 of the optical receiving section 2220 may be able to obtain the wavelength channels of the two wavelength bandwidths through demultiplexing, or an independent demultiplexer may be used for each wavelength bandwidth. This also applies to the configuration of the optical modulating section 2210. Further, the eight wavelength channels are set for each wavelength bandwidth. However, the number of wavelength channels is arbitrary.

Further, only the minimum required arrangements are shown for the center node 2200 in FIGS. 21 and 22 and for the remote node 2200-2 in FIGS. 23 to 25. However, for example, an optical amplifier, optical equalizing means for making the optical power of the wavelength channels uniform, an optical bandpass filter that removes ASE light, or the like may be arranged at predetermined positions.

(Embodiment 2-2)

Figure 26:
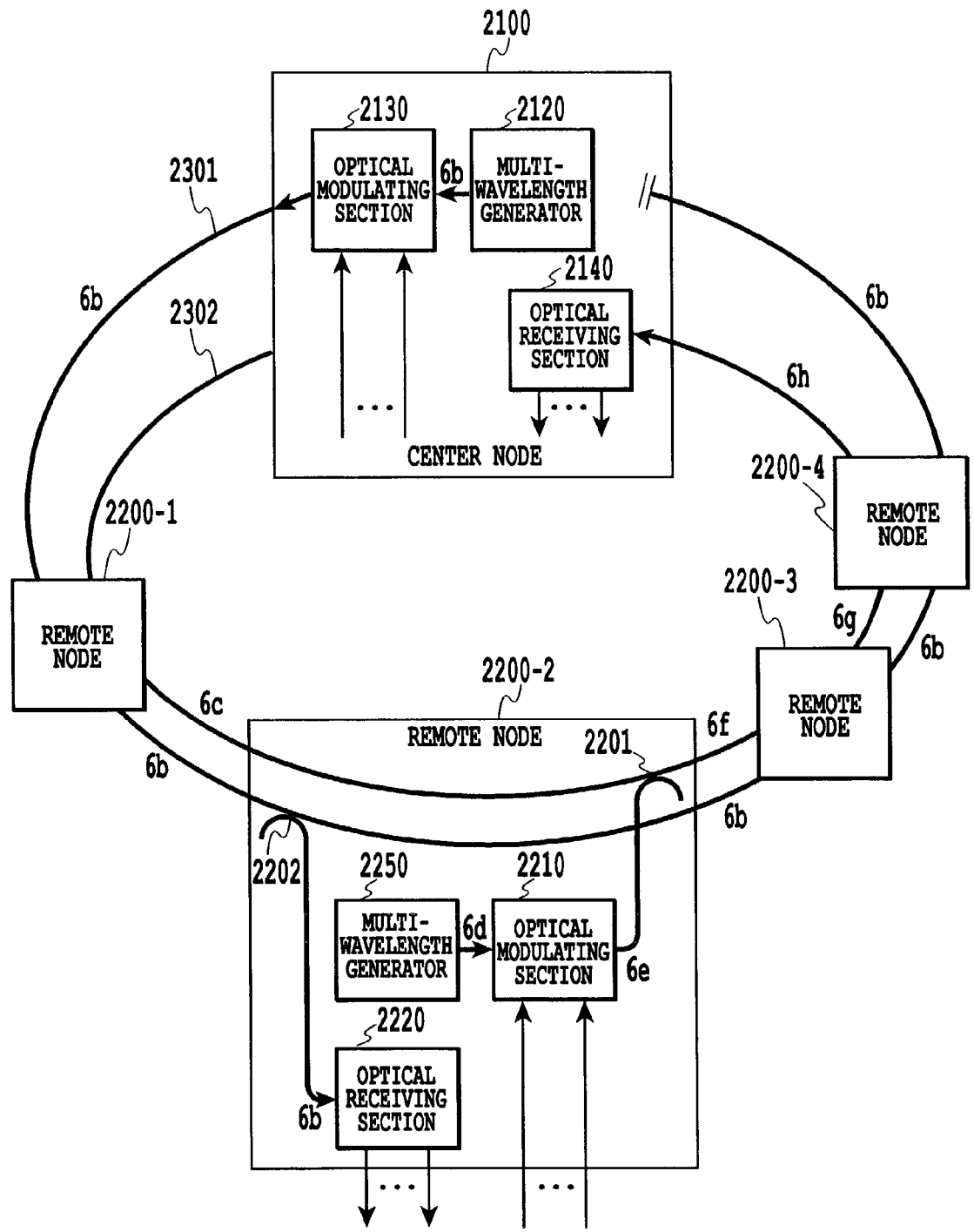
FIG. 26 is a block diagram showing Embodiment 2-2 of the WDM ring network according to the present invention.

FIG. 26 shows Embodiment 2-2 of the WDM ring network according to the present invention.

In the figure, the center node 2100 and the remote nodes 2200-1 to 2200-4 are connected together in ring form via the two optical fiber transmission paths 2301 and 2302. The optical fiber transmission 2301 is used to transmit downstream signal lights from the center node to each remote node. The optical fiber transmission path 2302 is used to transmit upstream signal lights from each remote node to the center node. However, the remote nodes always communicate with each other via the center node. That is, the remote node transmits upstream signal lights to the center node via the optical fiber transmission path 2302. Then, the center node transmits this light to each remote node via the optical fiber transmission path 2301 as downstream signal lights. In this manner, the remote nodes communicate with each other.

Figure 27:
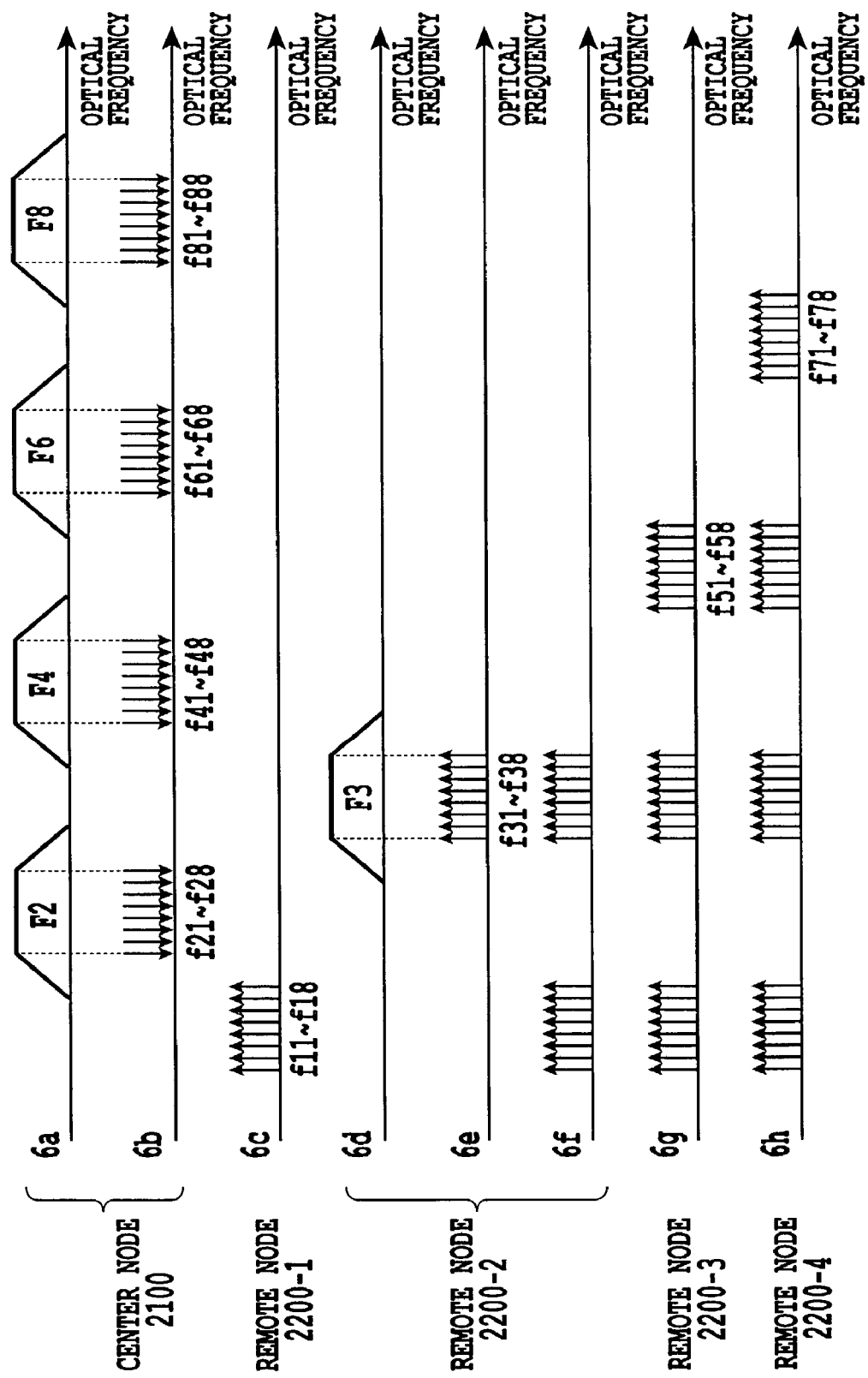
FIG. 27 is a diagram showing the signal state of each point in the WDM ring network.
Figure 28:
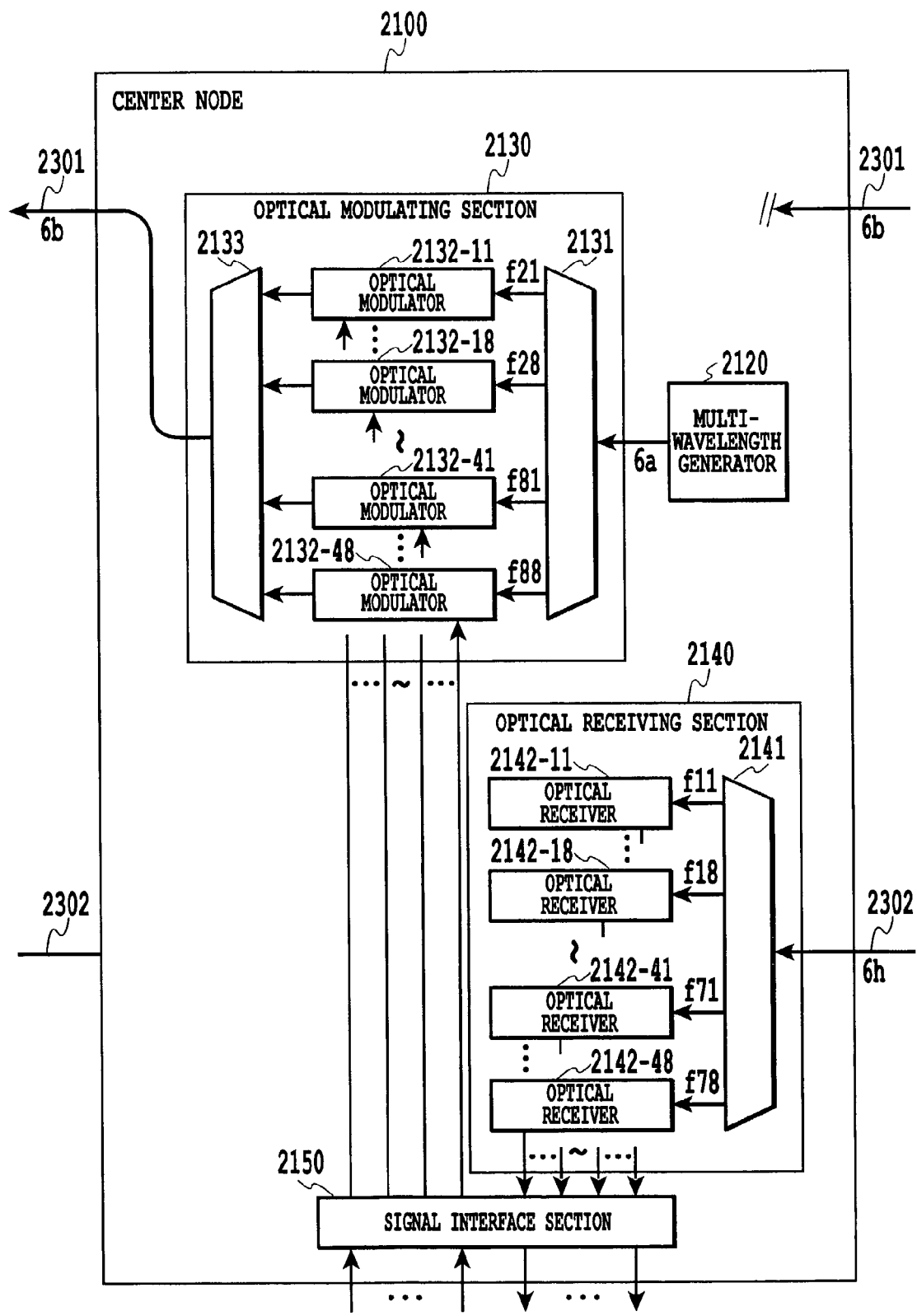
FIG. 28 is a block diagram showing an example of a configuration of the center node 2100.
Figure 29:
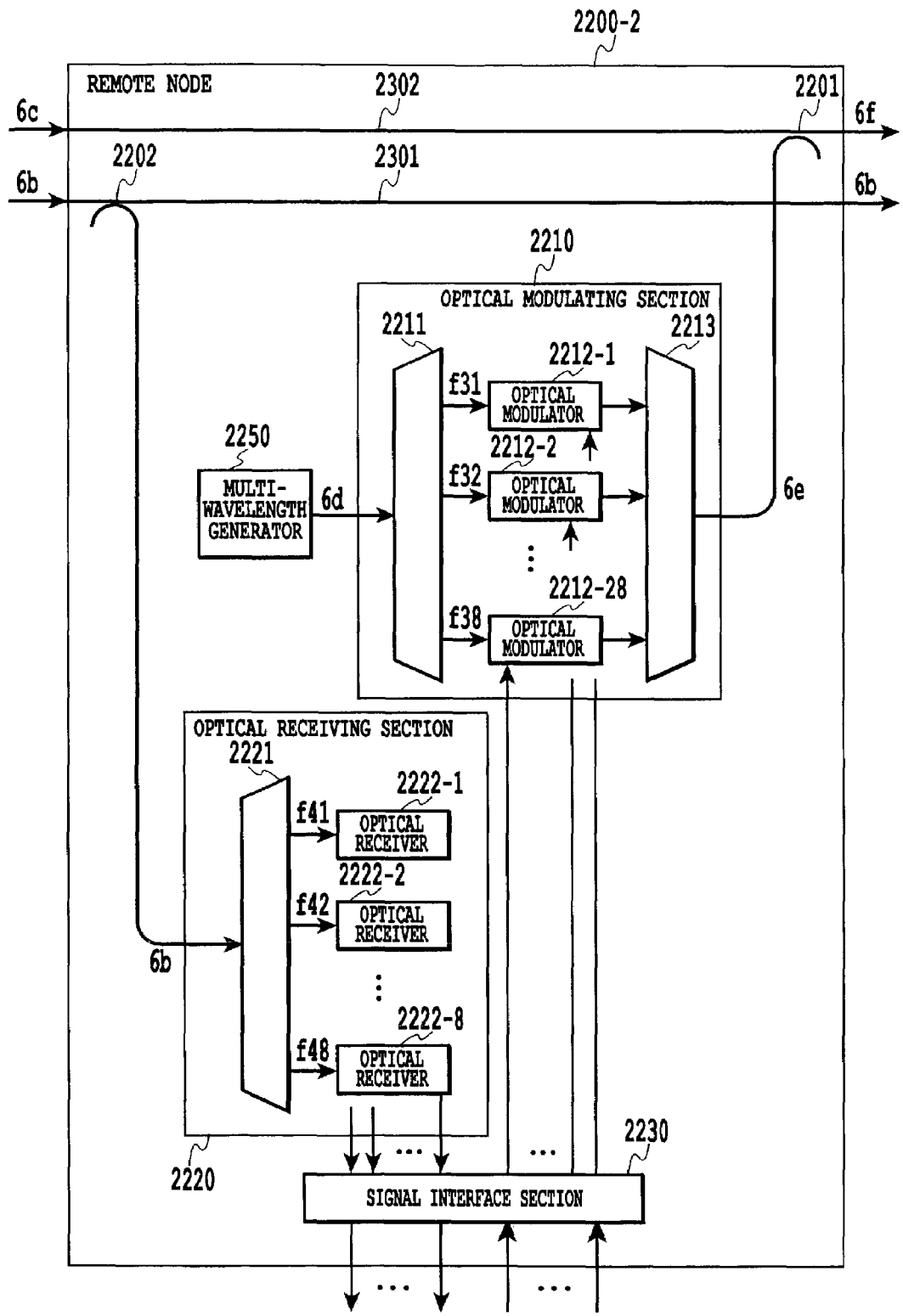
FIG. 29 is a block diagram showing an example of a configuration of the remote node 2200-2.

This embodiment is characterized in that specific wavelength bandwidths are allocated to each remote node as continuous-wave lights and signal light and in that the wavelength bandwidths for the upstream signal lights and the downstream signal lights are alternately set. However, this embodiment differs from Embodiment 2-1 in that separate optical fiber transmission paths are provided to transmit downstream signal lights and upstream signal lights. Specifically, description will be given with reference to FIGS. 27 to 29. FIG. 27 shows the signal state of each point of the WMD ring network. FIG. 28 shows an example of a configuration of the center node 2100. FIG. 29 shows an example of a configuration of the remote node 2200-2. The configurations of the other remote nodes are similar.

(Example of Configuration of Center Node 2100)

The example of the configuration of the center node 2100 will be described with reference to FIGS. 26 and 28. The center node 2100 is composed of the multi-wavelength generator 2120 that transmits downstream signal lights to the optical fiber transmission path 2301, the optical modulating section 2130, the optical receiving section 2140 that receives upstream signal lights from the optical fiber transmission path 2302, and the signal interface section 2150 that interfaces an upstream signal with a downstream signal.

The multi-wavelength generator 2120 is similar to that in Embodiment 2-1. As shown in FIG. 27, multi-wavelength light 6a output by the multi-wavelength generator 2120 is defined to have the bandwidths F2, F4, F6, and F8.

The multi-wavelength light 6a output by the multi-wavelength generator 2120 is input to the optical modulating section 2130. The optical modulating section 2130 uses a demultiplexer 2131 to demultiplex the multi-wavelength light 6a into lights of a plurality of (8 waves×4 remote nodes) wavelength channels, and uses optical modulators 2132-11 to 2132-18, . . . , or 2132-41 to 2132-48 corresponding to the remote node to modulate these channels (f21 to f28, f41 to f48, f61 to f68, f81 to f88) lights. Then, the optical modulating section 2130 uses a multiplexer 2133 to multiplex the wavelengths of the modulated lights, and then sends out the resultant downstream signal lights 6b to the optical fiber transmission path 2301 (in FIG. 27, these lights are shown by downward arrows). In this case, unwanted sidebands of the multi-wavelength light 6a are removed owing to the multiplexing and demultiplexing characteristics of the demultiplexer 2131 and multiplexer 2133. The downstream signal lights 6b travels around the optical fiber transmission path 2301 to return to the center node 2100, where it is optically terminated.

The remote nodes 2200-1 to 2200-4 demultiplex, before reception, signal lights of the wavelength channels f21 to f28 of the wavelength bandwidth F2, signal lights of the wavelength channels f41 to f48 of the wavelength bandwidth F4, signal lights of the wavelength channels f61 to f68 of the wavelength bandwidth F6, and signals light of the wavelength channels f81 to f88 of the wavelength bandwidth F8, respectively, the wavelength bands allocated to the remote nodes from the downstream signal lights 6b from the optical fiber transmission path 2301. Furthermore, the remote nodes 2200-1 to 2200-4 modulates the wavelength channels f11 to f18 of the wavelength bandwidth F1, the wavelength channels f31 to f38 of the wavelength bandwidth F3, the wavelength channels f51 to f58 of the wavelength bandwidth F5, and the wavelength channels f71 to f78 of the wavelength bandwidth F7, respectively, the wavelength bands allocated to the remote nodes, and send out the resultant upstream signal lights to the optical fiber transmission path 2302. In this case, as shown at 6c, 6f, 6g, and 6h in FIG. 27, the upstream signal lights of the wavelength bands F1 (f11 to f18), F3 (f31 to f38), F5 (f51 to f58), and F7 (f71 to f78) sequentially merge with one another and then reach the center node 2100 (the configuration of the remote node will be described later).

The optical receiving section 2140 of the center node 2100 uses a demultiplexer 2141 to demultiplex the upstream signal lights 6h from the optical fiber transmission path 2302 into signal lights of the wavelength channels. The optical receiving section 2140 then uses the optical receivers 2142-11 to 2142-18, ..., or 2142-41 to 214248 corresponding to the remote node to receive the signal lights of the wavelength channels (f11 to f18, f31 to f38, f51 to f58, and f71 to f78). The optical receivers 2142-11 to 2142-18, ..., 2142-41 to 2142-48 and the optical modulators 2132-11 to 2132-18, ..., 2132-41 to 2132-48 are each connected to the signal interface section 2150. The signal interface section 2150 controls connections of signals between the remote nodes and to other networks.

The optical modulating section 2130 ad optical receiving section 2140 of the center node 2100 of this embodiment may be constructed similarly to the example B shown in FIG. 22 in Embodiment 2-1.

(Example of Configuration of Remote Node)

Now, an example of a configuration of the remote node 2200-2 will be described with reference to FIGS. 26 and 29. The remote node 2200-2 is composed of the multi-wavelength generator 2250 that outputs the multi-wavelength light 6a of the allocated wavelength band F3, the optical modulating section 2210 that demultiplexes lights of the wavelength channels f31 to f38 from the multi-wavelength light 6d and modulates these lights to generate upstream signal lights 6e, the optical coupler 2201 that couples this upstream signal lights 6e to the optical fiber transmission path 2302, an optical coupler 2202 that splits the downstream signal lights 6b from the optical fiber transmission path 2301, the optical receiving section 2220 that receives signal lights of the wavelength channels f41 to f48 of the wavelength bandwidth F4 belonging to the split the downstream signal lights 6b and allocated to the remote node 2200-2, and the signal interface section 2230 that connects a downstream signal to the user terminal (not shown) and connects an upstream signal from the user terminal to the optical modulating section 2210.

The remote node 2200-2 has the same configuration as Embodiment 2-1, shown in FIG. 23, except for connections with the optical fiber transmission paths 2301 and 2302.

In Embodiment 2-2, shown above, one wavelength bandwidth is allocated to each of the four remote nodes for each of the upstream signal lights and the downstream signal lights. However, the number of remote nodes and the number and arrangement of wavelength bandwidths allocated to each node are arbitrary. Further, the eight wavelength channels are set for each wavelength bandwidth. However, the number of wavelength channels is arbitrary.

Further, only the minimum required arrangements are shown for the center node 2100 in FIG. 28 and for the remote node 2200-2 in FIG. 29. However, for example, an optical amplifier, optical equalizing means for making the optical power of the wavelength channels uniform, an optical bandpass filter that removes ASE light, or the like may be arranged at predetermined positions.

Moreover, in this embodiment, the direction in which light is transmitted through the optical fiber transmission path 2301, used to transmit downstream signal lights from the center node to each remote node, is the same as the direction in which light is transmitted through the optical fiber transmission path 2302, used to transmit upstream signal lights from each remote node to the center node (in the figure, leftward). However, light may be transmitted in the different directions. That is, each remote node may receive downstream signal lights transmitted via the optical fiber transmission path 2301 and then returns this signal to the center node via the optical fiber transmission path 2302 as upstream signal lights.

(Embodiment 2-3)

Description will be given of action to take if in the configurations of Embodiments 2-1 and 2-2, shown above, any fault occurs in any device constituting the center node or remote node or in the optical fiber transmission path.

Typically, the devices and the optical fiber transmission path each comprise a working and protection systems. Thus, if any fault occurs in the working system, it is switched to the protection system. If any fault occurs in any working device or the optical fiber transmission path, the device and optical fiber transmission path either of which is defective is switched to the corresponding protection systems as a set or only the defective device or optical fiber transmission path is switched to the corresponding protection system.

Further, with a configuration with a working and protection optical fiber transmission paths, for transmissions from the center node to each remote node, signal light may be sent out to both working and protection optical fiber transmission paths. For receptions, the working optical fiber transmission path is normally selected, and if any fault occurs in the working optical fiber transmission path, it may be switched to the protection optical fiber transmission path. In this regard, if in Embodiment 2-2, the optical fiber transmission paths 2301 and 2302 are set to have the different transmission directions, faults in the optical fiber transmission paths can be dealt with without any protection optical fiber transmission paths. Description will be given below with reference to FIG. 30.

Figure 30:
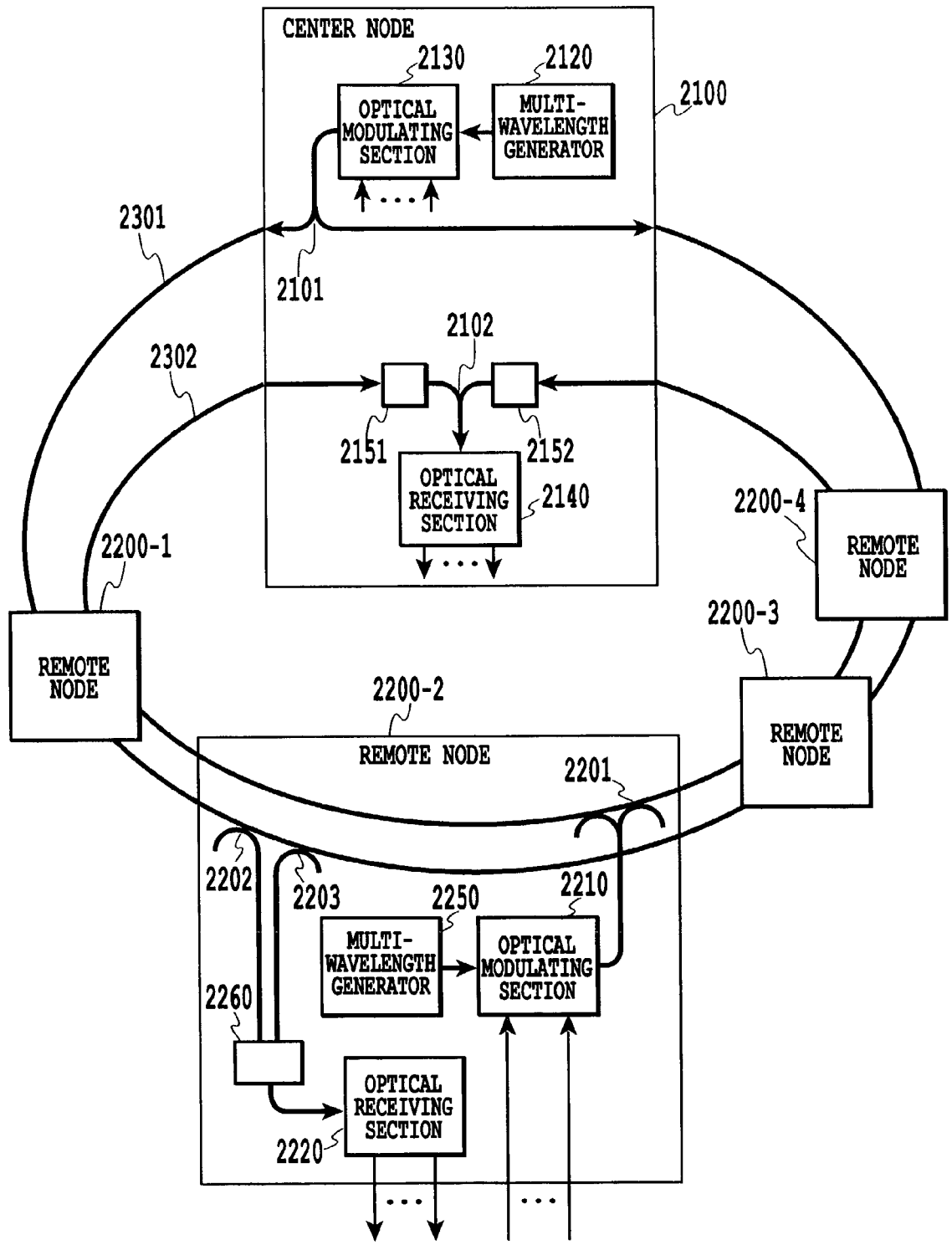
FIG. 30 is a block diagram showing Embodiment 2-3 of the WDM ring network according to the present invention.

In FIG. 30, the detailed configurations of the center and remote nodes are similar to those shown in FIGS. 28 and 29. However, downstream signal lights output by the optical modulating section 2130 of the center node 2100 is split into two by the optical coupler 2101. The lights obtained are transmitted to the optical fiber transmission path 2301 in the different directions. In the remote node 2200-2 (like other remote nodes), an optical coupler 2202 splits leftward downward downstream signal lights transmitted via the optical fiber transmission path 2301, while an optical coupler 2203 splits rightward downstream signal lights. Then, an optical switch 2260 selects one of the split lights. The selected light is then received by the optical receiving section 2220.

Downstream signal lights output by the optical modulating section 2210 of the remote node 2200-2 (like other remote nodes) is split into two by the optical coupler 2201. The lights obtained are transmitted to the optical fiber transmission path 2302 in the different directions.

In the center node 2100, rightward upstream signal lights and leftward upstream signal lights transmitted via the optical fiber transmission path 2302 are subjected to selection or merging by the optical switches 2151 and 2152 and the optical coupler 2102. The resultant signal is received by the optical receiving section 2140. The present invention is not limited to the configuration based on the optical switches 2151 and 2152 and the optical coupler 2102 provided that it is possible to implement a function of selecting one or both of the rightward and leftward upstream signal lights transmitted via the optical fiber transmission path 2302.

If the optical fiber transmission paths 2301 and 2302 are normal, the optical switch 2260 in the remote node selects one of the downstream signal lights transmitted by the center node 2100 to the optical fiber transmission path 2301 in both directions. Then, one of the optical switches 2151 and 2152 in the center node 2100 is turned on to receive one of the upstream signal lights transmitted by the remote node to the optical fiber transmission path 2302 in both directions.

On the other hand, if for example, any fault occurs in the optical fiber transmission path 2301 or 2302 between the remote nodes 2200-1and 2200-2, then for the downstream signal lights transmitted by the center node 2100 to the optical fiber transmission path 2301 in both directions, only the downstream signal lights transmitted leftward reach the remote node 2200-1, whereas only the downstream signal lights transmitted rightward reach the remote nodes 2200-4, 2200-3, and 2200-2. Thus, each remote node selects the downstream signal lights transmitted in the corresponding direction. On the other hand, for the upstream signal lights transmitted by the remote node 2200-1 to the optical fiber transmission path 2302 in both directions, only the upstream signal lights transmitted rightward reaches the center node 2100. For the upstream signal lights transmitted by the remote nodes 2200-4, 2200-3, and 2200-2 to the optical fiber transmission path 2302 in both directions, only the upstream signal lights transmitted leftward reaches the center node 2100. Thus, the center node 2100 turns on both optical switches 2151 and 2152 to receive the light.

With such a configuration and operations of the optical switches, even if any fault occurs in one or both of the optical fiber transmission paths 2301 and 2302, it can be dealt with using a mechanism in which light is sent back at the fault point.

(Embodiment 3-1)

In general, the optical fiber transmission paths 1301 and 1302 in the WDM ring networks according to Embodiments 1-1 (FIG. 6), 1-2 (FIG. 13), 1-3 (FIG. 17), and 1-4 (FIG. 18) do not retain the polarized state of signal light but allow it to vary arbitrarily. Accordingly, to use an optical modulator with marked polarization sensitivity as the optical modulator 1212 of the remote node 1200, continuous-wave lights supplied to each remote node by the center node 1100 must be polarization-scrambled.

That is, in the configurations of FIGS. 6, 8, 9, 13, 15, 17, and 18, a polarization scrambler is arranged after the multiple-wavelength generator 1110. Such a polarization scrambler is described in, for example, Japanese Patent Application Laid-open No. 9-326758 (1997) (polarization-scrambled transmission method and apparatus using short pulse light) or Japanese Patent Application Laid-open No. 9-326767 (1997) (polarization-scrambling method and apparatus).

Further, to use an optical modulator with marked polarization sensitivity as the optical modulator 1132 of the optical modulating section 1130, which generates downstream signal lights in the center node 1100, a polarization scrambler may similarly be arranged after the multiple-wavelength generator 1120, or all optical parts interposed between the multi-wavelength generator 1120 and the optical modulator 1132 may be constructed so as to be of a polarization maintaining type.

Figure 31:
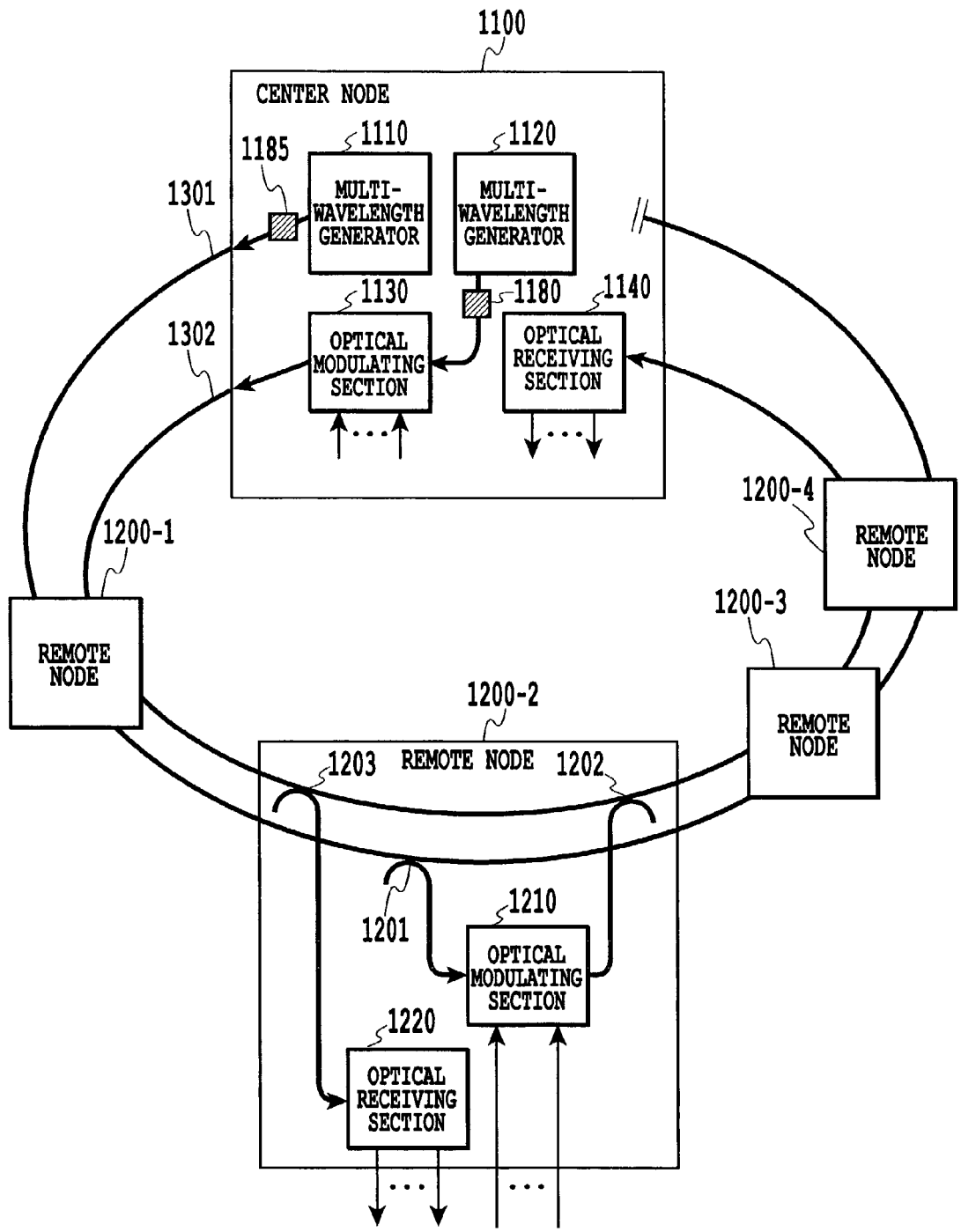
FIG. 31 is a block diagram showing Embodiment 3-1 of the WDM ring network according to the present invention.
Figure 32:
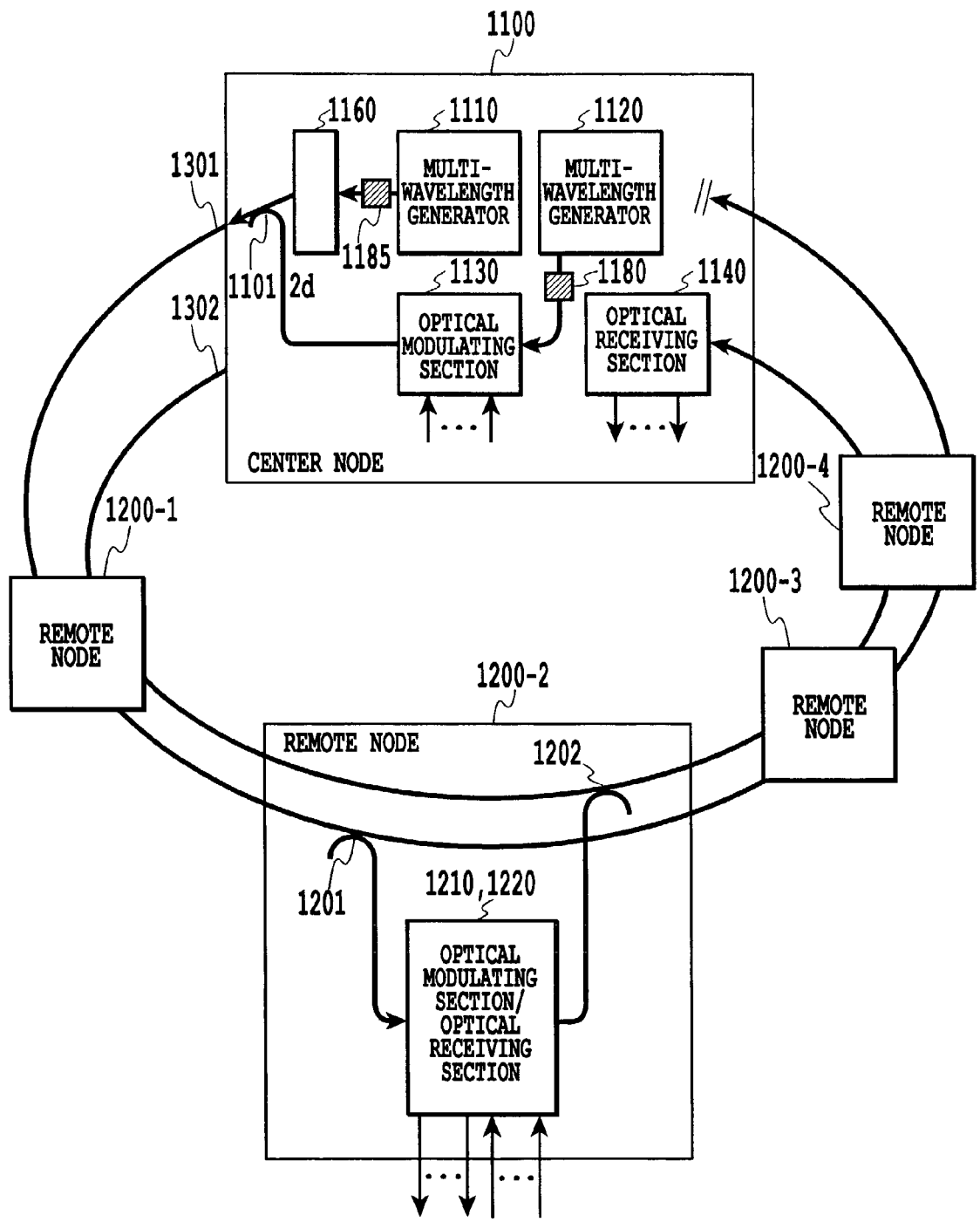
FIG. 32 is a block diagram showing Embodiment 3-1 of the WDM ring network according to the present invention.

FIGS. 31 and 32 show Embodiment 3-1 of the WDM ring network of the present invention. The WDM ring network in FIG. 31 is composed of the configuration shown in FIG. 6, to which a polarization scrambler such as the one described above is added. The WDM ring network in FIG. 32 is composed of the configuration shown in FIG. 13, to which a polarization scrambler such as the one described above is added. In these networks, a polarization scrambler 1185 is arranged after the multiple-wavelength generator 1110, and a polarization scrambler 1180 is arranged after the multiple-wavelength generator 1120.

(Embodiment 3-2)

In the WDM ring networks of Embodiments 2-1 (FIG. 19), 2-2 (FIG. 26), and 2-3 (FIG. 30), to use optical modulators with marked polarization sensitivity as the optical modulator 2132 of the center node 2100 and the optical modulator 2212 of the remote node 2200, multi-wavelength lights output by the multi-wavelength generators 2120 and 2250 must be polarization-scrambled. That is, a polarization scrambler is arranged after each of the multiple-wavelength generator 2120 and 2250. Such a polarization scrambler is described in, for example, Japanese Patent Application Laid-open No. 9-326758 (1997) (polarization-scrambled transmission method and apparatus using short pulse light) or Japanese Patent Application Laid-open No. 9-326767 (1997) (polarization-scrambling method and apparatus). Alternatively, all optical parts interposed between the multi-wavelength generator 2120, 2250 and the optical modulator 2132, 2212 may be constructed so as to be of a polarization maintaining type.

Figure 33:
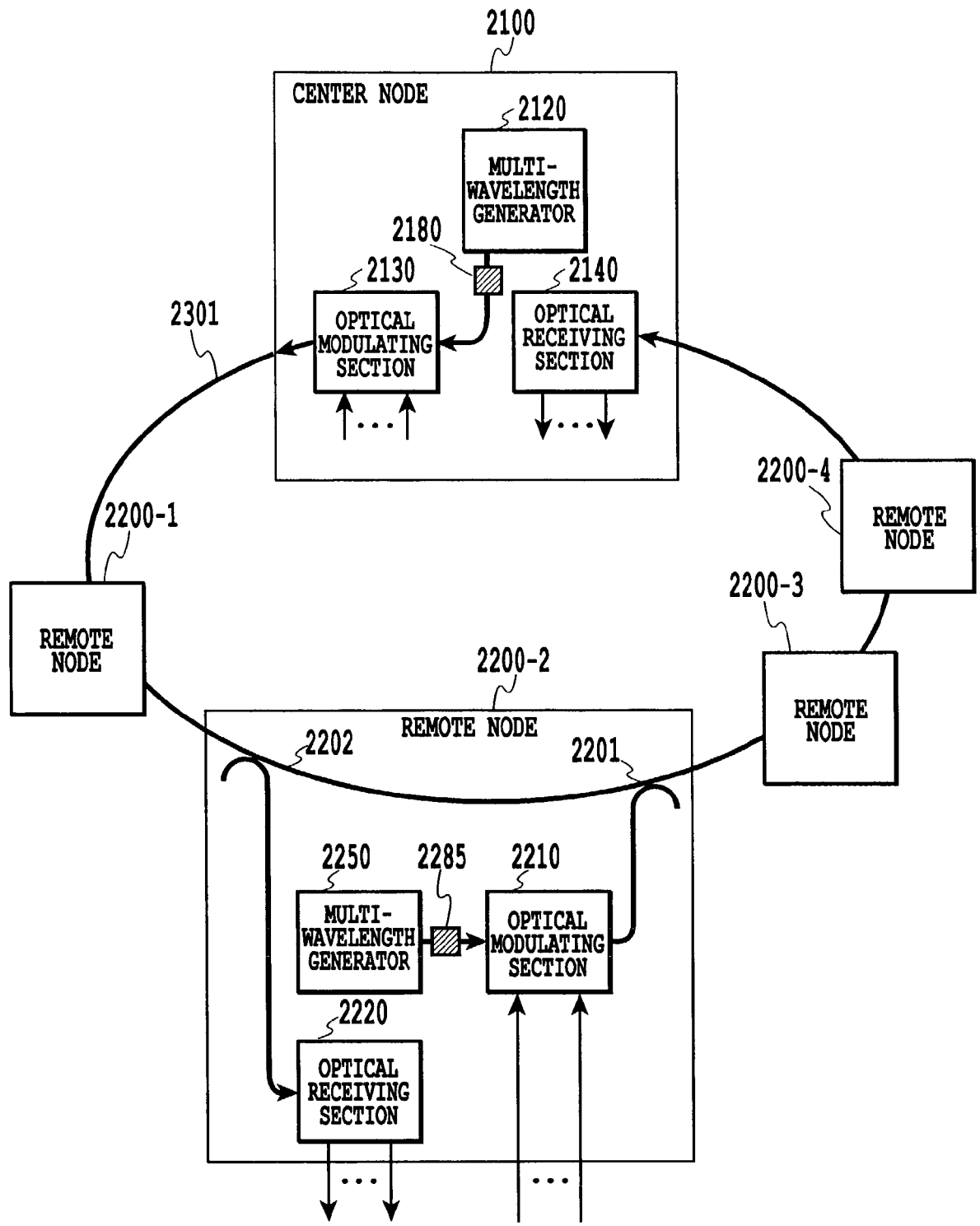
FIG. 33 is a block diagram showing Embodiment 3-2 of the WDM ring network according to the present invention.
Figure 34:
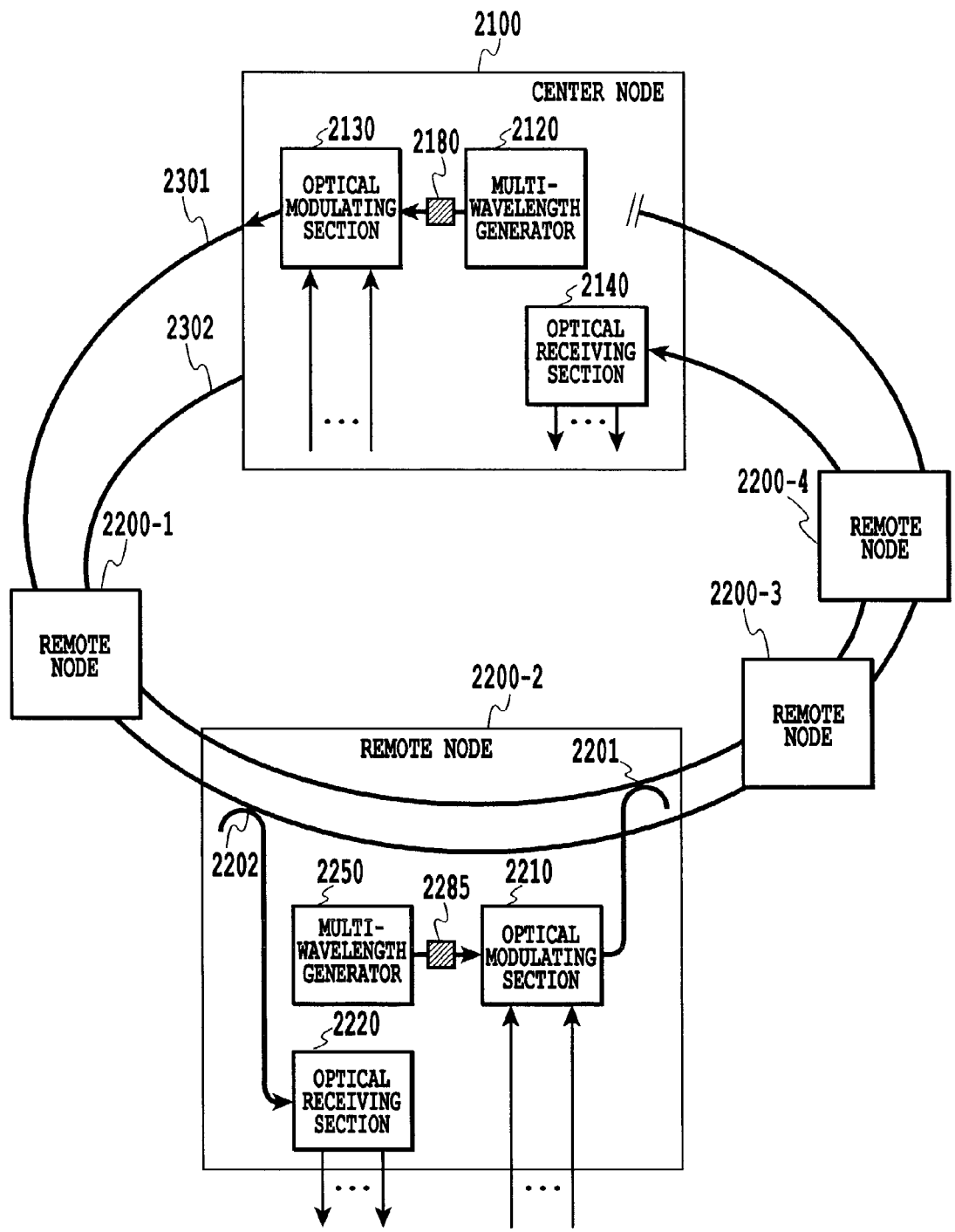
FIG. 34 is a block diagram showing Embodiment 3-2 of the WDM ring network according to the present invention.

FIGS. 33 and 34 show Embodiment 3-2 of the WDM ring network of the present invention. The WDM ring network in FIG. 33 is composed of the configuration shown in FIG. 19, to which a polarization scrambler such as the one described above is added. The WDM ring network in FIG. 34 is composed of the configuration shown in FIG. 26, to which a polarization scrambler such as the one described above is added. In these networks, a polarization scrambler 2185 is arranged after the multiple-wavelength generator 2250, and a polarization scrambler 2180 is arranged after the multiple-wavelength generator 2180.

(Embodiment 3-3)

FIGS. 35A to 38B show Embodiment 3-3 of the WDM ring network of the present invention. In Embodiment 3-3, an optical distributing coupler is arranged after the multi-wavelength generator so that light generated by the multi-wavelength generator is distributed by the optical distributing coupler and shared by a plurality of different networks.

Figure 35A:
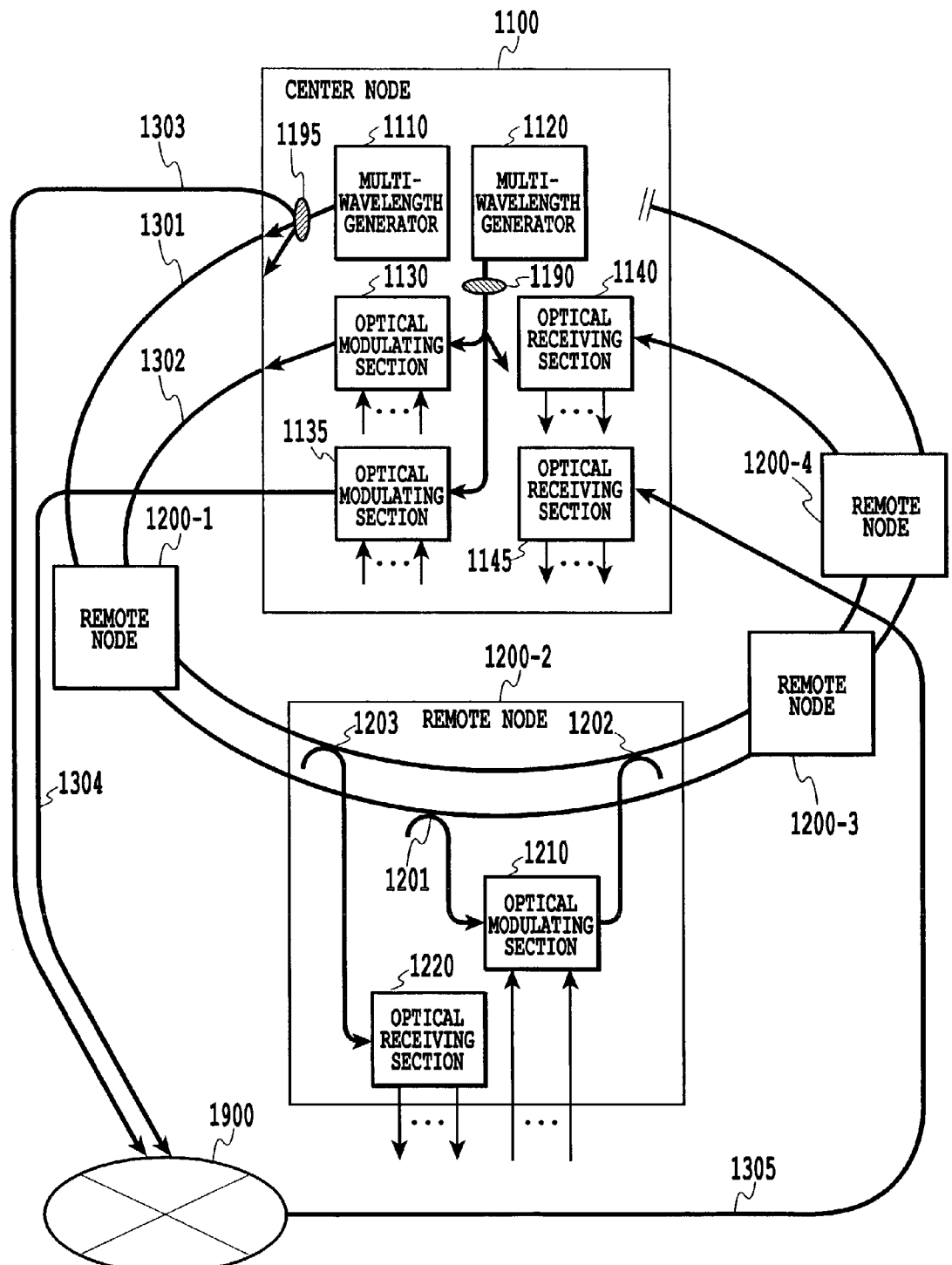
FIGS. 35A and 35B are block diagrams showing Embodiment 3-3 of the WDM ring network according to the present invention.
Figure 36A:
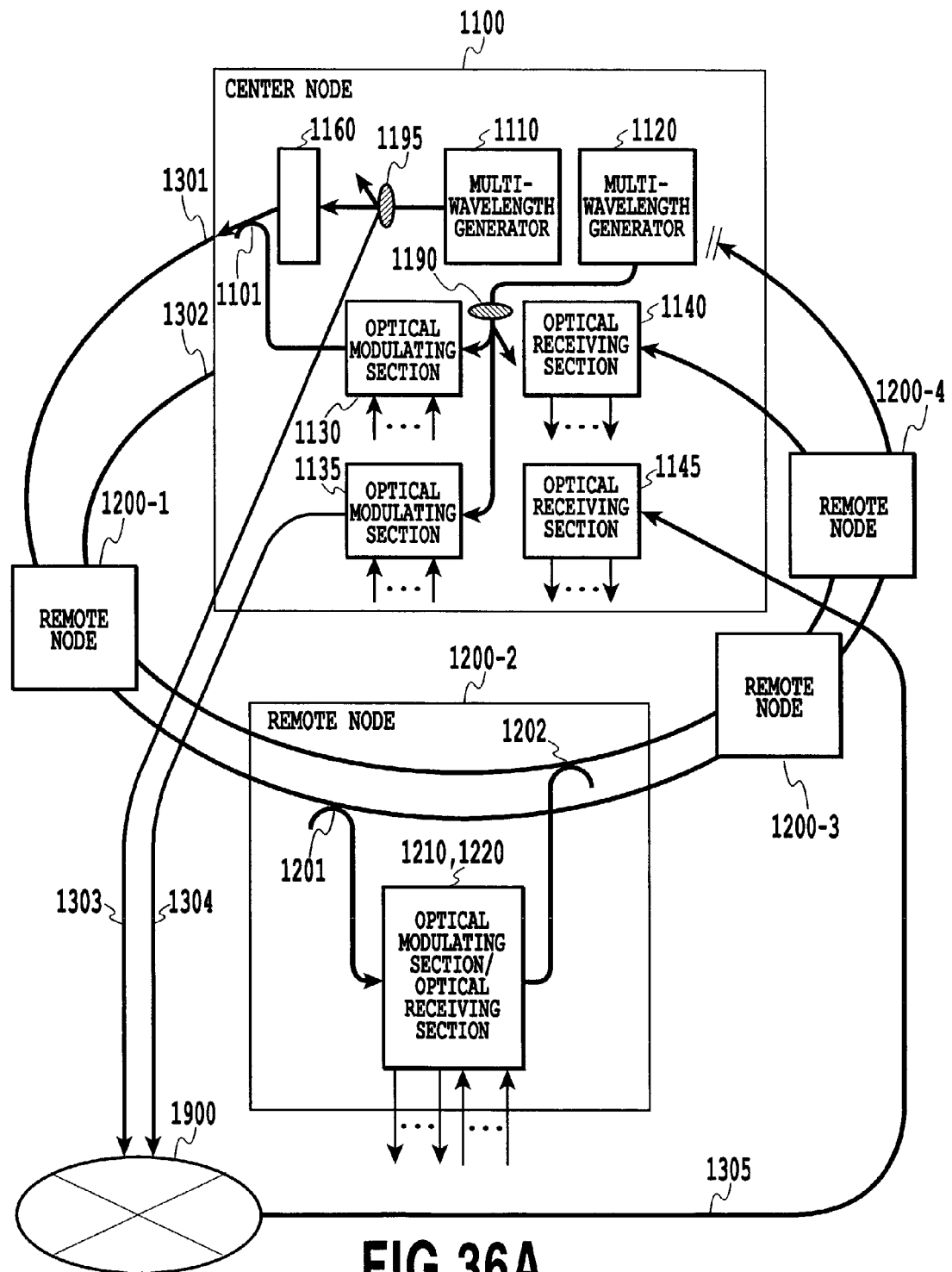
FIGS. 36A and 36B are block diagrams showing Embodiment 3-3 of the WDM ring network according to the present invention.

The WDM ring network in FIG. 35A is based on the configuration shown in FIG. 6, in which an optical distributing coupler is provided after the multi-wavelength generator. The WDM ring network in FIG. 36A is based on the configuration shown in FIG. 13, in which an optical distributing coupler is provided after the multi-wavelength generator. As shown in FIGS. 35A and 36A, multi-wavelength light distributed by an optical distributing coupler 1195 arranged after the multi-wavelength generator 1110 is supplied to a different WDM ring network 1900 via an optical fiber transmission path 1303. Further, multi-wavelength light distributed by an optical distributing coupler 1190 arranged after the multi-wavelength generator 1120 is modulated by an optical modulating section 1135 and then supplied to the different WDM ring network 1900 via an optical fiber transmission path 1304. On the other hand, upstream signal lights from the WDM ring network is received by an optical receiving section 1145 through an optical fiber transmission path 1305. The optical modulating section 1135 and the optical receiving section 1145 need not necessarily be located within the center node 1100 but may be arranged in the different WDM ring network 1900. Further, this figure shows an example in which light is distributed to the two WDM ring networks. However, the present invention is not limited to this aspect, but light may be distributed to arbitrary WDM ring networks. Further, the multi-wavelength generators 1110 and 1120 may distribute light to separate WDM ring networks. In addition, the different WDM ring network 1900 need not necessarily be in ring form but may be of a star type, a point-to-point type, or any other type.

Figure 37A:
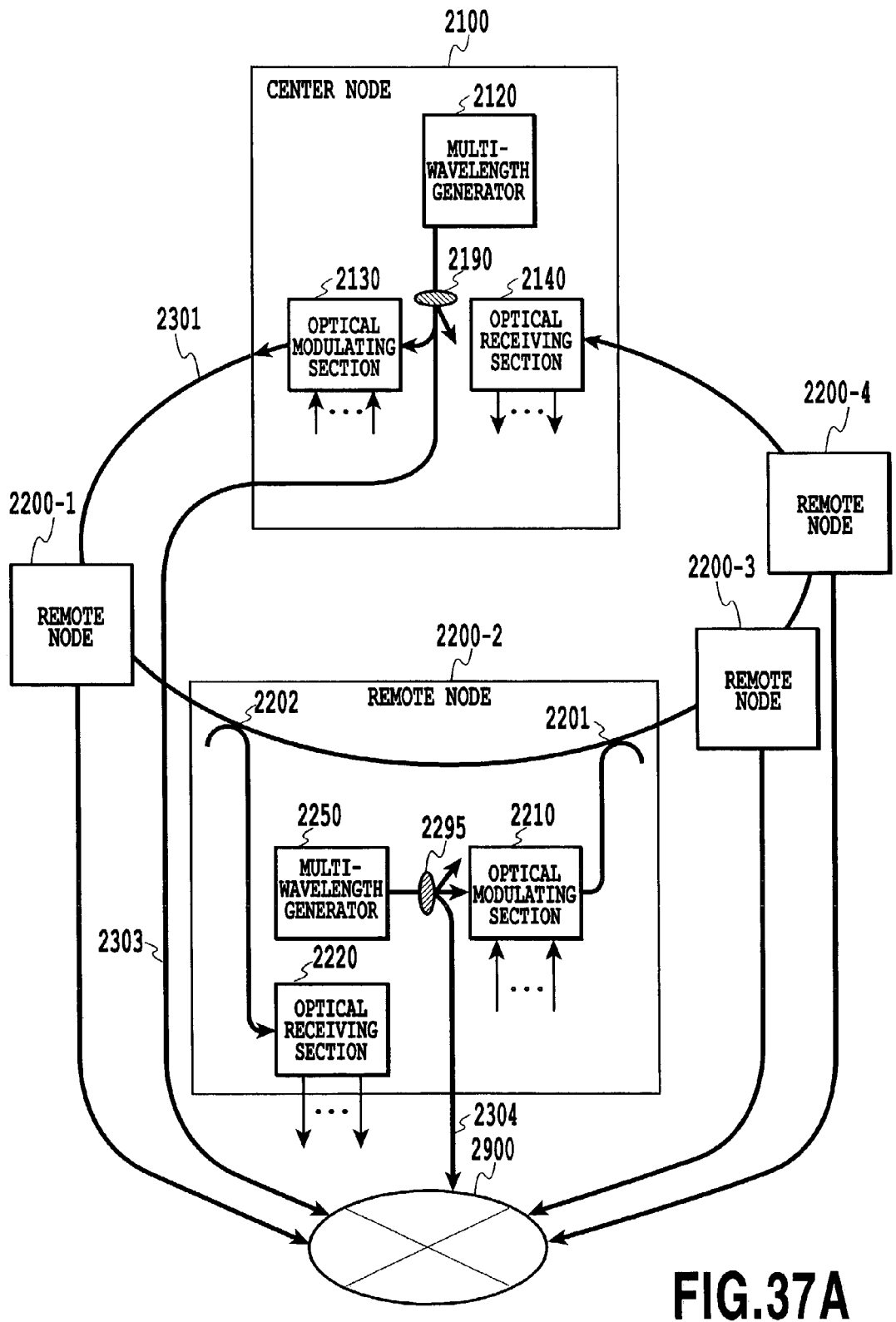
FIGS. 37A and 37B are block diagrams showing Embodiment 3-3 of the WDM ring network according to the present invention.
Figure 38A:
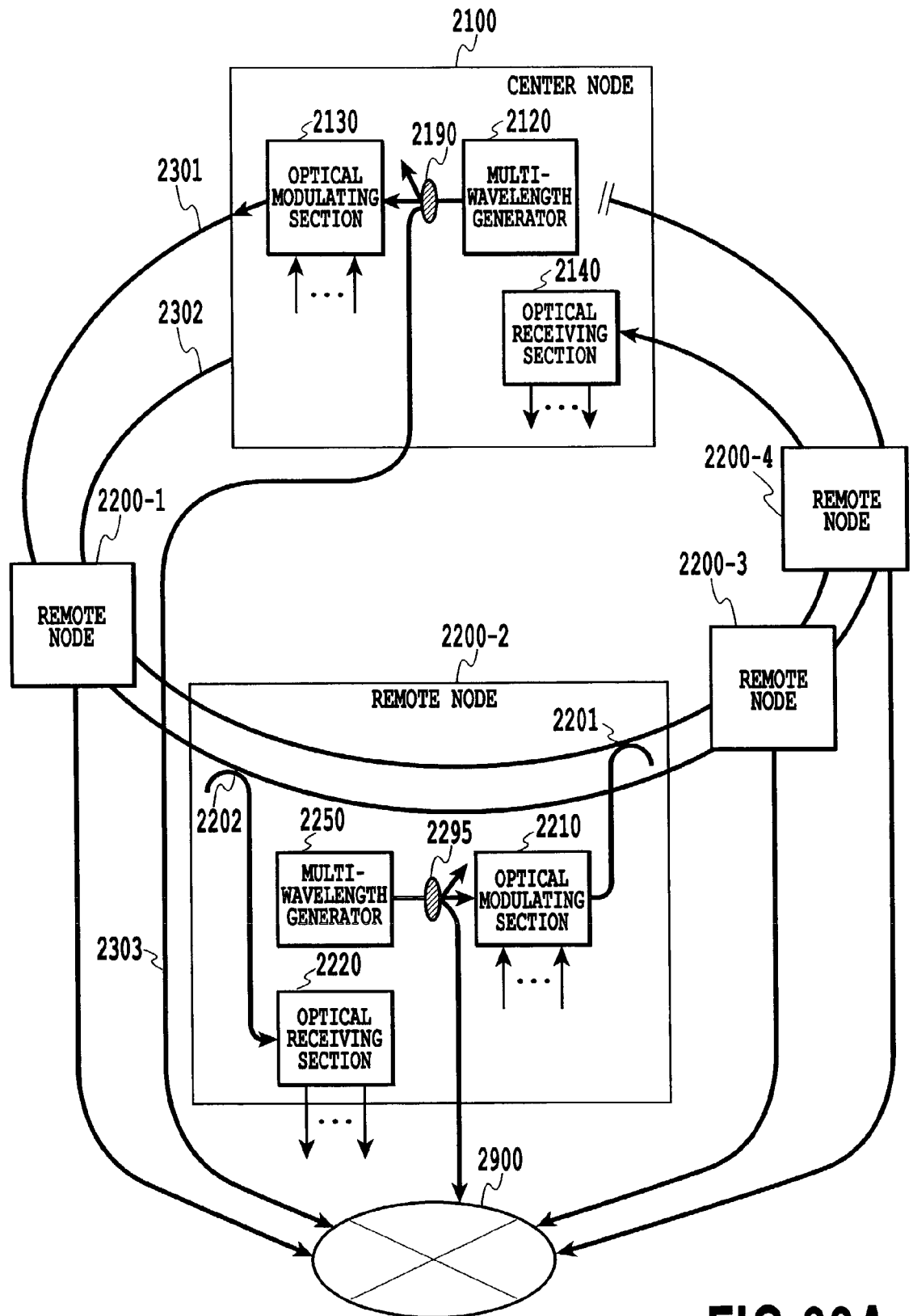
FIGS. 38A and 38B are block diagrams showing Embodiment 3-3 of the WDM ring network according to the present invention.

The WDM ring network in FIG. 37A is based on the configuration shown in FIG. 19, in which an optical distributing coupler is provided after the multi-wavelength generator. The WDM ring network in FIG. 38A is based on the configuration shown in FIG. 26, in which an optical distributing coupler is provided after the multi-wavelength generator. As shown in FIGS. 37A and 38A, multi-wavelength light distributed by an optical distributing coupler 2190 arranged after the multi-wavelength generator 2120 is supplied to a different WDM ring network 2900 via an optical fiber transmission path 2303. Further, multi-wavelength light distributed by an optical distributing coupler 2295 arranged after the multi-wavelength generator 2250 in the remote node 2200-2 is supplied to the WDM ring network 2900 via an optical fiber transmission path 2304. The other remote nodes similarly supplies continuous-wave lights to the WDM ring network 2900. This figure shows an example in which light is distributed to the two WDM ring networks. However, the present invention is not limited to this aspect, but light may be distributed to arbitrary WDM ring networks. Further, the center node and each remote node may distribute light to separate WDM ring networks. In addition, the different WDM ring network 2900 need not necessarily be in ring form but may be of a star type, a point-to-point type, or any other type.

Furthermore, Embodiment 3-3 uses a polarization scrambler such as those described in Embodiments 3-1 and 3-2. The polarization scrambler is arranged between the multi-wavelength generator and the optical distributing coupler so that light generated by the multi-wavelength generator can be polarization-scrambled at once before being shared by different networks. This enables the use of an optical modulator with marked polarization sensitivity. FIGS. 35B, 36B, 37B, and 38B show configurations in which a polarization scrambler is applied to FIGS. 35A, 36A, 37A, and 38A.

Figure 35B:
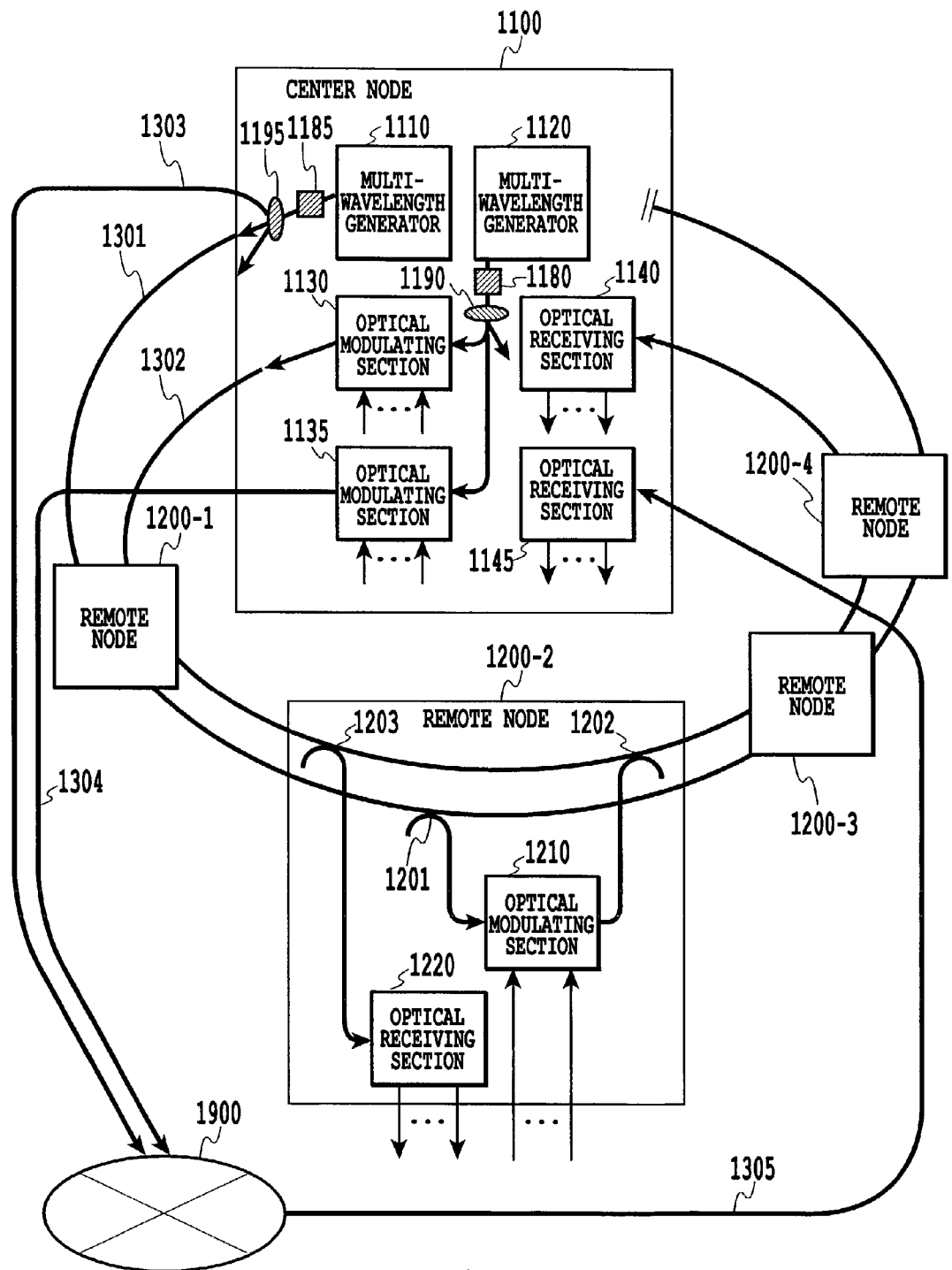
Figure 36B:
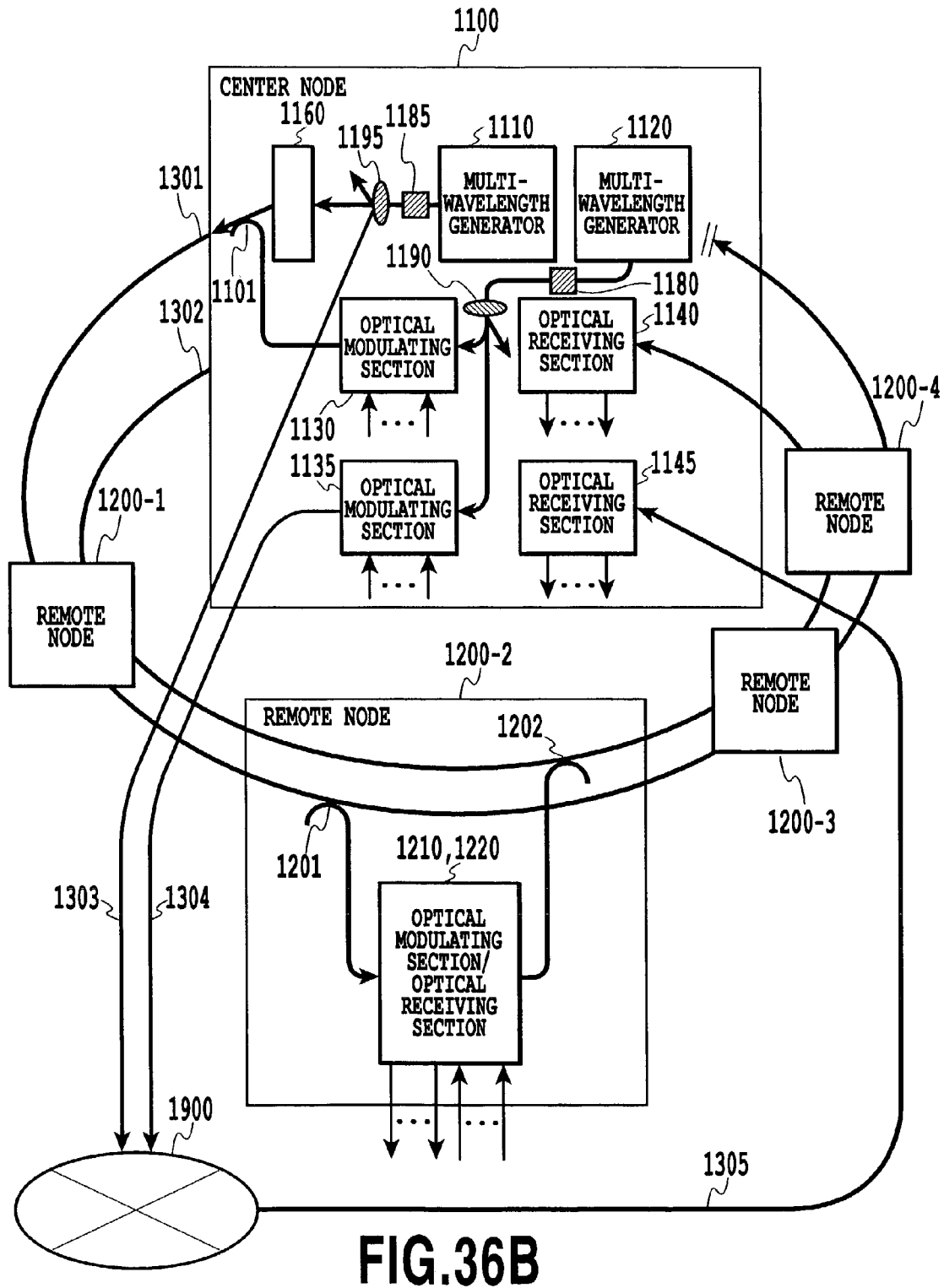

As shown in FIGS. 35B and 36B, multi-wavelength output by the multi-wavelength generator 1110 is polarization-scrambled by the polarization scrambler 1185 before being distributed by the optical distributing coupler 1195. Further, multi-wavelength output by the multi-wavelength generator 1120 is polarization-scrambled by the polarization scrambler 1180 before being distributed by the optical distributing coupler 1190.

Figure 37B:
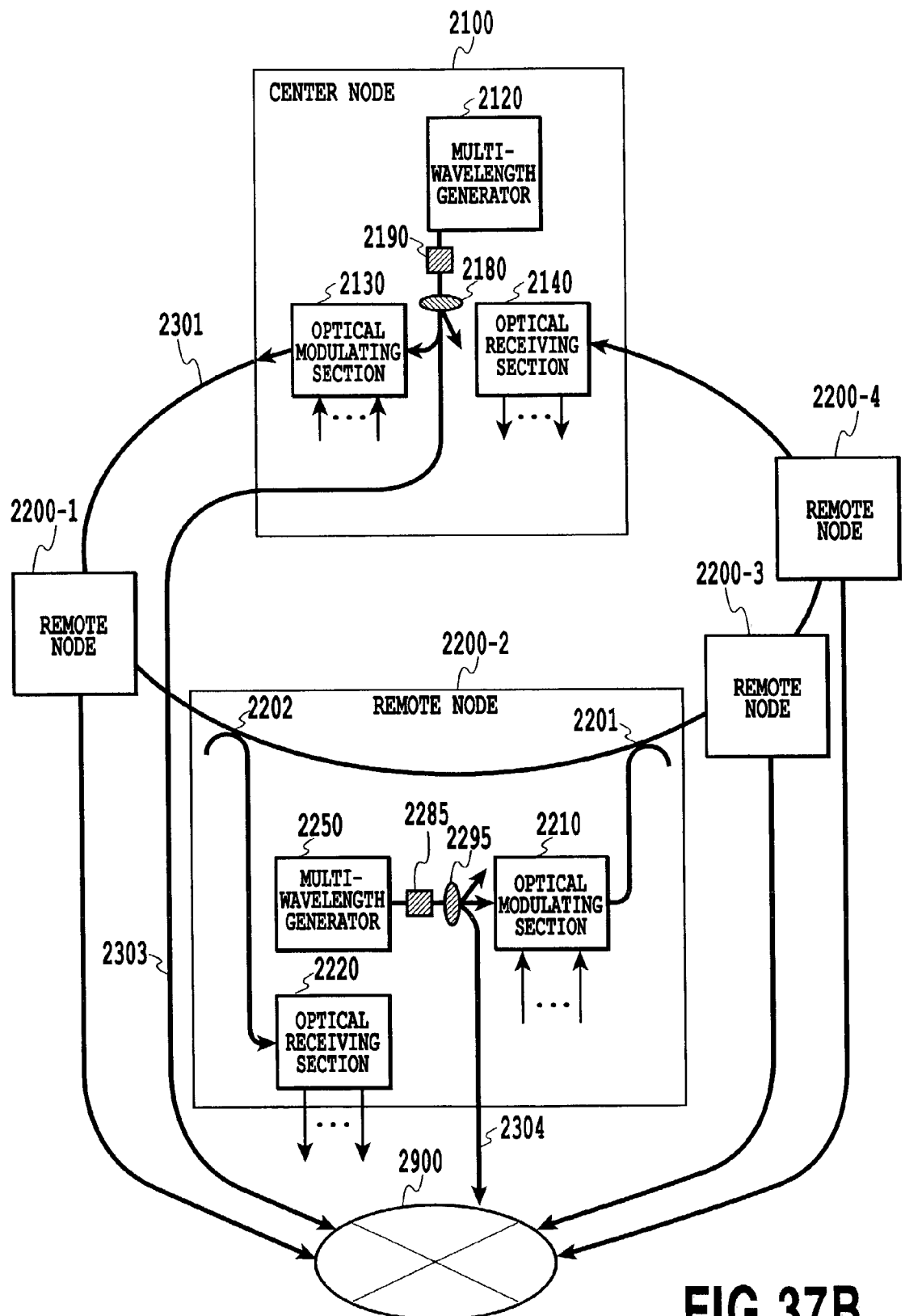
Figure 38B:
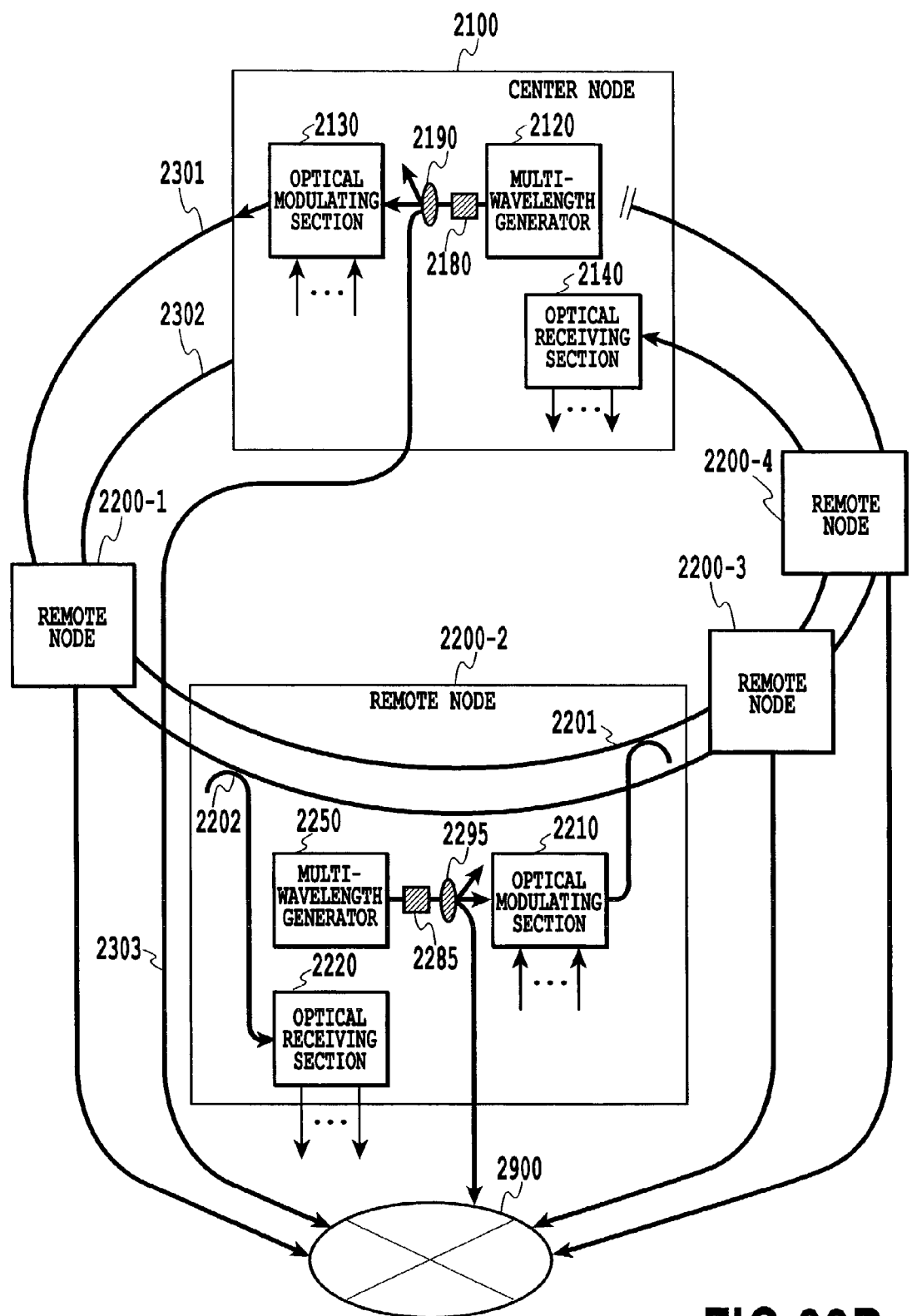

As shown in FIGS. 37B and 38B, multi-wavelength output by the multi-wavelength generator 2120 is polarization-scrambled by the polarization scrambler 2180 before being distributed by the optical distributing coupler 2190. Further, multi-wavelength output by the multi-wavelength generator 2250 is polarization-scrambled by the polarization scrambler 2285 before being distributed by the optical distributing coupler 2295.

(Embodiment 3-4)

Figure 39:
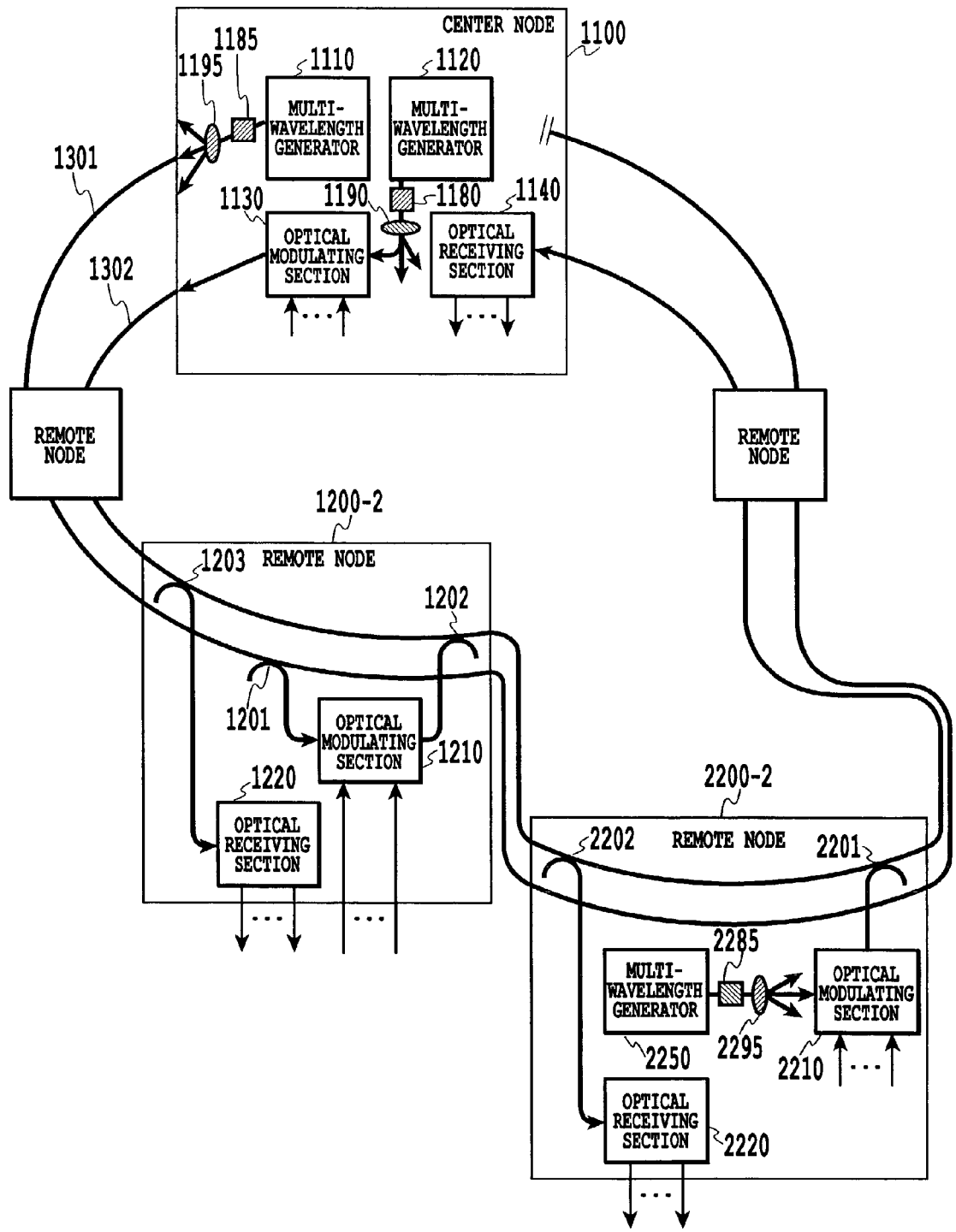
FIG. 39 is a block diagram showing Embodiment 3-4 of the WDM ring network according to the present invention.

FIG. 39 shows Embodiment 3-4 of the WDM ring network of the present invention. Embodiment 3-4 is an example based on the above described embodiments and in which a single WDM network includes a mixture of a remote node having a multi-wavelength generator for upstream signal lights and a remote node not having it. The flow of downstream signal lights is similar to that in the above descried embodiments. Thus, in Embodiment 3-4, the flow of upstream signal lights will be described.

The remote node 2200-2 has the multi-wavelength generator 2250 for upstream signal lights. Light sent out by the multi-wavelength generator 2250 is demultiplexed into lights of different wavelengths. These lights are each modulated and then multiplexed again. The resultant upstream multi-wavelength signal is sent out to the optical fiber transmission path 1302 via the optical coupler 2201. Consequently, the remote node 2200-2 can communicate with the center node 1100.

On the other hand, the remote node 1200-2 has no multi-wavelength generators for upstream signal lights. Continuous-wave lights for upstream signal lights is distributed through the optical fiber transmission path 1301 by the multi-wavelength generator 1110 in the center node 1100. Split continuous-wave lights from the optical coupler 1201 of the remote node 1200-2 is demultiplexed by the optical modulating section 1210 in the remote node 1200-2. The lights obtained are each modulated and then multiplexed again. The resultant upstream multi-wavelength signal is sent out to the optical fiber transmission path 1302 via the optical coupler 1202. Consequently, the remote node 1200-2 can communicate with the center node 1100.

In Embodiment 3-4, as described in Embodiment 3-3, the optical distributing coupler 1110, 1120, 2250, or the like is arranged after the multi-wavelength generator 1110, 1120, 2250, or the like, respectively, so that light generated by the multi-wavelength generator is distributed by the optical distributing coupler and shared by a plurality of different networks.

Furthermore, Embodiment 3-4 may also use a polarization scrambler such as those described in Embodiments 3-1 and 3-2. The polarization scrambler 1185, 1180, 2285, or the like may be arranged between the multi-wavelength generator and the optical distributing coupler so that light generated by the multi-wavelength generator can be polarization-scrambled at once before being shared by different networks. This enables the use of an optical modulator with marked polarization sensitivity.

(Embodiment 4)

Figure 40:
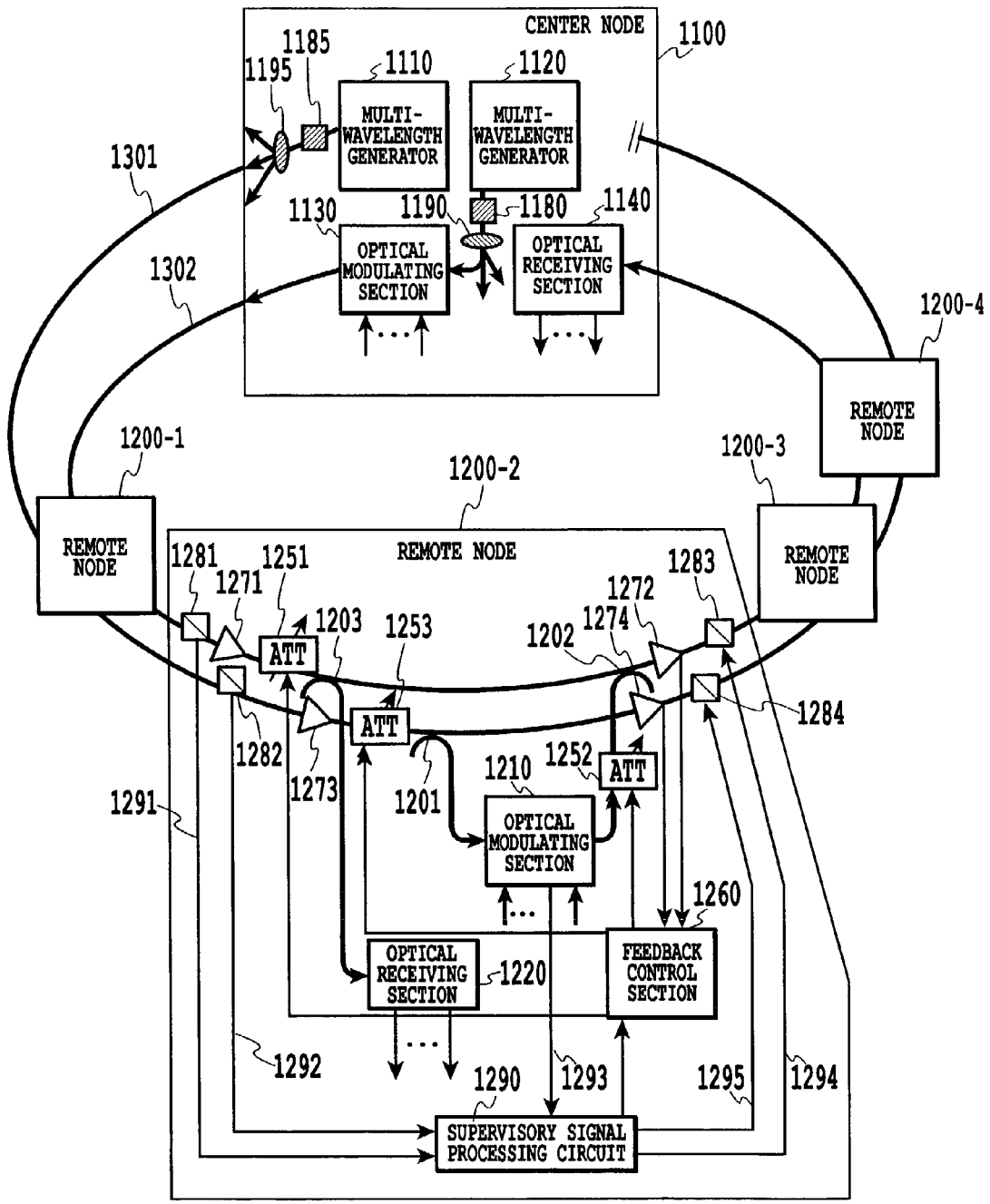
FIG. 40 is a block diagram showing Embodiment 4 of the WDM ring network according to the present invention.
Figure 41:
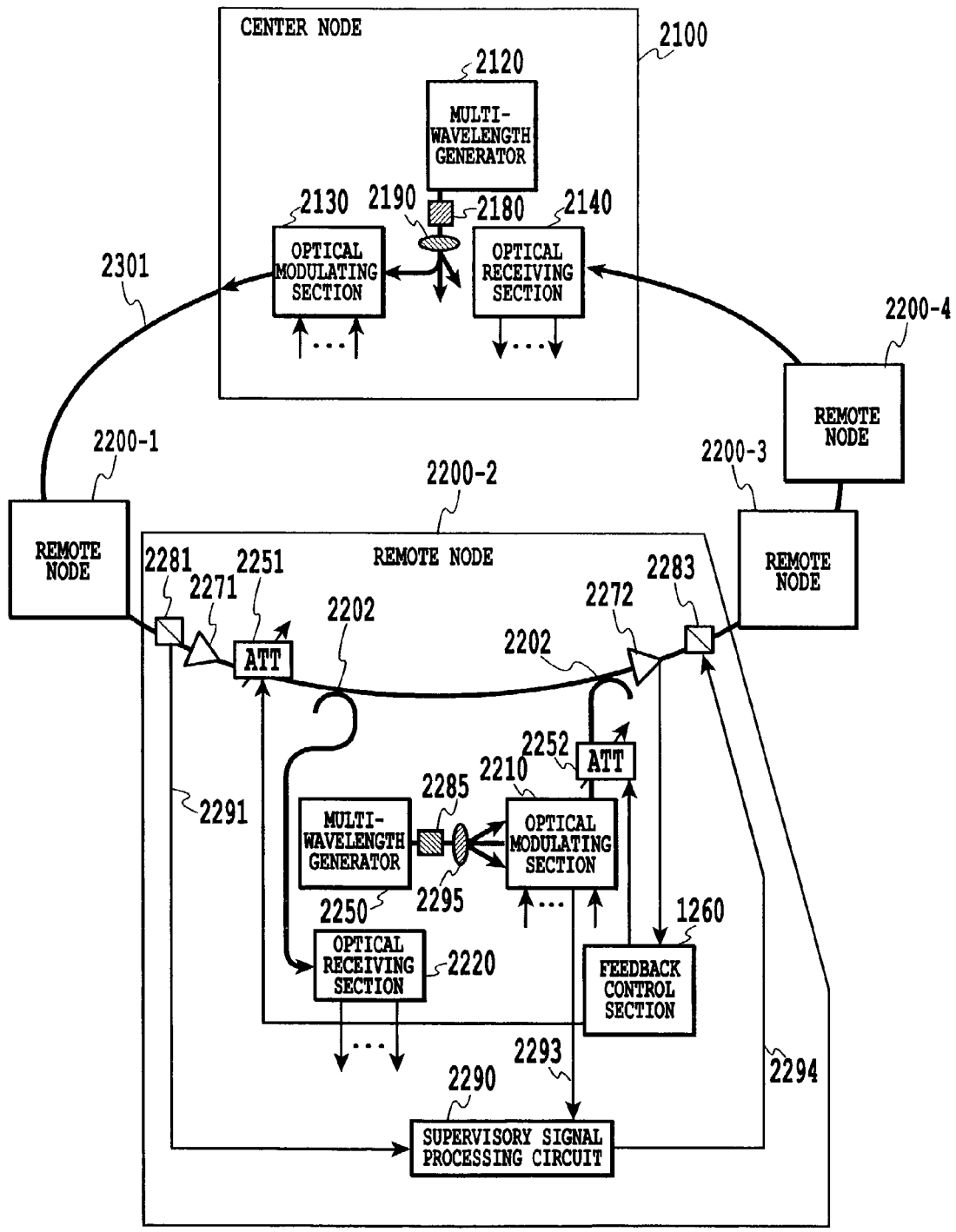
FIG. 41 is a block diagram showing Embodiment 4 of the WDM ring network according to the present invention.

FIGS. 40 and 41 show Embodiment 4 of the WDM ring network of the present invention. In Embodiment 4, the case will be described in which a gain controlling remote node feedback-controlling optical signal power output by a remote node is applied to the network.

The WDM ring network in FIG. 40 is based on the configuration shown in FIG. 6, to which the gain controlling remote node of Embodiment 4 is applied. The WDM ring network in FIG. 41 is based on the configuration shown in FIG. 19, to which the gain controlling remote node of Embodiment 4 is applied.

Referring to FIG. 40, description will be given below of the remote node 1200-2, to which the gain controlling remote node is applied. On the optical fiber transmission path 1302, through which downstream and upstream modulated lights are transmitted, the remote node 1200-2 has an optical variable attenuator (ATT) 1251 arranged before the optical coupler 1203, which acts as optical splitting means, and has an optical variable attenuator 1301 between the optical modulating section 1210 and the optical coupler 1202, which acts as optical coupling means. On the optical fiber transmission path 1301, through which upstream modulated light is transmitted, the remote node 1200-2 has an optical variable attenuator (ATT) 1253 arranged before the optical coupler 1201, which acts as optical splitting means. Furthermore, the remote node 1200-2 is characterized by having feedback control section 1260 that individually controls the optical variable attenuators 1251, 1252, and 1253 using wavelength number information composed of the number of wavelengths input to the remote node 1200-2 and the number of wavelengths newly inserted into the remote node 1200-2, and having a supervisory signal processing circuit 1290 that transfers the wavelength number information to each remote node via a supervisory signal.

A specific control procedure will be described below. It is assumed that all optical amplifiers described below are subjected to gain equalization control. First, the optical fiber transmission path 1302 will be described.

The remote node 1200-2 has an optical amplifier 1271 arranged at an input thereof to amplify signal light that has been weakened as result of a loss on the optical fiber transmission path 1302. The remote node 1200-2 has an optical amplifier 1272 arranged at an output thereof to compensate for losses to the optical variable attenuator 1251 and optical coupler 1203 and 1202.

When the system is introduced, with the optical amplifier 1271 turned off and the optical amplifier 1272 turned on, the power of signal light inserted into the remote node 1200-2 (modulated light from the optical modulating section 1210) is first adjusted to a desired level. In this case, the feedback control section 1260 monitors the total optical power of the optical amplifier 1272, and monitors, via the supervisory signal processing circuit 1290, the number of wavelengths 1293 in signal light newly inserted into the remote node 1200-2. The feedback control section 1260 adjusts attenuation provided by the optical variable attenuator 1252 so that the total optical power divided by the number of wavelengths 1293 is equal to desired signal optical power per channel. The feedback control section 1260 fixes the attenuation using this value.

Then, the optical amplifier 1271 is turned on (the optical amplifier 1272 is also turned on). A WDM coupler 1281 then extracts a supervisory signal 1291 transmitted through the optical fiber transmission path 1302 to obtain from the supervisory signal 1291 the number of wavelengths in signal light input to the remote node 1200-2. The feedback control section 1260 uses the supervisory signal processing circuit 1290 to calculate wavelength number information, the sum of the above number of wavelengths and the number of wavelengths 1293 newly inserted into the remote node 1200-2. The feedback control section 1260 further controls the attenuation provided by the optical variable attenuator 1251 so that the total optical power of the optical amplifier 1272 divided by the number of wavelengths is equal to desired signal optical power per channel. In operation, the attenuation provided by the optical variable attenuator 1252 is fixed. However, attenuation provided by the optical variable attenuator 1251 is always subjected to feedback control to compensate for a variation in loss on the optical fiber transmission path 1302. Consequently, fixed signal optical power per channel can be maintained.

Subsequently, the optical fiber transmission path 1301 will be described. An optical amplifier 1273 arranged at the input of the remote node 1200-2 amplifies continuous-wave lights that has been weakened after being transmitted through the optical fiber transmission path 1301. The remote node 1200-2 has an optical amplifier 1274 arranged at its output leading to the optical fiber transmission path 1301 in order to compensate for losses to the optical variable attenuator 1253 and optical coupler 1201.

For the optical fiber transmission path 1301, no signal light is newly inserted into the remote node 1200-2, so that the number of wavelengths at the input of the remote node 1200-2 is always the same as that at the output thereof. This allows conventional gain controlling method to be applied to the system. That is, a WDM coupler 1282 extracts a supervisory signal 1292 transmitted through the optical fiber transmission path 1301, to obtain from the supervisory signal 1292 the number of wavelengths in continuous-wave lights input to the remote node 1200-2. The feedback control section 1260 may monitor the number of wavelengths via the supervisory signal processing circuit 1290 and monitor the total optical power of the optical amplifier 1274 to feedback-control the attenuation provided by the optical variable attenuator 1253 so that the total optical power divided by the number of wavelengths is equal to desired optical power per channel.

Optical amplifiers may be arranged at the input and output of the optical modulating section 1210 to compensate for a loss to the optical modulator or multiplexer/demultiplexer. Further, wavelength number information on the sum of the number of wavelengths in signal light input to the remote node 1200-2 and obtained from the supervisory signal 1291 and the number of wavelengths 1293 newly inserted into the remote node 1200-2, is transferred to the following remote node (or center node) via a WDM coupler 1283 as a supervisory signal 1294 from the supervisory signal processing circuit 1290, and is used as information required to control the gain of this remote node. Wavelength number information on the number of wavelengths in continuous-wave lights input to the remote node 1200-2 and obtained from the monitor 1292 is transferred to the following remote node (or center node) via a WDM coupler 1284 as a supervisory signal 1295 from the supervisory signal processing circuit 1290, and is used as information required to control the gain of this remote node.

Furthermore, when wavelengths are added to the remote node 1200-2, the following procedure is used to suppress a transient response for signal optical power caused by a delay in transmission of wavelength number information via the supervisory signals 1294 and 1295 (hereinafter referred to as an "SV (supervision) line).

1. The feedback control of the optical variable attenuators 1251 and 1253 is suspended. Each remote node is instructed through the SV line to fix the attenuation provided by the optical variable attenuators 1251 and 1253. (The attenuation in those components of all remote nodes which correspond to the optical variable attenuators 1251 and 1253 is fixed.)

2. The number of channels is increased between the center node and the remote node 1200-2 (for example, the number of channels 1→8).
3. Each remote node is noticed through the SV line that the number of channels has been changed (for example, the number of channels 1→8).
4. At each remote node, the feedback control section 1260 calculates a target value for total optical output power on the basis of the transferred number of channels (number of wavelengths) and the signal optical power per channel set upon system introduction.
5. Each remote node is instructed through the SV line to turn on feedback control of the optical variable attenuators 1251 and 1253.

Now, with reference to FIG. 41, description will be given of the remote node 2200-2, to which the arrangement of the gain-controlled remote node is applied. In FIG. 41, there is no arrangements corresponding to the optical fiber transmission path 1301, through which continuous-wave lights for upstream signal lights is transmitted. Accordingly, control of the remote node 2200-2 in FIG. 41 is similar to control of the remote node 2200-2 in FIG. 40 except that no control is provided for the optical fiber transmission path through which continuous-wave lights for upstream signal lights is transmitted.

The description of the remote node 1200-2 with reference to FIG. 40 can be interpreted as the description of control of the remote node 2200-2, to which the arrangement of the gain-controlled remote node is applied, by replacing the optical fiber transmission path 1302 and the optical couplers 1202 and 1203 with the optical fiber transmission path 2301 and the optical couplers 2201 and 2202 and replacing the fourth digit "1" of reference numbers of the other components with "2".

Further, in Embodiment 4, the optical distributing couplers 1195, 1590, 2295, or the like is arranged after the multi-wavelength generator 1110, 1120, 2250, or the like, respectively, so that light generated by the multi-wavelength generator can be distributed by the optical distributing coupler and shared by a plurality of different networks.

Furthermore, Embodiment 4 may also use a polarization scrambler such as those described in Embodiments 3-1 and 3-2. The polarization scrambler 1185, 1180, 2285, or the like may be arranged between the multi-wavelength generator and the optical distributing coupler so that light generated by the multi-wavelength generator can be polarization-scrambled at once before being shared by different networks. This enables the use of an optical modulator with marked polarization sensitivity.

Figure 42:
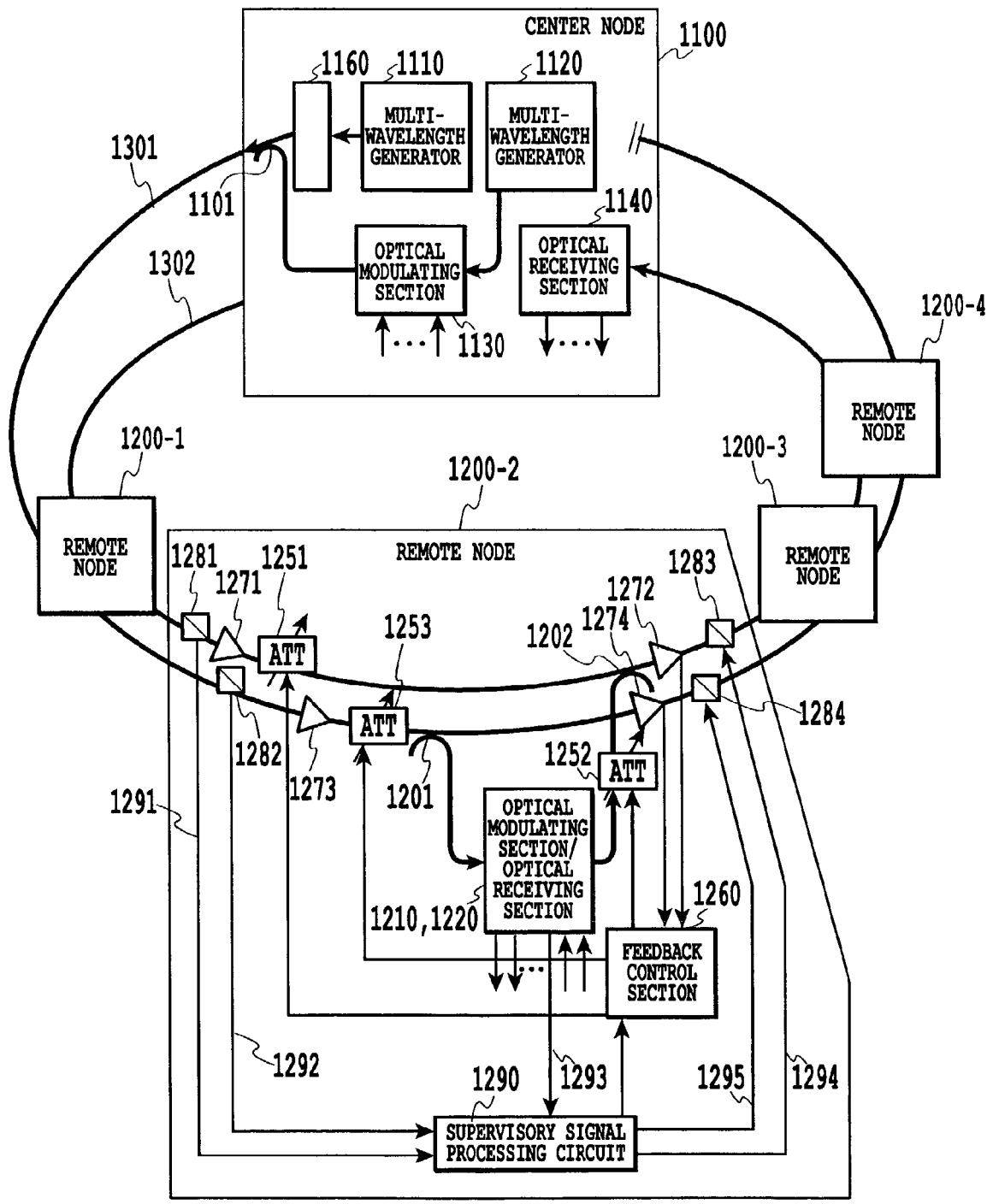
FIG. 42 is a block diagram showing Embodiment 4 of the WDM ring network according to the present invention.

Further, Embodiment 4 may be based on the configuration shown in FIG. 13, to which this gain-controlled remote node is applied. FIG. 42 shows an example of a configuration in which the remote node 1200-2 in FIG. 40 is applied to FIG. 13. The example of the configuration in FIG. 42 in which this gain-controlled remote node is applied to FIG. 13 corresponds to the remote node 1200-2 described with reference to FIG. 40, in which the optical modulating section 1210 of the remote node 1200-2 in FIG. 40 is replaced with the optical modulating section 1210/optical receiving section 1220 in FIG. 42 and in which the optical coupler 1203 and optical receiving section 1220 in FIG. 40 are omitted.

Figure 43:
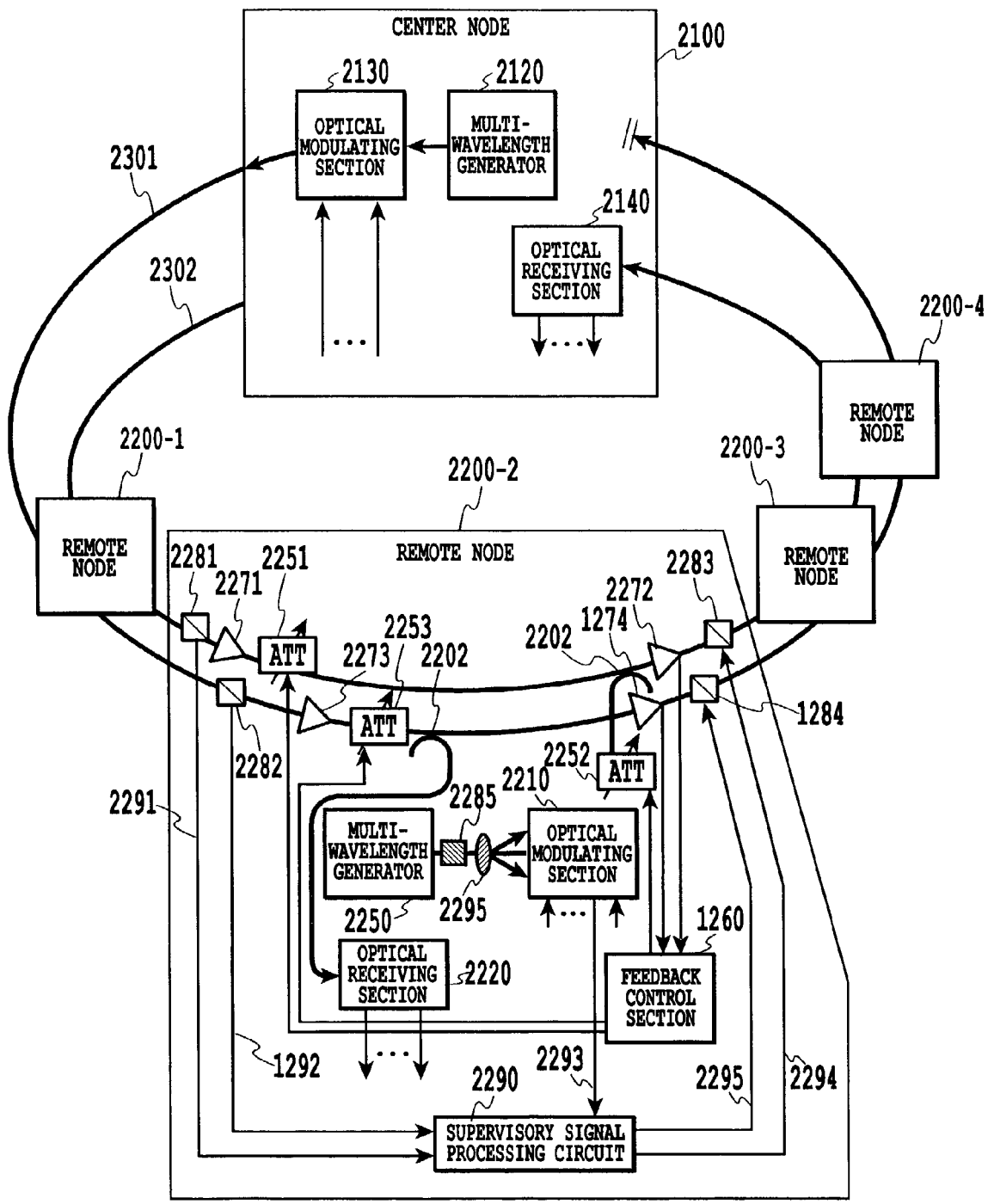
FIG. 43 is a block diagram showing Embodiment 4 of the WDM ring network according to the present invention.

Further, Embodiment 4 may be based on the configuration shown in FIG. 26, to which this gain-controlled remote node is applied. FIG. 43 shows an example of a configuration in which a combination of parts of the remote nodes in FIGS. 40 and 41 is applied to FIG. 26. The example of the configuration in FIG. 43 in which gain control is applied to FIG. 26 corresponds to the remote node 2200-2 described with reference to FIGS. 40 and 41, in which the optical fiber transmission path 2301 in the remote node 2200-2 in FIG. 41 is replaced with the optical fiber transmission path 2302 in FIG. 43, in which the optical coupler 2202 and optical receiving section 2220 in FIG. 41 are coupled to another optical fiber transmission path (the optical fiber transmission path 2301 in FIG. 43), and in which the optical variable attenuator 1253 in FIG. 40 is arranged before the optical coupler 2202.

A common optical coupler may be used in places of the optical couplers 1202 and 1203 in FIG. 40. Likewise, a common optical coupler may be used in places of the optical couplers 2201 and 2202 in FIG. 41.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A WDM ring network comprising one center node and a plurality of remote nodes all connected together in ring form via a first optical fiber transmission path and a second optical fiber transmission path, said first optical fiber transmission path being used to transmit continuous-wave lights for upstream signal lights from said center node to each of said remote nodes, said second optical fiber transmission path being used to transmit downstream signal lights from said center node to each of said remote nodes and to transmit upstream signal lights (obtained by modulating continuous-wave lights) from each of said remote nodes to said center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and those of said downstream signal lights are alternately set; and wherein each of said remote nodes comprises:

first optical splitting means for splitting multi-wavelength light with first wavelength bandwidths transmitted via said first optical fiber transmission path;

an optical modulating section that demultiplexes the continuous-wave lights of wavelength channels with the wavelength bandwidths pre-assigned to the remote node in said first wavelength bandwidths from the multi-wavelength light split by said first optical splitting means, modulates lights obtained, and multiplexes modulated lights to generate upstream signal lights;

optical coupling means for coupling said upstream signal lights to said second optical fiber transmission path;

second optical splitting means for splitting said downstream signal lights transmitted via said second optical fiber transmission path; and an optical receiving section that demultiplexes the signal lights of wavelength channels in the wavelength bandwidth pre-assigned to the remote node from the downstream signal lights split by the second optical splitting means and then receives the lights obtained through demultiplexing.

2. A WDM ring network according to claim 1, wherein said remote node comprises:
first optical attenuating means for adjusting attenuation of optical power of input signal lights which contains said downstream signal lights to be split and which is input to said remote node, before splitting said downstream signal lights to said optical receiving section;
second optical attenuating means disposed between said optical modulating section and said optical coupling means to adjust attenuation of optical power of said upstream signal lights;
supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and
feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

3. A WDM ring network comprising one center node and a plurality of remote nodes all connected together in ring form via a first optical fiber transmission path and a second optical fiber transmission path,
said first optical fiber transmission path being used to transmit continuous-wave lights for upstream signal lights from said center node to each of said remote nodes and to transmit downstream signal lights from said center node to each of said remote nodes, said second optical fiber transmission path being used to transmit upstream signal lights (obtained by modulating continuous-wave lights) from each of said remote nodes to said center node,
wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and those of said downstream signal lights are alternately set.

4. A WDM ring network according to claim 3, wherein said center node comprises:
a first multi-wavelength generator that outputs multi-wavelength light (continuous-wave lights) with first wavelength bandwidths (F1, F3, ... ) pre-assigned for upstream signal lights for each of said remote nodes,
optical filter means for demultiplexing the continuous-wave lights of a plurality of wavelength channels from the multi-wavelength light with said first wavelength bandwidth, multiplexing the lights obtained to remove unwanted sidebands, and then outputting continuous-wave lights of the first wavelength bandwidth;
a second multi-wavelength generator that outputs multi-wavelength light with second wavelength bandwidths (F2, F4, ... ) pre-assigned for downstream signal lights for each of said remote nodes;
an optical modulating section that demultiplexes the continuous-wave lights of a plurality of wavelength channels from the multi-wavelength light with said second wavelength bandwidth, and generates downstream signal lights modulated by a signal sent out to each of said remote nodes;
optical coupling means for coupling the continuous-wave lights of said first wavelength bandwidth and said downstream signal lights together and sending out the coupled light to said first optical fiber transmission path; and
an optical receiving section that demultiplexes said upstream signal lights from each of said remote nodes transmitted via said second optical fiber transmission path and then receives the lights obtained through demultiplexing.

5. A WDM ring network according to claim 4, further comprising polarization scrambling means for polarization-scrambling multi-wavelength light output by the multi-wavelength generator, and
wherein continuous-wave lights used to generate signal lights for said downstream signal lights and said upstream signal lights have been polarization-scrambled by said polarization scrambling means before the signal lights are generated.

6. A WDM ring network according to claim 4, further comprising optical distributing means for distributing multi-wavelength light output by the multi-wavelength generator, to a plurality of networks, and
wherein said multi-wavelength generator is shared by a plurality of networks.

7. A WDM ring network according to claim 6, further comprising polarization scrambling means for polarization-scrambling multi-wavelength light output by the multi-wavelength generator, and
wherein continuous-wave lights used to generate signal lights for said downstream signal lights and said upstream signal lights have been polarization-scrambled by said polarization scrambling means before the signal lights are generated.

8. A WDM ring network according to claim 3, wherein said remote node comprises:
optical splitting means for splitting continuous-wave lights with the first wavelength bandwidth and downstream signal lights with the second wavelength bandwidth both transmitted via said first optical fiber transmission path;
an optical modulating section that demultiplexes the continuous-wave lights of wavelength channels with the wavelength bandwidths pre-assigned to the remote node from continuous-wave lights in said first wavelength bandwidths, modulates the lights obtained, and multiplexes the modulated lights to generate upstream signal lights;
optical coupling means for coupling said upstream signal lights to said second optical fiber transmission path; and
an optical receiving section that demultiplexes signal lights of wavelength channels with the wavelength bandwidth pre-assigned to the remote node from said downstream signal lights, and then receives the signal lights obtained through demultiplexing.

9. A WDM ring network according to claim 8, wherein said remote node comprises:
first optical attenuating means for adjusting attenuation of optical power of input signal lights which contains said downstream signal lights to be split and which is input to said remote node, before splitting said downstream signal lights to said optical receiving section;

second optical attenuating means disposed between said optical modulating section and said optical coupling means to adjust attenuation of optical power of said upstream signal lights;

supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

10. A WDM ring network comprising one center node and a plurality of remote nodes all connected together in ring form via one optical fiber transmission path, said optical fiber transmission path being used to transmit downstream signal lights from the center node to each of said remote nodes and to transmit upstream signal lights from each of said remote nodes to the center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and those of said downstream signal lights are alternately set, said remote node comprising:

a multi-wavelength generator that outputs multi-wavelength light of one or more predetermined wavelength bandwidths pre-assigned to the remote node from a group of wavelength bandwidths (F1, F3, . . . ) pre-assigned for said upstream signal lights;

an optical modulating section that demultiplexes the continuous-wave lights of a plurality of wavelength channels from the multi-wavelength light with said predetermined wavelength bandwidth, modulating the lights obtained, and then multiplexing the modulated lights to generate upstream signal lights;

optical coupling means for coupling said upstream signal lights to said optical fiber transmission path;

optical splitting means for splitting said downstream signal lights transmitted via said optical fiber transmission path; and an optical receiving section that demultiplexes signal lights of wavelength channels with the wavelength bandwidth pre-assigned to the remote node from said downstream signal lights from the optical splitting means, and then receives the lights obtained through demultiplexing.

11. A WDM ring network according to claim 10, further comprising optical distributing means for distributing multi-wavelength light output by the multi-wavelength generator, to a plurality of networks, and wherein said multi-wavelength generator is shared by a plurality of networks.

12. A WDM ring network according to claim 11, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

13. A WDM ring network according to claim 10, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

14. A WDM ring network, comprising one center node and a plurality of remote nodes all connected together in ring form via one optical fiber transmission path, said optical fiber transmission path being used to transmit downstream signal lights from the center node to each of said remote nodes and to transmit upstream signal lights from each of said remote nodes to the center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and those of said downstream signal lights are alternately set, and wherein each of said remote nodes comprises:

a multi-wavelength generator that outputs multi-wavelength light of one or more predetermined wavelength bandwidths pre-assigned to the remote node from a group of wavelength bandwidths (F1, F3, . . . ) pre-assigned for said upstream signal lights;

an optical modulating section that demultiplexes the continuous-wave lights of a plurality of wavelength channels from the multi-wavelength light with said predetermined wavelength bandwidth, modulating the lights obtained, and then multiplexing the modulated lights to generate upstream signal lights;

optical coupling means for coupling said upstream signal lights to said optical fiber transmission path;

optical splitting means for splitting said downstream signal lights transmitted via said optical fiber transmission path;

an optical receiving section that demultiplexes signal lights of wavelength channels with the wavelength bandwidth pre-assigned to the remote node from said downstream signal lights from the optical splitting means, and then receives the lights obtained through demultiplexing;

first optical attenuating means for adjusting attenuation of optical power of input signal lights which contains said downstream signal lights to be split and which is input to said remote node, before splitting said downstream signal lights to said optical receiving section;

second optical attenuating means disposed between said optical modulating section and said optical coupling means to adjust attenuation of optical power of said upstream signal lights;

supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

15. A WDM ring network according to claim 14, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

16. A WDM ring network according to claim 14, further comprising optical distributing means for distributing multi-wavelength light output by the multi-wavelength generator, to a plurality of networks, and wherein said multi-wavelength generator is shared by a plurality of networks.

17. A WDM ring network according to claim 16, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

18. A WDM ring network comprising one center node and a plurality of remote nodes all connected together in ring form via a first optical fiber transmission path and a second optical fiber transmission path, said first optical fiber transmission path being used to transmit downstream signal lights from said center node to each of said remote nodes, a second optical fiber transmission path being used to transmit upstream signal lights from each of said remote nodes to said center node, wherein specific wavelength bandwidths are pre-assigned to each of said remote nodes for said upstream signal lights and said downstream signal lights, and the wavelength bandwidths for said upstream signal lights and said downstream signal lights are alternately set, said remote node comprising:

a multi-wavelength generator that outputs multi-wavelength light of one or more predetermined wavelength bandwidths pre-assigned to the remote node from wavelength bandwidths (F1, F3, . . . ) pre-assigned for upstream signal lights;

an optical modulating section that demultiplexes the continuous-wave lights of a plurality of wavelength channels from the multi-wavelength light with said predetermined wavelength bandwidth, modulating the lights obtained, and then multiplexing the modulated lights to generate upstream signal lights;

optical coupling means for coupling said upstream signal lights to said second optical fiber transmission path;

optical splitting means for splitting said downstream signal lights transmitted via said first optical fiber transmission path; and an optical receiving section that demultiplexes signal lights of wavelength channels with the wavelength bandwidth pre-assigned to the remote node from said downstream signal lights, and then receives the signal lights obtained through demultiplexing.

19. A WDM ring network according to claim 18, further comprising optical distributing means for distributing multi-wavelength light output by the multi-wavelength generator, to a plurality of networks, and wherein said multi-wavelength generator is shared by a plurality of networks.

20. A WDM ring network according to claim 19, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

21. A WDM ring network according to claim 18, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

22. A WDM ring network according to claim 18, wherein said remote node comprises:

first optical attenuating means for adjusting attenuation of optical power of input signal lights which contain said downstream signal lights to be split and which is input to said remote node, before splitting said downstream signal lights to said optical receiving section;

second optical attenuating means disposed between said optical modulating section and said optical coupling means to adjust attenuation of optical power of said upstream signal lights;

supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

23. A WDM ring network according to claim 22, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

24. A WDM ring network according to claim 22, further comprising optical distributing means for distributing multi-wavelength light output by the multi-wavelength generator, to a plurality of networks, and wherein said multi-wavelength generator is shared by a plurality of networks.

25. A WDM ring network according to claim 24, further comprising polarization scrambling means for polarization-scrambling multi-wavelength light output by the multi-wavelength generator, and wherein continuous-wave lights used to generate signal lights for said downstream signal lights and said upstream signal lights have been polarization-scrambled by said polarization scrambling means before the signal lights are generated.

26. A center node in a WDM ring network comprising said one center node and a plurality of remote nodes all connected together in ring form via a first optical fiber transmission path and a second optical fiber transmission path, said first optical fiber transmission path being used to transmit continuous-wave lights for upstream signal lights from said center node to each of said remote nodes, said second optical fiber transmission path being used to transmit downstream signal lights from said center node to each of said remote nodes and to transmit upstream signal lights (obtained by modulating continuous-wave lights) from each of said remote nodes to said center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and said downstream signal lights are alternately set, and wherein said center node comprises:

a first multi-wavelength generator that sends out multi-wavelength light (continuous-wave lights) with a corresponding one of a group of first wavelength bandwidths (F1, F3, . . . ) pre-assigned for upstream signal lights for each of said remote nodes to said first optical fiber transmission path;

a second multi-wavelength generator that sends out multi-wavelength light with second wavelength bandwidths (F2, F4, . . . ) pre-assigned for downstream signal lights for each of said remote nodes;

an optical modulating section that demultiplexes the continuous-wave lights of a plurality of wavelength channels from the multi-wavelength light with said second wavelength bandwidth, generates the downstream signal lights modulated by the signals sent out to each of said remote nodes, and sends out the downstream signal lights to said second optical fiber transmission path; and an optical receiving section that demultiplexes upstream signal lights from each of said remote nodes transmitted via said second optical fiber transmission path and then receives the lights obtained through demultiplexing.

27. A center node according to claim 26, further comprising polarization scrambling means for polarization-scrambling multi-wavelength light output by the multi-wavelength generator, and wherein continuous-wave lights used to generate signal lights for said downstream signal lights and said upstream signal lights has been polarization-scrambled by said polarization scrambling means before the signal lights are generated.

28. A center node according to claim 26, further comprising optical distributing means for distributing multi-wavelength light output by the multi-wavelength generator, to a plurality of networks.

29. A center node according to claim 28, further comprising polarization scrambling means for polarization-scrambling multi-wavelength light output by the multi-wavelength generator, and wherein continuous-wave lights used to generate signal lights for said downstream signal lights and said upstream signal lights has been polarization-scrambled by said polarization scrambling means before the signal lights are generated.

30. A remote node in a WDM ring network comprising one center node and a plurality of remote nodes all connected together in ring form via a first optical fiber transmission path and a second optical fiber transmission path, said first optical fiber transmission path being used to transmit continuous-wave lights for upstream signal lights from said center node to each of said remote nodes, said second optical fiber transmission path being used to transmit downstream signal lights from said center node to each of said remote nodes and to transmit upstream signal lights (obtained by modulating continuous-wave lights) from each of said remote nodes to said center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and said downstream signal lights are alternately set, and wherein said remote node comprises:

first optical splitting means for splitting multi-wavelength light of the first wavelength bandwidth transmitted via said first optical fiber transmission path;

an optical modulating section that demultiplexes the continuous-wave lights of wavelength channels with the wavelength bandwidths pre-assigned to the remote node in said first wavelength bandwidths from the multi-wavelength light split by said first optical splitting means, modulates the lights obtained, and multiplexes the modulated lights to generate upstream signal lights;

optical coupling means for coupling said upstream signal lights to said second optical fiber transmission path;

second optical splitting means for splitting said downstream signal lights transmitted via said second optical fiber transmission path; and an optical receiving section that demultiplexes the signal lights of wavelength channels in the wavelength bandwidth pre-assigned to the remote node from the downstream signal lights split by the second optical splitting means and then receives the lights obtained through demultiplexing.

31. A remote node according to claim 30, further comprising:

first optical attenuating means for adjusting attenuation of optical power of input signal lights which contains said downstream signal lights to be split and which is input to said remote node, before splitting said downstream signal lights and transmitting the split light to said optical receiving section;

second optical attenuating means disposed between said optical modulating section and said optical coupling means to adjust attenuation of optical power of said upstream signal lights;

supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

32. A center node in a WDM ring network comprising said one center node and a plurality of remote nodes all connected together in ring form via a first optical fiber transmission path and a second optical fiber transmission path, said first optical fiber transmission path being used to transmit continuous-wave lights for upstream signal lights from said center node to each of said remote nodes and to transmit downstream signal lights from said center node to each of said remote nodes, said second optical fiber transmission path being used to transmit upstream signal lights (obtained by modulating continuous-wave lights) from each of said remote nodes to said center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and said downstream signal lights are alternately set, and wherein said center node comprises:

a first multi-wavelength generator that outputs multi-wavelength light (continuous-wave lights) with first wavelength bandwidths (F1, F3, . . . ) pre-assigned for upstream signal lights for each of said remote nodes, optical filter means for demultiplexing the continuous-wave lights of a plurality of wavelength channels from the multi-wavelength light with said first wavelength bandwidth, multiplexing the lights obtained to remove unwanted sidebands, and then outputting continuous-wave lights of the first wavelength bandwidth;

a second multi-wavelength generator that outputs multi-wavelength light with second wavelength bandwidths (F2, F4, . . . ) pre-assigned for downstream signal lights for each of said remote nodes;

an optical modulating section that demultiplexes the continuous-wave lights of a plurality of wavelength channels from the multi-wavelength light with said second wavelength bandwidth, and generates downstream signal lights modulated by a signal sent out to each of said remote nodes;

optical coupling means for coupling the continuous-wave lights of said first wavelength bandwidth and said downstream signal lights together and sending out the coupled light to said first optical fiber transmission path; and an optical receiving section that demultiplexes said upstream signal lights from each of said remote nodes transmitted via said second optical fiber transmission path and then receives the lights obtained through demultiplexing.

33. A center node according to claim 32, further comprising polarization scrambling means for polarization-scrambling multi-wavelength light output by the multi-wavelength generator, and wherein continuous-wave lights used to generate signal lights for said downstream signal lights and said upstream signal lights has been polarization-scrambled by said polarization scrambling means before the signal lights are generated.

34. A center node according to claim 32, further comprising optical distributing means for distributing multi-wavelength light output by the multi-wavelength generator, to a plurality of networks.

35. A center node according to claim 34, further comprising polarization scrambling means for polarization-scrambling multi-wavelength light output by the multi-wavelength generator, and wherein continuous-wave lights used to generate signal lights for said downstream signal lights and said upstream signal lights has been polarization-scrambled by said polarization scrambling means before the signal lights are generated.

36. A remote node in a WDM ring network comprising one center node and a plurality of remote nodes all connected together in ring form via a first optical fiber transmission path and a second optical fiber transmission path, said first optical fiber transmission path being used to transmit continuous-wave lights for upstream signal lights from said center node to each of said remote nodes and to transmit downstream signal lights from said center node to each of said remote nodes, said second optical fiber transmission path being used to transmit upstream signal lights (obtained by modulating continuous-wave lights) from each of said remote nodes to said center node, wherein specific wavelength bandwidths are pre-assigned to each of said remote nodes for said continuous-wave lights (for upstream signal lights) and said downstream signal lights, and the wavelength bandwidths for said continuous-wave lights (for upstream signal lights) and said downstream signal lights are alternately set, and wherein said remote node comprises:

optical splitting means for splitting continuous-wave lights of the first wavelength bandwidth and downstream signal lights of the second wavelength bandwidth both transmitted via said first optical fiber transmission path;

an optical modulating section that demultiplexes the continuous-wave lights of wavelength channels with the wavelength bandwidths pre-assigned to the remote node from continuous-wave lights in said first wavelength bandwidths, modulates the lights obtained, and multiplexes the modulated lights to generate upstream signal lights;

optical coupling means for coupling said upstream signal lights to said second optical fiber transmission path; and an optical receiving section that demultiplexes signal lights of wavelength channels of the wavelength bandwidth pre-assigned to the remote node from said downstream signal lights, and then receives the signal lights obtained through demultiplexing.

37. A remote node according to claim 36, further comprising:
first optical attenuating means for adjusting attenuation of optical power of input signal lights which contains said downstream signal lights to be split and which is input to said remote node, before splitting said downstream signal lights and transmitting the split light to said optical receiving section;
second optical attenuating means disposed between said optical modulating section and said optical coupling means to adjust attenuation of optical power of said upstream signal lights;
supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and
feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

38. A remote node in a WDM ring network comprising one center node and a plurality of remote nodes all connected together in ring form via one optical fiber transmission path,
said optical fiber transmission path being used to transmit downstream signal lights from the center node to each of said remote nodes and to transmit upstream signal lights from each of said remote nodes to the center node,
wherein specific wavelength bandwidths are pre-assigned to each of said remote nodes for said upstream signal lights and said downstream signal lights, and the wavelength bandwidths for said upstream signal lights and said downstream signal lights are alternately set,
said remote node comprising:
a multi-wavelength generator that outputs multi-wavelength light of one or more predetermined wavelength bandwidths pre-assigned to the remote node and belonging to wavelength bandwidths (F1, F3, . . . ) pre-assigned for said upstream signal lights;
an optical modulating section that demultiplexes the continuous-wave lights of a plurality of wavelength channels from the multi-wavelength light of said predetermined wavelength bandwidth, modulating the lights obtained, and then multiplexing the modulated lights to generate upstream signal lights;
optical coupling means for coupling said upstream signal lights to said optical fiber transmission path;
optical splitting means for splitting said downstream signal lights transmitted via said optical fiber transmission path; and
an optical receiving section that demultiplexes signal lights of wavelength channels of the wavelength bandwidth pre-assigned to the remote node from said downstream signal lights from the optical splitting means, and then receives the lights obtained through demultiplexing.

39. A remote node according to claim 38, further comprising optical distributing means for distributing multi-wavelength light output by the multi-wavelength generator, to a plurality of networks.

40. A remote node in a WDM ring network comprising one center node and a plurality of remote nodes all connected together in ring form via one optical fiber transmission path,
wherein said optical fiber transmission path being used to transmit downstream signal lights from the center node to each of said remote nodes and to transmit upstream signal lights from each of said remote nodes to the center node, and
wherein specific wavelength bandwidths are pre-assigned to each of said remote nodes for said upstream signal lights and said downstream signal lights, and the wavelength bandwidths for said upstream signal lights and said downstream signal lights are alternately set;
said remote node comprises:
multi-wavelength generator that outputs multi-wavelength light of one or more predetermined wavelength bandwidths pre-assigned to the remote node and belonging to wavelength bandwidths (F1, F3, . . . ) pre-assigned for said upstream signal lights;
an optical modulating section that demultiplexes the continuous-wave lights of a plurality of wavelength channels from the multi-wavelength light of said predetermined wavelength bandwidth, modulating the lights obtained, and then multiplexing the modulated lights to generate upstream signal lights;
optical coupling means for coupling said upstream signal lights to said optical fiber transmission path;
optical splitting means for splitting said downstream signal lights transmitted via said optical fiber transmission path;
an optical receiving section that demultiplexes signal lights of wavelength channels of the wavelength bandwidth pre-assigned to the remote node from said downstream signal lights from the optical splitting means, and then receives the lights obtained through demultiplexing;
first optical attenuating means for adjusting attenuation of optical power of input signal lights which contains said downstream signal lights to be split and which is input to said remote node, before splitting said downstream signal lights and transmitting the split light to said optical receiving section;
second optical attenuating means disposed between said optical modulating section and said optical coupling means to adjust attenuation of optical power of said upstream signal lights;
supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and
feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

41. A remote node according to claim 40, further comprising polarization scrambling means for polarization-scrambling multi-wavelength light output by the multi-wavelength generator, and
wherein continuous-wave lights used to generate signal lights for said downstream signal lights has been polarization-scrambled by said polarization scrambling means before the signal lights are generated.

42. A remote node according to claim 40, further comprising optical distributing means for distributing multi-wavelength light output by the multi-wavelength generator, to a plurality of networks.

43. A remote node according to claim 42, further comprising polarization scrambling means for polarization-scrambling multi-wavelength light output by the multi-wavelength generator, and
wherein continuous-wave lights used to generate signal lights for said downstream signal lights has been polarization-scrambled by said polarization scrambling means before the signal lights are generated.

44. A remote node in a WDM ring network comprising one center node and a plurality of remote nodes all connected together in ring form via one optical fiber transmission path,
said optical fiber transmission path being used to transmit downstream signal lights from the center node to each of said remote nodes and to transmit upstream signal lights from each of said remote nodes to the center node, and
wherein specific wavelength bandwidths are pre-assigned to each of said remote nodes for said upstream signal lights and said downstream signal lights, and the wavelength bandwidths for said upstream signal lights and said downstream signal lights are alternately set;
said remote node comprising:
a multi-wavelength generator that outputs multi-wavelength light of one or more predetermined wavelength bandwidths pre-assigned to the remote node and belonging to wavelength bandwidths (F1, F3, . . . ) pre-assigned for said upstream signal lights;
an optical modulating section that demultiplexes the continuous-wave lights of a plurality of wavelength channels from the multi-wavelength light of said predetermined wavelength bandwidth, modulating the lights obtained, and then multiplexing the modulated lights to generate upstream signal lights;
optical coupling means for coupling said upstream signal lights to said optical fiber transmission path;
optical splitting means for splitting said downstream signal lights transmitted via said optical fiber transmission path;
an optical receiving section that demultiplexes signal lights of wavelength channels of the wavelength bandwidth pre-assigned to the remote node from said downstream signal lights from the optical splitting means, and then receives the lights obtained through demultiplexing; and
polarization scrambling means for polarization-scrambling multi-wavelength light output by the multi-wavelength generator,
wherein continuous-wave lights used to generate signal lights for said downstream signal lights has been polarization-scrambled by said polarization scrambling means before the signal lights are generated.

45. A remote node in a WDM ring network comprising one center node and a plurality of remote nodes all connected together in ring form via one optical fiber transmission path,
said optical fiber transmission path being used to transmit downstream signal lights from the center node to each of said remote nodes and to transmit upstream signal lights from each of said remote nodes to the center node,
wherein specific wavelength bandwidths are pre-assigned to each of said remote nodes for said upstream signal lights and said downstream signal lights, and the wavelength bandwidths for said upstream signal lights and said downstream signal lights are alternately set,
said remote node comprising:
a multi-wavelength generator that outputs multi-wavelength light of one or more predetermined wavelength bandwidths pre-assigned to the remote node and belonging to wavelength bandwidths (F1, F3, . . . ) pre-assigned for said upstream signal lights;
an optical modulating section that demultiplexes the continuous-wave lights of a plurality of wavelength channels from the multi-wavelength light of said predetermined wavelength bandwidth, modulating the lights obtained, and then multiplexing the modulated lights to generate upstream signal lights;
optical coupling means for coupling said upstream signal lights to said optical fiber transmission path;
optical splitting means for splitting said downstream signal lights transmitted via said optical fiber transmission path;
an optical receiving section that demultiplexes signal lights of wavelength channels of the wavelength bandwidth pre-assigned to the remote node from said downstream signal lights from the optical splitting means, and then receives the lights obtained through demultiplexing;
optical distributing means for distributing multi-wavelength light output by the multi-wavelength generator, to a plurality of networks; and
polarization scrambling means for poi arization-scrambling multi-wavelength light output by the multi-wavelength generator,
wherein continuous-wave lights used to generate signal lights for said downstream signal lights has been polarization-scrambled by said polarization scrambling means before the signal lights are generated.

46. A remote node in a WDM ring network comprising one center node and a plurality of remote nodes all connected together in ring form via a first optical fiber transmission path and a second optical fiber transmission path,
said first optical fiber transmission path being used to transmit downstream signal lights from said center node to each of said remote nodes, a second optical fiber transmission path being used to transmit upstream signal lights from each of said remote nodes to said center node,
wherein specific wavelength bandwidths are pre-assigned to each of said remote nodes for said upstream signal lights and said downstream signal lights, and the wavelength bandwidths for said upstream signal lights and said downstream signal lights are alternately set,
said remote node comprising:
a multi-wavelength generator that outputs multi-wavelength light of one or more predetermined wavelength bandwidths pre-assigned to the remote node and belonging to wavelength bandwidths (F1, F3, . . . ) pre-assigned for said upstream signal lights;

an optical modulating section that demultiplexes the continuous-wave lights of a plurality of wavelength channels from the multi-wavelength light of said predetermined wavelength bandwidth, modulating the lights obtained, and then multiplexing the modulated lights to generate upstream signal lights;

optical coupling means for coupling said upstream signal lights to said second optical fiber transmission path;

optical splitting means for splitting said downstream signal lights transmitted via said first optical fiber transmission path; and an optical receiving section that demultiplexes signal lights of wavelength channels of the wavelength bandwidth pre-assigned to the remote node from said downstream signal lights, and then receives the signal lights obtained through demultiplexing.

47. A remote node according to claim 46, further comprising polarization scrambling means for polarization-scrambling multi-wavelength light output by the multi-wavelength generator, and wherein continuous-wave lights used to generate signal lights for said downstream signal lights has been polarization-scrambled by said polarization scrambling means before the signal lights are generated.

48. A remote node according to claim 46, further comprising optical distributing means for distributing multi-wavelength light output by the multi-wavelength generator, to a plurality of networks.

49. A remote node according to claim 48, further comprising polarization scrambling means for polarization-scrambling multi-wavelength light output by the multi-wavelength generator, and wherein continuous-wave lights used to generate signal lights for said downstream signal lights has been polarization-scrambled by said polarization scrambling means before the signal lights are generated.

50. A remote node according to claim 46, further comprising:

first optical attenuating means for adjusting attenuation of optical power of input signal lights which contains said downstream signal lights to be split and which is input to said remote node, before splitting said downstream signal lights and transmitting the split light to said optical receiving section;

second optical attenuating means disposed between said optical modulating section and said optical coupling means to adjust attenuation of optical power of said upstream signal lights;

supervisory signal processing means for loading the number of wavelengths in said input signal lights and the number of wavelengths in said upstream signal lights, calculating wavelength number information, the sum of the numbers of wavelengths loaded, and transferring the calculated wavelength number information to another remote node as information on the number of wavelengths in said input signal lights for this remote node; and feedback control means for detecting total optical power of output signal lights output by said remote node and controlling said first optical attenuating means and said second optical attenuating means so that output signal optical power per channel is fixed at an output of the remote node, on the basis of the detected optical power, the number of wavelengths in said upstream signal lights, and the total number of wavelengths.

51. A remote node according to claim 50, further comprising polarization scrambling means for polarization-scrambling multi-wavelength light output by the multi-wavelength generator, and wherein continuous-wave lights used to generate signal lights for said downstream signal lights has been polarization-scrambled by said polarization scrambling means before the signal lights are generated.

52. A remote node according to claim 50, further comprising optical distributing means for distributing multi-wavelength light output by the multi-wavelength generator, to a plurality of networks.

53. A remote node according to claim 52, further comprising polarization scrambling means for polarization-scrambling multi-wavelength light output by the multi-wavelength generator, and wherein continuous-wave lights used to generate signal lights for said downstream signal lights has been polarization-scrambled by said polarization scrambling means before the signal lights are generated.

* * * * *

UNITED STATES PATENT AND TRADEMARK OFFICE
CERTIFICATE OF CORRECTION

PATENT NO. : 7,206,510 B2
APPLICATION NO. : 10/266905
DATED : April 17, 2007
INVENTOR(S) : Suzuki et al.

It is certified that error appears in the above-identified patent and that said Letters Patent is hereby corrected as shown below:

In Claim 40, Column 48, Line 23, before "multi-wavelength" insert -- "a" --; and In Claim 45, Column 50, Line 43, after "for" delete "poi arization" and insert -- polarization" --.

Signed and Sealed this

Twenty-seventh Day of November, 2007

JON W. DUDAS
*Director of the United States Patent and Trademark Office*